United States Patent [19]

Peters

[11] Patent Number: 5,715,334
[45] Date of Patent: *Feb. 3, 1998

[54] DIGITAL PIXEL-ACCURATE INTENSITY PROCESSING METHOD FOR IMAGE INFORMATION ENHANCEMENT

[75] Inventor: Klaus-Ruediger Peters, New Haven, Conn.

[73] Assignee: The University of Connecticut, Storrs, Conn.

[ * ] Notice: The term of this patent shall not extend beyond the expiration date of Pat. No. 5,592,571.

[21] Appl. No.: 399,970

[22] Filed: Mar. 8, 1995

Related U.S. Application Data

[63] Continuation-in-part of Ser. No. 207,489, Mar. 8, 1994, Pat. No. 5,592,571.
[51] Int. Cl.⁶ .................................................. G06T 5/50
[52] U.S. Cl. ................................... 382/254; 382/130
[58] Field of Search ........................ 382/254, 275, 382/274, 264, 180, 130, 270, 261; 358/448, 455

[56] References Cited

U.S. PATENT DOCUMENTS

| 4,903,205 | 2/1990 | Hishinuma | 382/130 |
| 4,907,156 | 3/1990 | Doi et al. | 382/130 |

OTHER PUBLICATIONS

R.W. Ehrich, "A Symmetric Hysteresis Smoothing Algorithm that Preserves Principal Features" in Computer Graphics and Image Processing, pp. 121–126 (1978).

Primary Examiner—Michael T. Razavi
Assistant Examiner—Larry J. Prikockis
Attorney, Agent, or Firm—Fishman, Dionne, Cantor & Colburn

[57] ABSTRACT

An "image information enhancement" technique for processing digital images is presented, wherein enhancement of image detail contrast is accomplished by adding a differential hysteresis pattern to a digital image. The differential hysteresis image processing utilizes the persistence of intensity variations (i.e., hysteresis) as means for data reduction and image detail contrast enhancement. Image hysteresis is determined by a hysteresis cursor of an interactively chosen hysteresis range and differential hysteresis patterns are generated as a difference between hysteresis images.

44 Claims, 39 Drawing Sheets

Image Information Analysis

Image Information Classes

Quantitation of Information and Quality

DIGITAL PIXEL-ACCURATE INTENSITY PROCESSING METHOD FOR IMAGE INFORMATION ENHANCEMENT

CROSS-REFERENCE TO RELATED APPLICATION

This is a continuation-in-part of U.S. patent application Ser. No. 08/207,489 entitled DIGITAL PIXEL-ACCURATE INTENSITY PROCESSING METHOD FOR IMAGE INFORMATION ENHANCEMENT filed Mar. 8, 1994 by Klaus-Ruediger Peters, now U.S. Pat. No. 5,592,571.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to the processing of digital image data. More specifically, this invention relates to image data processing using digital techniques for image enhancement and enlargement.

Digital image processing has taken an increasing importance as a result of the technological advances in image acquisition and image communication; and can provide advantages over conventional analog image information handling, e.g., undisturbed access of the "raw data set", objective image evaluation, quantitative analysis of the image information, and reduced costs and increased flexibility of image data handling. While a complex infrastructure network is in place for high-speed image communication with local, national and international access, the general use of digital image processing is hindered through lack of universal standards for identifying image information. Unfortunately, visual image perception varies amongst individuals and depends strongly on the image perception and pattern recognition ability. This is the reason why the same image is evaluated quite differently by more than one person. Of course, the lack of consistency in image information analysis and display is extremely problematic and creates serious concerns for image evaluation.

There are many kinds of information contained in images, but only a few classes may be important in image communication, i.e., detail-oriented (scientific, technical and medical images), composition-oriented (arts, martials science) or information-oriented (binary and CAD, computer assisted drawing). Most important are detail containing images which describe two-or three-dimensional data sets dealing with spacial features. The lack of proper pixel accurate tools for objective description of image details as well as image imperfections produced by acquisition and transmission (noise) limit image communication at this time to information-oriented contents only.

When analyzing images (e.g., microscopic images derived from SEM or TEM; or medical imagery such as mammograms or x-rays), the image analysts are limited most by their own visual system (e.g., the human eye) regarding image perception and pattern recognition, since most modern imaging instruments (e.g., microscope, x-ray device, mammography device) provide more data than the eye can process. In general, such data are spacial information documented with certain contrast mechanisms and translated into images. Irrespective of the kind of imaging technique used, the imaging information must be communicated to the visual system for evaluation of its information content at the level of imaging instrument contrast resolution as well as spacial resolution. Since the visual perception is limited in intensity range (IR) to 100-200 intensity levels (7-8 bit in self illuminated images of a video monitor) and resolution to 500-1,000 pixels per picture width (PW), the imaging instruments full frame image information must often be compressed to fit within these values. Image evaluation is primarily a process of pattern recognition which works at a much lower information density than the eye can perceive. Only patterns of large image components of high contrast, high edge sharpness and a few intensity levels (4 bit) are recognized. All other small detail information can only be partially recognized and therefore is commonly generalized as image background or texture. However, in microscopy, radiology, x-ray and other imaging sciences, such background contains a wealth of information of acquired image detail data which is commonly lost in visual analog evaluation. Simply increasing the image magnification during acquisition will not fully access these details due to visual or instrumental limitations (low contrasts, sample or instrument instabilities, etc.). It is the ability of digital image processing to make these details visually accessible (detail enhancement) in already acquired images and to provide simple tools for their evaluation, quantitation and communication which makes such processing an important and essential tool for image evaluation. Unfortunately, as will be discussed below, presently available and known digital processing techniques fall far short of providing the required detail enhancements and are associated with serious drawbacks and deficiencies.

In single digital images, intensity fluctuations caused by random noise and small structural (spacial) image details of only a few pixels cannot be identified since no information other than the pixel's intensities are available in a single data set. However, digital image processing methods can be applied for separating image contents on account of certain intensity criteria. The separation of noise and detail structures can be defined by a threshold of intensity variations below which spacial variations are thought to represent noise and are eliminated (smoothed) but above which the intensity variations are defined as significant and are maintained. Conventional image processing methods apply spacially extended processing masks or Fourier filters for the determination of local intensity fluctuations (either in the space domain or in the Fourier domain) and use various methods for determination of the threshold intensity value. The utilized pixel area (mask) and an often used weighing factor applied to the local intensity distribution within the mask will shift the spacial boundary between (smoothed) background and (maintained) detail, altering the spacial dimensions of details. Using this technique, serious spacial artifacts are produced when structural features are similar in size or smaller than the effective spacial filter area. This problem occurs in all conventional processing modes using spacial kernels, Fourier filters or statistical approaches. In addition, certain significant spacial intensity distributions (significant structural patterns) may be seriously altered by eliminating or adding structures, indicating a strong dependency of the processing result on the image content. Such alteration of the spacial content of the original image (raw data set) is a serious limitation of all conventional noise filters in cases where the structural integrity of the image data is important—i.e., in structure characterization and quantitation. The extent of spacial artifacts in G7 conventional processing depends on the image content. Therefore, complex time-consuming determination of optimal processing parameters are required for each image in order to reduce processing artifacts. Also, conventional image processing speeds are so slow that visual control of intensity threshold adjustments and recognition of processing artifacts are significantly hindered. Therefore, conventional noise smoothing techniques are applied strictly to full frame images, thereby reducing the visualization and recognition of the produced artifacts.

SUMMARY OF THE INVENTION

The above-discussed and other problems and deficiencies of the prior art are overcome or alleviated by the digital imaging process method and system of the present invention. In accordance with the present invention, novel "smoothing" and "detail enhancement" techniques for processing digital images create a new quality of image perception (centering on enhancement of objective image information) which have wide application in the general field of image enhancement and more particularly in the fields of microscopy, radiology, remote sensing, astronomy, robotics and machine vision and general image communication. The new image processing technology of this invention makes possible a separation of the image information into three objective distinct non-random intensity groups of "large image features" and small "spacial detail" and "intensity detail", and one group of random intensity information of the "image noise". "Smoothing" allows an elimination of intensity-defined image components and the concomitant reduction of image contrast can be restored by linear contrast stretching of the smoothed image. "Detail enhancement" allows a recovery of intensity-defined image components eliminated by the smoothing process through subtraction of the smoothed image from the original image. The overall contrast range of the recovered information is equal to the applied smoothing factor and can be automatically brought to the full visual intensity range by linear contrast stretching. This has the advantage of maintaining detail contrast proportions which closely reflect the raw data characteristics. If high pixel accuracy processing is provided, "detail slicing" becomes possible. Two smoothed images, each processed with a different smoothing factor, can be subtracted providing the information difference between least smoothed and the most smoothed data set. Again, precise linear contrast stretching can present the extracted information at full visual intensity range.

The smoothing technique of this invention comprises a two dimensional digital hysteresis filter which utilizes a variable, automatically adjusting "two-dimensional mask". As a result, the filter is independent of the image size and content and cannot alter the size of any structural (significant intensity) features, even if they are as small as only one pixel in size. In one embodiment of this technique, the two-dimensional hysteresis smoothing technique of this invention calculates smoothed pixels using a set of one-dimensional hysteresis lines at various angles running through each pixel in an image. Each one-dimensional hysteresis line calculates a new value for each pixel in an image. These one-dimensional hysteresis values are added together and divided by the number of hysteresis lines to get the output value for the pixel. This operation requires complex processing and is preferably realized through a massively parallel processing array processor which allows near-real time full processing speeds on 1K×1K images which may require several billions of instructions per record (BIPS). The technique of this invention is preferably implemented on a desktop massively parallel processor that has a large number of 16-bit processing elements (PE's) connected in a ring. Each PE has a small, high-speed on-chip data memory and a large off-chip data memory. The PE's all have access to a shared scaler data memory and a shared program memory. A single program is executed by all the PE's in lockstep (SIMD processing).

As used herein, "smoothing" thus constitutes a method for reducing or smoothing selected intensities in a digitized image data array comprising a matrix of pixels arranged in columns and rows, including the steps of:

(a) determining if a selected pixel's intensity value in relation to its neighbors' intensities falls within a preselected significant intensity range or curser width which equals a fixed two-dimensional mask one pixel in size;

(b) maintaining the selected pixel's relative intensity value if it is outside the cursor width;

(c) changing the selected pixel's intensity value if it is within the cursor width to an intermediate value; and (d) repeating steps (a)–(c) for at least some of the other pixels in at least a portion of the matrix to define a smoothed digitized image data array.

A somewhat different smoothing technique in accordance with this invention constitutes a method for reducing or smoothing selected intensities in a digitized image data array comprising a matrix of pixels arranged in columns and rows including the steps of:

(a) determining if a selected pixel's intensity value in relation to its neighbors' intensities falls within a preselected significant intensity range or curser width;

(b) maintaining the selected pixel's relative intensity value if it is outside the cursor width;

(c) changing the selected pixel's intensity value if it is within the cursor width to an intermediate value which is an average of the selected pixel's intensity value relative to its neighbors' intensity values, the average being determined by using a set of one dimensional hysteresis lines;

(d) determining the area of the pixel matrix which contributes to the final intermediate value of a pixel. This area may vary for each pixel and is defined solely by the image's intensity characteristics. This area represents a two-dimensional variable mask which is generated automatically by the one-dimensional mask but which may not be identical with the finally smoothed area of the pixel matrix; and (e) repeating steps (a)–(d) for at least some of the other pixels in at least a portion of the matrix to define a smoothed digitized image data array.

Preferably, the hysteresis lines comprise spacially neighboring pixels. More preferably, the hysteresis lines are linear lines radiating at preselected angles through said selected pixel.

The smoothing technique of this invention which utilizes a "two-dimensional hysteresis filter" provides many features and advantages relative to conventional digital imaging techniques. For example, conventional image enhancement using fixed small processing masks (kernels in space domain or Fourier filters) may not be pixel accurate (as is the technique of the present invention). Spacial artifacts may be as large as the size of the mask and depend strongly on the image content. In order to reduce such artifacts, the processing parameters must be optimized for each image. However, if the image itself is used for the definition of a local processing mask (as in the present invention) such spacial artifacts can be eliminated and the processing result will be independent from the image content. As in conventional mask processing, the processed pixel must be related to all other pixels within the "mask" assessing the spacial significance of intensity differences by the smoothing factor. The use of a "variable automatically adjusting local mask" produces a processing characteristic equal to point processing since each processed point has a specifically adjusted spacial mask. High precision processing reduces processing artifacts to a level not visible in enhanced images.

In general, "detail enhancement" refers to an enhancement of the contrast of image details and must include the spacial details as well as the intensity details in order to maintain the image character (image accuracy). "Spacial details" constitute intensity variations over a short distance (a few pixels long), and "intensity details" constitute intensity variations of a few intensity steps independent of their spacial extent. In addition, a desirable enhancement procedure must preserve the unrestricted possibility of image quantitation not only of the spacial content but also of the intensity content; that means the image processing technology must maintain the accuracy of the image at the level of individual pixel's intensity. Such pixel accurate intensity processing (PAIP) for image enhancement is not possible with any conventional technology, but is achievable utilizing the detail enhancement processing technique of the present invention which can fulfill the latter requirements and which is therefore inherently suitable (trustworthy) for scientific and medical applications. The basis for its spacial accuracy is the utilization of pixel-accurate intensity processing; which preferably utilize the "smoothing" technique discussed above. Its processing accuracy results from the capability of the "enhancement parameter" (significant intensity range) of selecting "intensity information" from the whole image at both levels of spacial and intensity details. Its application power results from the possible visual appreciation of the spacial and intensity changes of selected information by linear contrast stretching to the full intensity range of human visual perception, and from the possibility of performing the enhancement in "near-real time" which provides the selected information at a time interval similar or equal to the processing speed of human visual recognition taking full advantage of the visual capabilities for image evaluation and communication.

The novel PAIP detail enhancement filter of the present invention works in the following way. First, the detail content of the image is reduced on the basis of intensity variations defined by a single processing parameter consisting of the "cursor width" using the two dimensional hysteresis smoothing technique described above (or any other "pixel-accurate" smoothing technique). In this application, significantly larger cursor widths are used than in conventional noise management since the image content must not be maintained but instead must be reduced. Secondly, the detail image is created by subtracting the smoothed image from the original image (or from another smoothed image). The maximum intensity difference of the detail image between any points is equal to the applied cursor width (or the difference of the larger minus the smaller cursor width). Thirdly, the contrast range of the detail image is enhanced by linear contrast stretching with maximum enhancement obtained by utilizing the full width of the intensity range available for visual perception (typically 8 bit). The evaluation of the processing result is dramatically enhanced if the processing occurs in "near-real time" (less than one second) so that an interactive change of the processing parameter becomes possible. This enhances the perception of the image details and their correlation with the original image.

As used herein, "detail enhancement" thus constitutes a method of enhancing the detail in a digitized image data array comprising a matrix of pixels arranged in columns and rows including the steps of:

(a) generating two pixel-accurate image data arrays with at least one of the image data arrays being smoothed; and (b) subtracting one of the pixel accurate arrays from the other pixel accurate array to define a differential image having a selected intensity range.

An important and often (though not always) critical third step includes:

(c) enhancing the contrast of the differential image through contrast stretching.

Specific image detail recognition is a new visual task for image evaluation and communication which conventionally requires long visual experience. The "near-real time" processing fosters a quick and realistic training of the visual system (e.g., the human eye) for working with the complete image data set. Artifact-free processing is a prerequisite for such an expansion of the visual perception not achievable by conventional image processing techniques.

The digital enhancement technique of the present invention provides many features and advantages relative to conventional digital imaging techniques. For example, the detail enhancement filter works principally different from other conventionally used detail filters, i.e., the Oho filter which is described in Oho E., Automatic Contract Adjustment for Detail recognition in SEM Images On-Line Digital Image Processing, Scanning 14:335–334 (1992). The Oho filter is a highlight filter for edge enhancement of spacial image details only (it specifically suppresses intensity detail enhancement). It extracts small area intensity changes (highlights) from the original image by use of a fixed large mask size median filter (19×19 for 1K×1K images). The use of a median filter has many limitations. Most importantly are the following three aspects; first, the filter maintains local intensity variations and when the median is subtracted from the original image, the intensity details are completely removed from the selected detail data. Second, the filter cannot select a certain intensity range. This has the serious implication that the intensity range of the detail image depends fully on the image content. Therefore, only histogram equalization can be used for contrast enhancement of the filtered details which may cause spacial contrast artifacts. Third, the Oho filter erodes fine structures at the level of its mask size at edges and at small multiple intensity variations. As a consequence, the enhanced detail image must be added to the median filtered image in order to restore (in part) the eroded fine structure. However, since the detail image contrast is enhanced through disproportional histogram equalization, not all spacial details are enhanced proportionally to their original intensities. In contrast, the new PAIP detail enhancement filter of this invention produces quite different information as compared to that obtained by the Oho filter and, presents all image information in an exhaustive fashion with linear contrast enhancement.

The new detail filter produces detail images which characterize the intensity distributions within an image. It provides a tool for a novel method of image information analysis and classification based on the concept that any image communicates information only through image contrasts which are intensity variations between certain pixel arrays within the total data matrix. An area of certain contrast is defined by the differences between its average intensity and the surrounding intensity irrespectively of the overall intensity variations (background). The new detail filter of this invention provides the only tool available for selecting such local intensity variations independently from the other intensity variations within the full data matrix through only one parameter which is the intensity range (equal to cursor width or significant intensity range). Application of the filter with increasing intensity ranges selects from the image contrast components of specific visual information contents in a defined and principle manner which matches the visual pattern recognition mechanisms. In general, digital images represent two- (or three-) dimensional intensity maps which characterize the spacial x/y(/z) location of all contrast information. Successive smoothing of the intensity map with increasing intensity ranges and extraction and contrast enhancement of the intensity variations between the smoothed maps produces contrast patterns which have dramatically different visual impact so as to define specific different and characteristic information classes. Only three different non-random intensity variations are evident in any image, which characterize (1) large spacial image components (features) of high contrast and (2) small variations either of spacial (spacial details) or (3) intensity character (intensity details). In addition, smaller random intensity variations are perceived (noise). Visually not perceivable is a constant background intensity level (background) which has no spacial information due to the lack of contrast. The new definition of these discrete image intensity components is important since they are not spacially limited to certain image contents but can be used to characterize all spacial information of any image with highest spacial accuracy (including one pixel wide features). The intensity classes defined in this way match the visual information recognition principles and are therefore uniquely suited for the information analysis of images generated by scientific, microscopical, medical and industrial technologies. These technologies communicate specific information through a variety of contrast mechanisms, the origin of which is often non-visual and purely scientific in nature (phase shifts, diffraction and adsorption, electron spin modifications and any other way of distinguishing spacially related features from each other). However, when the information contents are displayed as visual images they must be translated into an intensity map recognizable by the visual system. Since the described detail filter of the invention generates all basic visual information classes it is best suited for information analysis, quantitation and communication of such technical images.

The ability of categorizing and quantifying image information also provides a tool for objective measurement of image quality. For this purpose, the intensity ranges (significant intensity ranges) of each image intensity class are proportionally distributed within the overall intensity range of the raw data in the sequence as generated and displayed by the detail filter: first the noise, then the spacial detail, the intensity detail, and the image feature/background. A graphic display of the image information components and their proportion within the intensity range as schematic intensity maps in an "information cube" facilitates visual image quality assessment (see FIG. 16). Either the proportion of the noise component to the adjacent intensity information of any width, or the relation of any component to any other or the overall intensity range provides an objective tool for categorizing images and image quality. Such graphic display of the image information content will facilitate image analysis and communication.

Based on the foregoing, it will be appreciated that important features of the smoothing techniques of this invention include:

(1) preserves the original dimensions (measured in pixels) of smallest details with an accuracy of individual pixels (pixel-accurate);
(2) is independent of the image content and image size;
(3) uses only one simple numerical parameter which describes the intensity threshold for the filter;
(4) minimizes processing artifacts; and
(5) can be performed at "near-real time" in order to overcome the limitations of conventional image evaluation.

Similarly, important features of the digital intensity enhancement technique of this invention include:

(1) image accurate (addresses spacial and intensity details);
(2) pixel accurate (does not change spacial dimensions at single pixel level, maintains the linear relation of image intensities, required for quantitation and pattern recognition); allows pixel accurate intensity processing (PAIP);
(3) independence from the image content (applies to all images); and
(4) one "processing parameter" (significant intensity range) with easy adjustment by visual control through "near-real time" processing.
(5) objective definition from the characteristics of intensity variations of image information classes which include a) image features, b) spacial details, c) intensity details and a random class of image noise.
(6) objective quantitation of image information and image quality using the proportion of each information class with respect to the full image intensity range.
(7) graphic display of image characteristic with an "Infocube" which presents a schematic view of the extent and proportion within the image intensity range of the information classes present in the image.

In accordance with another embodiment, enhancement of image detail contrast is accomplished by adding a differential hysteresis pattern to a digital image. The differential hysteresis image processing, described hereinbefore, utilizes the persistence of intensity variations (i.e., hysteresis) as means for data reduction and image detail contrast enhancement. Image hysteresis is determined by a hysteresis cursor of an interactively chosen hysteresis range, as described with regard to the above embodiments.

The above discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1A:
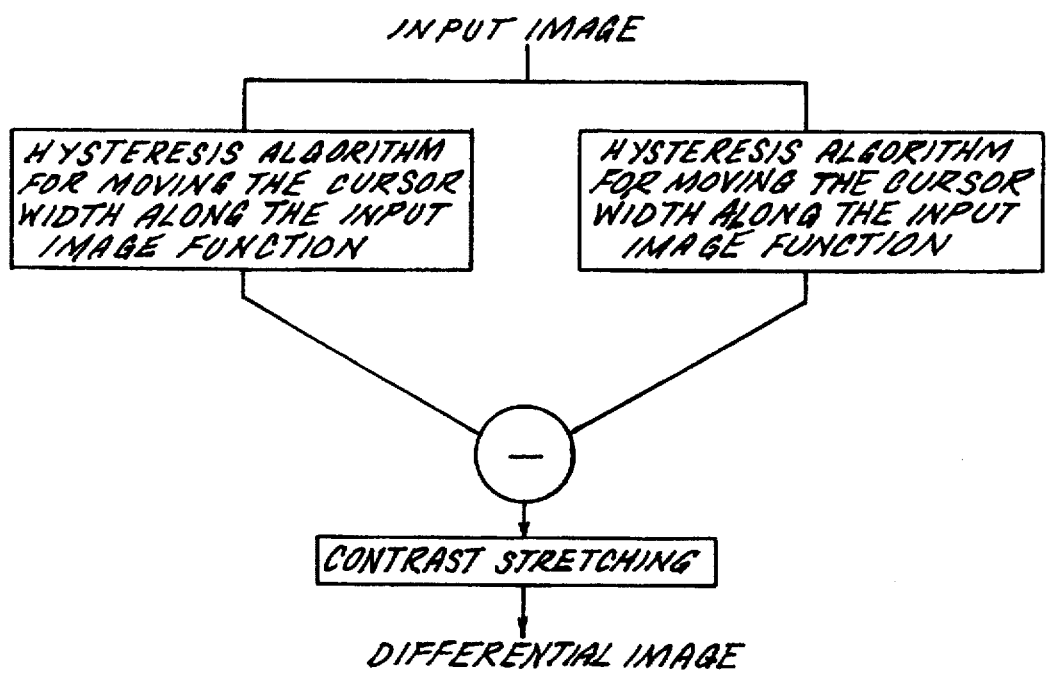
FIG. 1A a block diagram illustrating the process of the present invention.
Figure 1B:
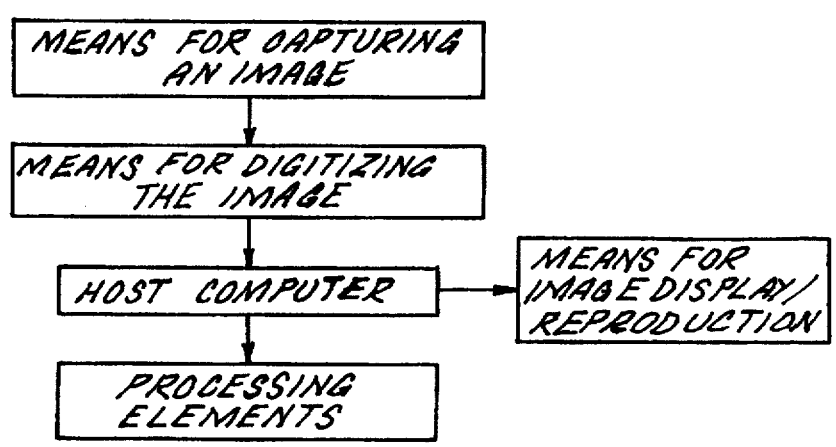
FIG. 1B is a block diagram of a system in accordance with the present invention.

The present invention comprises several related digital image processing techniques including a novel "smoothing" or "data reduction" technique which utilizes a two-dimensional hysteresis filter for noise reduction and a novel "intensity enhancement" technique which enhances the "smoothed" or "reduced" data for selected spacial details and intensity levels. The novel "smoothing" technique (which may also be used in the "detail enhancement" technique) will be described first.

I. TWO-DIMENSIONAL HYSTERESIS SMOOTHING

A. Prior Art One-Dimensional Hysteresis

The use of a "smallest one-dimensional mask" was suggested in the techniques of a "linear hysteresis smoothing procedure" Ehrich, R. W. (1978), A Symmetric Hysteresis Smoothing Algorithm That Preserves Principal Features, Computer Graphics and Image Processing 8:122–126). These techniques were developed for linear (one dimensional) spectral data, i.e., I/x (I=intensity at the point x along a x-direction). This prior art linear procedure uses a cursor of certain intensity height (cursor "width") which is moved along the data set. A fixed reference point on the cursor (normally its center) is used for determining the resulting intensity—i.e., the new intensity value at a specific point in x direction. The original data intensities are compared to the maximum and minimum value of the cursor and determined to be either outside or equal to/within the cursor width. In the first case, the cursor position changes and follows with one of its endpoints the data until the intensities are again within the cursor width. In the latter, the cursor intensity position is not altered until data values outside of the cursor values are again encountered, contributing to the smoothing effect.

These one-dimensional procedures produce a linear new data set which has reduced contrast with an overall intensity reduction by as much as one half of the cursor width (between smoothed areas and remaining data). However, it contains all of the sequences of the original data set where the data values were outside the cursor width. In between these regions, a new and constant value replaces regions where the intensity fluctuations were within the cursor width. These smoothed regions have an unchanged constant intensity of a value that has no relation to that of the previous or following smoothed regions and that is only dependent on the last intensity maintained from the raw data set. This is the reason why the procedure generates linear "streaks" of various intensity values. Behind high intensity features (top of cursor) a "top streak" is produced as well as a "bottom streak" at the level of low intensity variations (bottom of cursor). The length of these streaks depends upon the linear characteristics of the data set. In order to recover raw data which are obscured at the beginning of streaks (at the top as well as at bottom streaks), the linear (e.g., one-dimensional) smoothing technique of the prior art is performed in reversed direction, and both new data sets are arithmetically averaged maintaining their cross-registration.

The dual direction processing of the prior art has significant advantages and disadvantages. Since the maximum intensities of a structure ("top" and "bottom") are maintained when read in both directions, the height and position of the structure is maintained in the averaged data (only reduced or increased from the raw intensity by the value of the reference point on the cursor). At both shoulders of the structure, within the streaks, the slope of the raw data set is modified along the streak until again the raw data are read providing for the continuity of the smoothed data set. In some regions, the streak intensity may be different in both directions and an averaged "background" intensity will result. In order to minimize border artifacts at the beginning and end of the linear data set, at each start of reading, the cursor reference point is positioned on the original data value. If this procedure would put the cursor reference point outside of the total intensity range, then the cursor is positioned so that it stays at the maximum or minimum intensity value of the raw data. The disadvantage of this procedure is that the background streaks have no common reference and are strongly identifiable by their linearity independent of their intensity value. For one dimensional data, this is not a problem, since the visual system can easily interpolate all flat regions into a common varying background assessing its overall long frequency behavior.

Application of this one-dimensional smoothing technique to images have been attempted by reading and processing each line of an image data set independently and replacing the raw data by the averaged resulting intensity values. This procedure has been associated with disadvantages and problems and has produced serious image artifacts (Duda and Hart, 1973) which are not reduced even if the two-dimensional data set is read as one dimensional continuum in zig-zag fashion. The resultant image is full of large and wide streaks which totally disrupt the visual perception of the two-dimensional data.

B. The Present Invention—Two-Dimensional Hysteresis

The present invention utilizes a novel digital processing technique to fully reduce and minimize these "streaking artifacts" of the one dimensional processing of image data through the development of an automated "two-dimensional" processing routine which maintains all advantages of the one dimensional hysteresis approach and expands their utilization to two-dimensional data—i.e., I/x, y; I=Intensity (or any other ) values, x-, y-values= coordinates in x/y plane.

Since the intensity value of the top and bottom streaks depend on the last low intensity point of the raw data, and since this value can randomly fluctuate from noise, many different raw data end points must be generated and then averaged. This is not possible in one-dimensional data sets because of the lack of additional correlation of the data other than its one directional sequence. However, in two dimensional data, many spacial correlations can be generated within the two dimensionally defined image areas. One such correlation mechanism can be the direction in which the image data is read—i.e., the angle between the reading and the data axis. Other correlations may be found in spiral reading frames or alternating forward and backward directions or by any other way within the two dimensional image, which will address all image points and maintain their spacial correlation. Reduction or lack of sequential spacial correlation will weaken the smoothing effect of the procedure. The processing of an image of varying background levels after randomization and the derandomization of the processing product produces no smoothing whatsoever, but only a contrast reduction by a value equal to that of the effective cursor width demonstrating the requirement of spacial continuity of the data and the high sensitivity for the image content.

C. Implementation of Two-Dimensional Hysteresis Smoothing Technique

In a preferred embodiment, the two-dimensional hysteresis smoothing technique of this invention calculates smoothed pixels using a set of one-dimensional hysteresis lines at various angles running through each pixel in an image. The technique requires an input image and two parameters, (1) the number of hysteresis lines per pixel, and (2) the cursor width for the hysteresis algorithm. The program calculates an output image of the same size as the input image. In an actual implementation of this invention, a suitable computer program was written in assembly language for the $AP_x$ desktop massively parallel processor manufactured by Visionary Systems Inc. of New Haven, Conn. and described in detail in the paper entitled "The $AP_x$ Accelerator", E. Abreu et al, *Proceedings of the 2nd Symposium on the frontiers of Massively Parallel Computation*, Fairfax, Va., Oct. 10–12, 1988 IEEE Computer Society Press. It is called from a C language subroutine which runs on a PC-AT clone. The source code for both the PC-AT and the $AP_x$ is included in Table 1 below. The $AP_x$ parallel processor has up to 256 16-bit processing elements (PE's) interconnected in a mesh topology. Each PE has a fast 256 word on-chip data memory and a 65536 word off-chip data memory. The PE's all have access to a shared scaler data memory and a shared program memory. A single program is executed by all the PE's in lockstep (SIMD processing). The $AP_x$ uses a PC-AT clone as a Host computer, and the $AP_x$ off-chip PE memories are memory-mapped into the Host computer's address space.

Figure 1C:
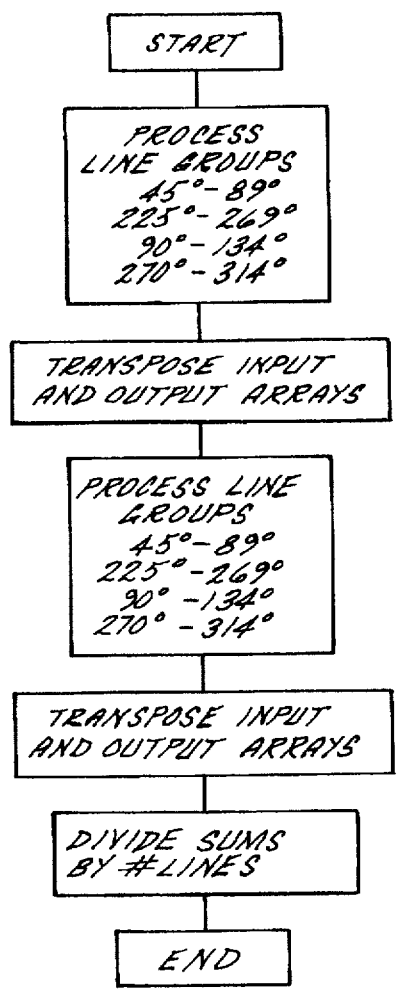
FIG. 1C is a flow chart depicting the smoothing technique of the present invention which utilizes a two-dimensional hysteresis filter for noise reduction.
Figure 2:
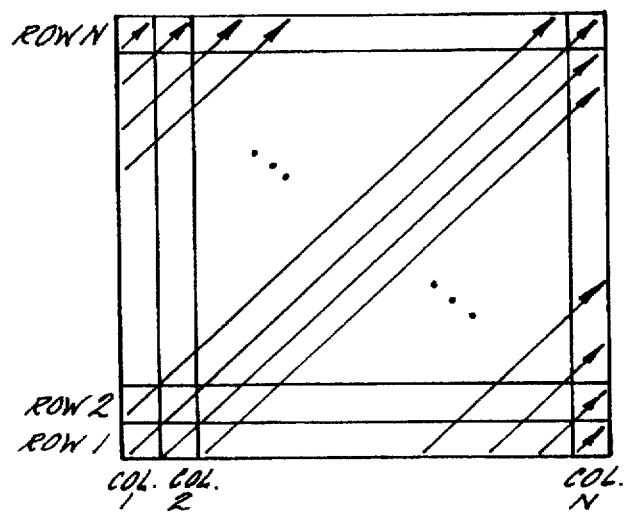
FIG. 2 is a diagrammatic example of 45 degree hysteresis lines covering an image.

A flowchart of the overall two-dimensional hysteresis smoothing program of this invention is shown in FIG. 1C. It performs eight passes over an input image, with each pass corresponding to hysteresis lines in a particular angle range. Table 2 shows the characteristics of each angle range. The actual hysteresis lines are at equally spaced angles around a 360 degree circle. For example, if the number of hysteresis lines is 16, there will be hysteresis lines at angles of 0, 22.5, 45, 67.5, 90, 112.5, . . . .270 and 292.5 degrees and they will be partitioned into eight angle groups of two lines each. FIG. 2 shows an example of 45 degree hysteresis lines covering an image. Each hysteresis line calculates an output value for each pixel in the image. The final output value for a pixel is the average of all the output values for that pixel.

TABLE 2

| Angles | Starting Edge | Direction |
|---|---|---|
| $0° <= \chi < 45°$ | Left | Right, Up |
| $45° <= \chi < 90°$ | Bottom | Right, Up |
| $90° <= \chi < 135°$ | Bottom | Left, Up |
| $135° <= \chi < 180°$ | Right | Left, Up |
| $180° <= \chi < -135°$ | Right | Left, Down |
| $-135° <= \chi < -90°$ | Top | Left, Down |
| $-90° <= \chi < -45°$ | Top | Right, Down |
| $-45° <= \chi < 0°$ | Left | Right, Down |

Figure 3:
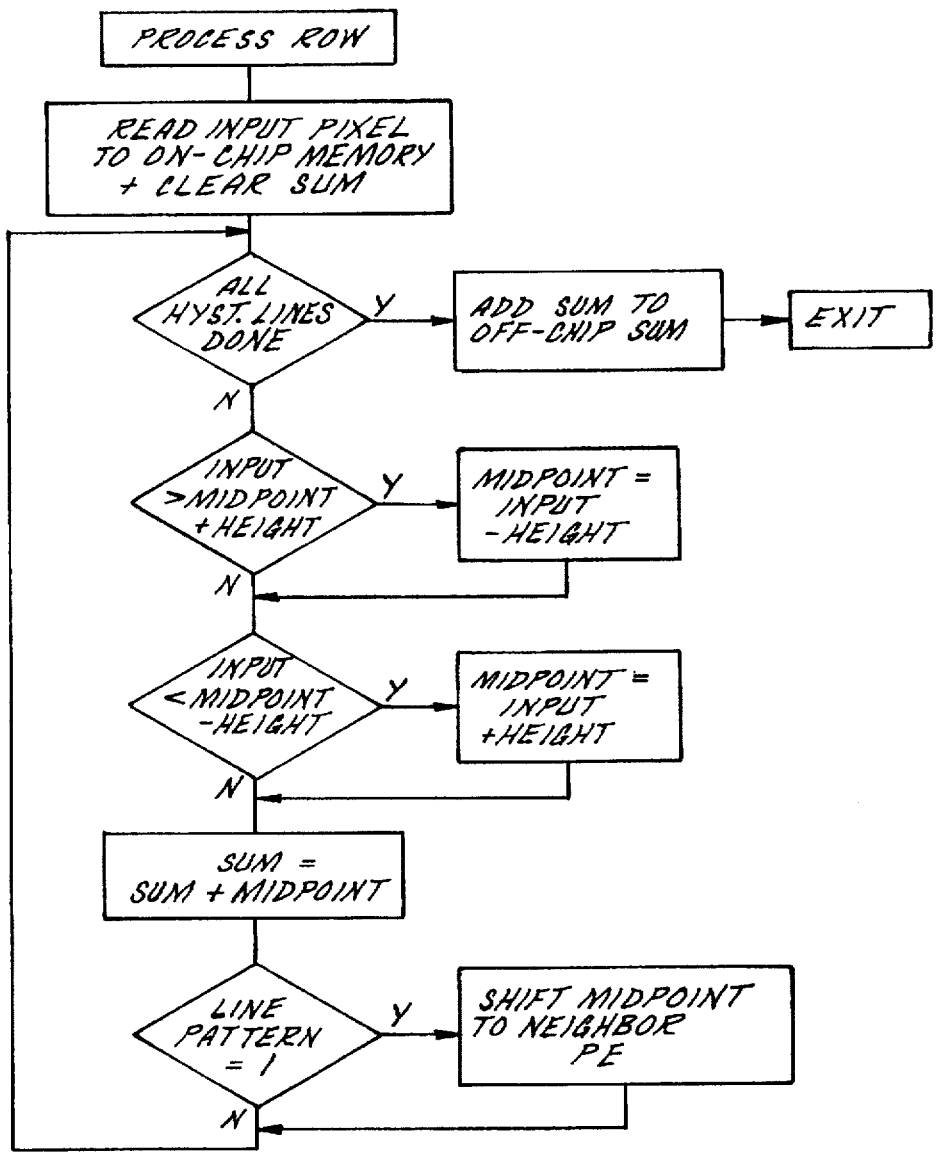
FIG. 3 is a flow chart of the "group" processing operation used in the smoothing technique of the present invention.

The program does one pass over the input image for each of the eight angle groups, doing the calculations for all the hysteresis lines within that group. A flowchart of the group processing is shown in FIG. 3. The program steps sequentially through the image rows beginning with the Starting Edge from Table 2. If the Starting Edge is either Left or Right, the input and output images are transposed before and after the pass, so that the program can step from row to row by incrementing or decrementing its memory address. Each row is read in turn and each hysteresis line in the group is applied to it. Hysteresis midpoints are then conditionally shifted to the left or right neighboring PE's, to maintain the correct angle of the hysteresis line, and the process repeats for the next line. The conditional shifting is based on the line patterns stored in the scaler memory.

The hysteresis calculation is as follows: if the input pixel value is less than the current cursor midpoint minus half the cursor width, the midpoint is changed to the input pixel value plus half the cursor width, if the input pixel value is greater than the current cursor midpoint plus half the cursor width, the midpoint is changed to the input pixel value minus half the cursor width. The output value for the pixel is the resulting cursor midpoint. This is added to the midpoints for other hysteresis lines applied to the same pixel. At the Starting Edge, the cursor midpoints are initialized to the input pixel values. When cursor midpoints are shifted off the edge of the image, they are re-initialized with the value of the edge input pixel. Initialized cursor midpoints are clamped to their valid range; from the minimum possible pixel value plus half the cursor width to the maximum possible pixel value minus half the cursor width.

Figure 4:
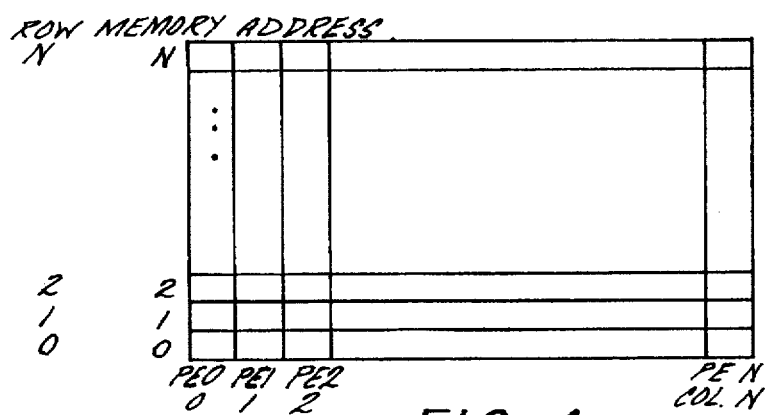
FIG. 4 is a diagrammatic representation of the data structures used in the smoothing technique of the present invention.

The input and output images are stored in the large, off-chip PE data memories. Each PE stores at least one column of the image in its memory as shown in FIG. 4. In this description, it is assumed that the number of PE's is the same as the number of columns in the image to be processed and that each PE stores one column from each row. If there are more PE's than columns, the extra PE's are simply disabled and do not participate in the calculations. If there are more columns than PE's, each PE does the processing and storage for multiple columns. During processing, each output pixel holds a sum of the values calculated by the hysteresis lines running through the pixel. The final output image is calculated by dividing the pixel sums by the number of hysteresis lines.

Each on-chip PE data memory holds cursor midpoints for all the hysteresis lines running through the current pixel in the current angle group. It also temporarily stores each input row as it is being processed, and the output sums for the pixels in that row.

The scaler data memory holds line patterns for sets of eight hysteresis lines. One line pattern represents eight hysteresis lines whose angles are offset in increments of 45 degrees. This pattern represents the angle of the hysteresis line in terms of vertical/horizontal and diagonal steps of one grid unit. It is used to control the conditional interprocessor shifting of cursor midpoints in the hysteresis processing.

The optimal number of iterations (of new reading frames necessary for artifact suppression) will depend on the raw data set and/or the cursor width. Insufficient averaging will produce visually destructive contrast jumps along the reading directions. Such artifacts are easily seen in straight (radial) reading directions and in images of non linear structural characteristics. Eight to thirty two different linear reading directions may be sufficient in reducing the artificial linear background intensity fluctuations so as to be non-recognizable by contrast analysis in average images even if small features of high contrasts are present. In addition, for the rare cases where streaks are persistent, sixty four to two hundred fifty six (or more) iterations are provided. The number of iterations required can be set automatically from the chosen cursor width according to a semi-empirical evaluation of effectiveness or from calculations using the selected cursor width and contrast properties of the image. However, other non-linear reading directions may be provided in order to distribute the background intensity fluctuations in such a manner that it will not be recognized by visual perception. Such a non-linear method may be applied to an unsatisfactory result of the linear method for the purpose of redistribution of the background intensity fluctuations into a non recognizable or non distracting pattern.

II. IMAGE INFORMATION ENHANCEMENT TECHNIQUE

A. Information Content of a Digital Full Frame Image

Figure 5:
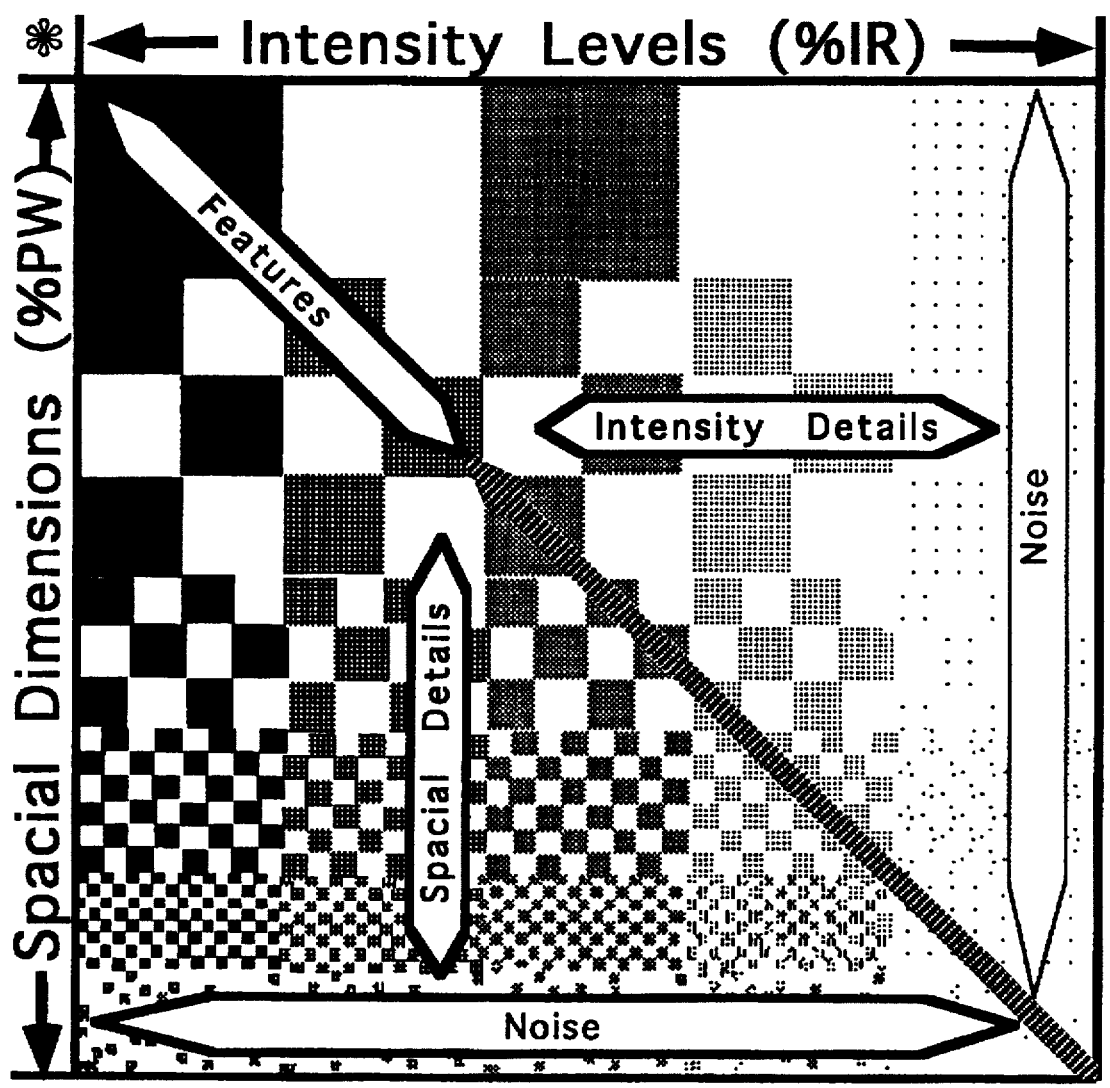
FIG. 5 is a graph depicting the relation of digital image information with visual pattern recognition parameters.

Referring to FIG. 5, the information content of a digital full frame image can be categorized into a non-random (structural) class of features and details, and a random class of noise. A feature is an image component accessible to visual pattern recognition, i.e., it is larger than ~10% of the picture width, has a contrast range of more than ~5% of the visual intensity range, and each must fall within no more than 15-20 intensity levels in order to be recognized as a pattern. All other structural image components are summarized as details. Using other visual pattern categories, small high contrast components (<10% PW, >5% BW) are characterized as spacial details whereas low contrast components of any size (<5% BW) are characterized as intensity details. In addition, digital images contain noise of various origins. Only the high frequency noise components at the level of a few pixels are visually perceivable as random intensity fluctuations. Other low frequency noise components, which have the character of intensity details, may be recognizable only after eliminating (averaging, smoothing) the high frequency components. Several properties make noise difficult to handle and reduce. In single data sets at the level of individual pixels, noise is indistinguishable from small spacial detail lacking a dominant pattern. Noise will also disrupt the integrity of larger structural components in proportion to its strength. Thus, if visually distracting noise components are reduced by smoothing, some detail will be lost. Additionally, if the noise has a Gaussian characteristic, some noise pixels of extreme intensities will always remain as well as some low frequency components.

Image evaluation of microscopy, radiological and other similar data requires that all image details are made to be identifiable by visual pattern recognition while maintaining the spacial relation of details within the overall image. This implies that low intensity details be contrast enhanced by a factor of 10-100 and that the smallest spacial details be enlarged by a factor of 10-20. However, for correlative image component evaluation, only three image processing tasks are required.

1. Detail contrast enhancement in full frame images;
2. Digital enlargements;
3. Noise management.

In general, the evaluation of an image's information content will require a sequence of image processing steps: first, in the full frame image after contrast enhancement, details will be recognized and cross correlated with image features; then interesting, enhanced details will be enlarged and analyzed; and finally, distracting noise may be reduced. If the image contains a high noise level, the noise is first reduced to a level at which the detail information can be easily recognized. However, such image processing must fulfill some stringent conditions in order to be effective and practical. The image processing techniques must avoid processing artifacts inherent to most common image enhancement procedures which distort the spacial and most of the intensity characteristics of details. Only pixel accurate enhancement techniques promote closer visual inspection by digital enlargement. In addition, the processing must be fast (close to real time) in order not to disturb the visual recognition process; it must be able to automatically accommodate all images independent of their size, depth and content, it must be exhaustive and objective to avoid missing any existing detail; and it must be simple and without any other input than a single factor, i.e., a "visibility enhancement factor".

On the basis of its pixel accuracy, digital image processing in accordance with the present invention can provide visual access to acquired digital image data at the level of instrumental image resolution by extracting and imaging intensity defined image information classes. This data reduction fosters visual pattern recognition. However, a new strategy for visual appreciation and communication of such data must be introduced because digital image processing displays information previously not always seen and utilized and thus not a part of our visual perception and pattern experience in a particular application. The image detail information provides a visual pattern similar to the common visual repertoire and an interpretation of this pattern is surprisingly simple since it correlates with intensity contributions to individual pixels of known instrumental contrast mechanisms. Therefore, the new visual image evaluation approach directly correlates the data with all other previously gathered information available (sample characteristics, microscope or instrumental performance and contrast mechanisms) and facilitates appreciation of even the smallest information detail.

Figure 6:
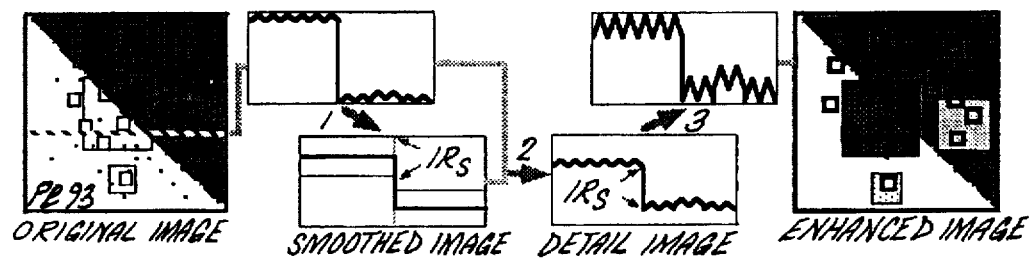
FIG. 6 depicts in Section "A" the principle approach for intensity information extraction; and in Section "B" a group of graphs depicting different types of intensity defined information including "noise", "spacial detail", "intensity detail" and "feature/background" which are contained in digital images and in Section "C" a schematic representation of the intensity extent of the various information groups.
Figure 6:
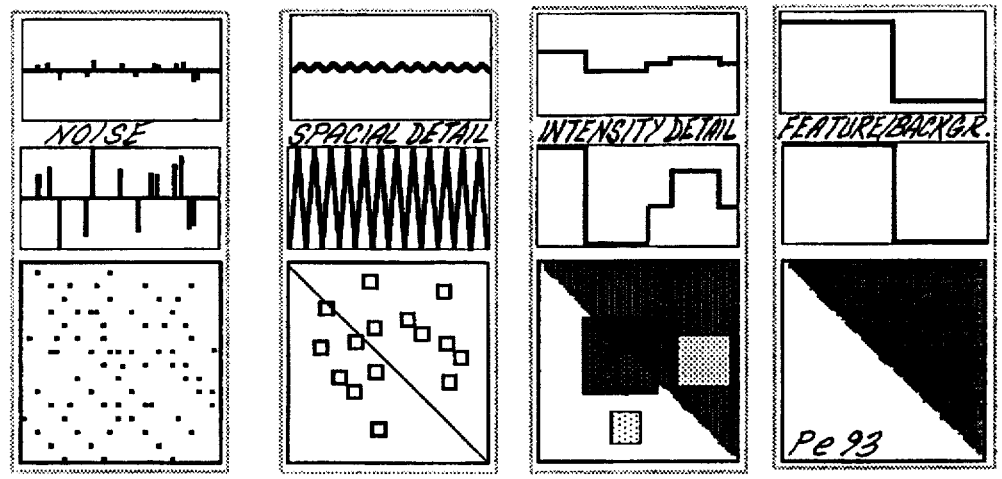
Figure 6:
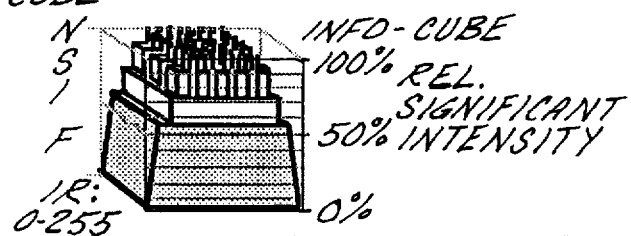

Digital image data sets are intensity maps showing the intensity at each pixel in a two dimensional array of pixels. Referring to FIG. 6, an intensity profile graphs this intensity along a line of pixels (FIG. 6, upper left box), and a series of intensity profiles outlines in a three dimensional graph the three dimensional "intensity profile" surface of the data in x and y direction. The intensities surface may vary in height and spacial extent indicating image components with certain spacial and intensity characteristics. Four different image components can be visually identified since they match basic visual perception patterns. Random intensity fluctuations over smallest distances (single pixels) are characteristic of "noise" (FIG. 6, bottom left box). In the three dimensional intensity profile surface, the noise pixels would appear as slender spikes or holes covering larger intensity components. The average intensity variation of noise (in Gaussian noise ±2 standard deviations {SD} similar to the typical bandwidth display of analog noise) occupies a significant intensity bandwidth ($IR_S$) which spreads through the intensity profile surface as an evenly thick outer layer. In high-quality data, noise occupies only a few percent (<10%) of the total intensity bandwidth too small to be visually recognized. However, extracting the noise component (FIG. 6, bottom left box; upper intensity profile) and contrast stretching it to the full visual bandwidth will make the noise pixels visible and identifiable by their spacial random distribution (FIG. 6 bottom left box: bottom intensity profile and map). In some microscopic data sets, noise is always dominant, e.g., in low dose imaging or in high magnification imaging. Sometimes, lack of contrast prevents acquisition of high quality data and will result in poor data quality (noise $IR_S>20\%$).

Homogeneous intensity variations over areas of many pixels are nonrandom and present the spacial information of the data. Depending on size and intensity characteristics, three major visual pattern types can be distinguished. Small low contrast components are summarized as "spacial detail" (FIG. 6, bottom middle box). If the components are uniform they will occupy an identical significant intensity range ($IR_S$) above the background intensity. In the three-dimensional intensity profile, the spacial details will appear as well defined small little "bumps" or "invaginations". Extraction and contrast stretching provide for easy perception of these details and recognition of the distribution pattern. In most image data sets, spacial details occupy only a fraction ($IR_S=2-20\%$) of the total intensity range. In some low magnification data, spacial details may be a dominant contrast component.

In general, small intensity variations (<5% significant intensity range) can extend over larger areas (FIG.6, bottom right box). These components represent "intensity details"

which in some data occupy only a minute fraction of the available intensity range. In the three-dimensional intensity profile, intensity details are recognizable as large flat elevations following contours of lager image components (features). Many weak contrast mechanism produce intensity details and their recognition is an important part of microscopy or other imaging services. Intensity details are the least accessible in analog imaging since the visual system cannot easily recognize large low contrast components which often do not provide shape edges. However, if extracted from the raw data and contrast enhanced, these data become strikingly accessible for image evaluation due to increased edge contrast. Linear contrast stretching will maintain proportionality between different intensity details and thus facilitate interpretation.

Finally, most image data have some large features which dominate the full frame image (FIG. 6, top right box). Their dominance comes from a nearly complete occupation of the available data intensity range. Nearly always, other details and noise are dwarfed by the feature's intensities and become hidden from visual perception since only few intensity steps remain for their accommodation. Extraction of these compressed details can recover their few intensity levels and linear contrast stretching will space the levels evenly over the full visual perception range fostering perception, pattern recognition and data appreciation. Other images may have a large intensity "background" without any intensity information which occupies a major portion of the intensity range of the data. Again, the background level reduces the image information contrast.

B. Implementation of the Image Information Enhancement Technique

The information extraction program in accordance with this invention creates an output image from two smoothed input images (or the original data set and one smoothed image). The smoothed images are preferably generated by the two-dimensional hysteresis smoothing program described above using two different cursor widths (but alternatively may be generated by a different pixel-accurate smoothing technique). The two input images must have the same number of rows and columns. The detail extraction subtracts the most smoothed image from the least smoothed image and then does linear contrast stretching on the result. In a preferred embodiment, a computer program implementing the present invention is written in assembly language for the aforementioned Visionary Systems $AP_x$ desktop massively parallel processor. It is called from a C language subroutine which runs on a PC-AT clone. The source code for both the PC-AT and the $AP_x$ is set forth in Table 3 (with the source code for the "smoothing" operation already having been set forth in Table 1). The $AP_x$ parallel processor has up to 256 16-bit processing elements (PE's) interconnected in a mesh topology. Each PE has a fast 256 word on-chip data memory and a 65536 word off-chip data memory. The PE's all have access to a shared scaler data memory and a shared program memory. A single program is executed by all the PE's in lockstep (SIMD processing). The $AP_x$ uses a PC-AT clone as a Host computer, and the $AP_x$ off-chip PE memories are memory-mapped into the Host computer's address space.

The image subtraction is done in one pass over the two smoothed images. The linear contrast stretching is performed in two passes over the output of the image subtraction. The first pass finds the minimum and maximum pixels values in the image. The second pass recalculates the output pixel values using the following equation:

$$q(x,y)=(p(x,y)-\text{minpix})*\text{maxval}/(\text{maxpix}-\text{minpix})$$

where "p(x,y)" is the initial pixel value, "q(x,y)" is the final output pixel value, "minpix" is the minimum pixel value in the image, "maxpix" is the maximum pixel value in the image, and "maxval" is the maximum pixel value. In the case where "maxpix" equals "minpix", "q(x,y)" will equal zero.

An important feature of the detail enhancement technique of the present invention is the use of the aforementioned process for two-dimensional hysteresis smoothing which avoids commonly encountered processing artifacts. The "smoothing" technique is applied for noise reduction and due to its unique pixel accurate design, maintains the spacial information of the smoothed image. The image details eliminated from the smoothed image may be recovered from the original image without loss of the detail pixel accuracy. Since the contrast range of the extracted detail is limited and falls into the cursor width applied for the smoothing, the contrast enhancement of the detail information becomes predictable. This is an important advantage since it allows the extraction and enhancement for any range of image details.

A second important and novel feature of the detail extraction and enhancement technique is in its ability not only to selectively extract details but also in extracting the contrasts of larger image features by as much as its cursor width. This observation has led to the definition of the present invention as detail enhancement in full frame images since the image information eliminated through the smoothing contains both the detail information and feature information. The portion of feature information is proportional to the cursor width. On this account, the image information recovered after smoothing (through subtraction of the smoothed image from the original image) can be contrast enhanced through only one step of linear contrast stretching and maintains in principle all image information. Therefore, the detail contrasts are more enhanced than the feature contrasts which are in fact first selectively reduced. Another novel feature of the present invention is the discovery that the contrast range of all extracted information (before enhancing) is exactly known (intensity range of the image minus cursor width), thus the contrast enhancement factor is predictable and easily established.

The defined contrast range of the extracted information leads to a third feature of the detail enhancement technique of this invention, "intensity slicing". Smoothing of the original data with two different cursor sizes allows extraction of the information difference between both smoothed images. This intensity slice has the same property as the extracted details: its significant intensity range is known and it contains a proportion of the feature information dependent on the applied cursor sizes. Thus, the information contained in an intensity slice can be displayed after linear contrast stretching. As discussed with regard to FIG. 6, the development of this new process leads to a new unique definition of the information content of digital images (as containing four different intensity defined contents, i.e., noise, spacial details, intensity details, and image features/background) which will have great impact on image communication, image analysis, pattern recognition and image quantitation. The data reduction to individual intensity information classes provides a new and unique tool for the analysis of image information and quantitation of the image information content and image quality. The application of this tool in digital image processing lead to the discovery that all known contrast mechanisms of any technical imaging equipment (microscopes, telescopes, photographic and video cameras, medical imaging technologies, etc.) establish one of the three basic intensity variations found as structural classes in digital images. In principle, every image information (structural component) must be acquired and documented with contrast mechanisms which generate specific intensity differences between image components and their surrounding. The contrasts may directly image the complete structural components, part of the components (phase contrasts, diffraction contrasts) or none, requiring a complete spacial reconstruction (interference contrasts of holograms). Each of these different image contrast types can only be established in a data set as one of the three non-random information classes. Therefore, the detail enhancement technology described herein can separate and extract different contrast types for the image data and present the specific contrast information as a separate image which is easily visually recognized and objectively quantified by its significant intensity range. Since the contrast types match the visual perception and recognition parameters, such extracted contrast information is easily visualized. Connectional visual quantitation is possible only in a limited and subjective way. However, image contrast quantitation now becomes possible through the measurement of the significant intensity ranges of each contrast type. The quantitation also allows the establishment of the intensity proportion of each contrast type with the other image intensity components including noise and intensity background. This procedure provides the first objective way for image quality assessment describing the proportion and extent of the intensity components of an image. A graphic display of the intensity ranges of each of the image components in an "information cube" (FIG. 23) allows easy visual access to the image quality. Commonly, the individual "detail information contrasts" have an intensity range of only a few percent of the overall intensity range, such detail can be extracted from high precision raw data of 10-bit to 16-bit accuracy and visually displayed on an 8-bit level without compromise of the raw-data accuracy. The new information enhancement technology of this invention thus makes possible a quantitation of the image information and provides objective criteria for image quality assessment. It makes possible objective image communication via electronic networks on "high speed highways" since accurate data reduction generates clearly displayed image information without any distortions or artifacts. It allows one to visualize at the precision raw data, selected intensity information (contrast types) in deep data of 10-bit to 16-bit.

The novel detail enhancement technique of this invention utilizes two-dimensional hysteresis processing for several unique enhancement purposes which are required for the accurate enhancement of image details and which are not addressed either by the noise management application of the technique or by any other commonly used processing techniques: pixel accurate extraction of spacial details with a defined and limited intensity range, and image-accurate scaling of detail intensity and determining of a single interactively defined output parameter for the enhancement. This image accurate "enhancement parameter" is chosen independently from the image content only in relation to the desired extent of detail enhancement. The detail enhancement filter has fundamental advantages over the conventional spacial processing principles (Oho filter, Sobel filter or homomorphic filters) since it uses a different, pixel accurate intensity processing principles for the selection, extraction and enhancement and which are independent of the image content.

III. EXAMPLES

The following nonlimiting examples further describe the two-dimensional hysteresis smoothing and detail enhancement digital image processing techniques of the present invention.

A. System Hardware

The hardware used for image processing provides for adequate high speed processing using a 486/66 MHz PC-AT host CPU and a high level PC based $AP_x$ parallel processing technology. The array processor (AP) technology is based on single instruction/multiple data (SIMD) architecture using an expandable system of 64 to 256 16-bit processors which provide peak instruction rates of 800–3200 MIPs. The individual processors are 16-bit RISC processors which can be software configured to 32-bit mode. IEEE format single precision floating point operations are supported in 32-bit mode with peak ratings from 40–160 MFLOPs. VLSI technology allows fast one-cycle communication of 32-bit numbers. The $AP_x$ processor boards fit into PC bus slots and provide supercomputer performance. Workstations of this type are commercially available from Visionary Systems, Inc. 25 Science Park, New Haven, Conn. The standard image format is square and the image is displayed together with a simple menu on a 20 inch workstation monitor with 1280×1024 pixel resolution and 120 Hz refresh rate (Hitachi CM2085MU SuperScan20 monitor, allowing full stereo display with a Stereographics CrystalEyes System). The monitors are provided with custom fitted anti-magnetic Nu-metal shieldings.

Image enhancement of a typical high quality image (1K× 1K 8–16 bit) requires 3 billion instructions per second (3000 mips). This requires supercomputer processing speed. For cost efficiency, ease of use, and portability of equipment, a PC based parallel processing system such as the aforementioned APx system constitutes an important feature of this invention. The aforementioned APx system processes 1600 mips and is therefore capable of processing an image in 2 seconds. A larger APx array will process the image much faster. A conventional smaller image (512 pixels 8 bit) is processed in less than a second. Such very short processing times (near real time) are provided only by a parallel processing system.

B. Noise Test Pattern Examples

Figure 7A:
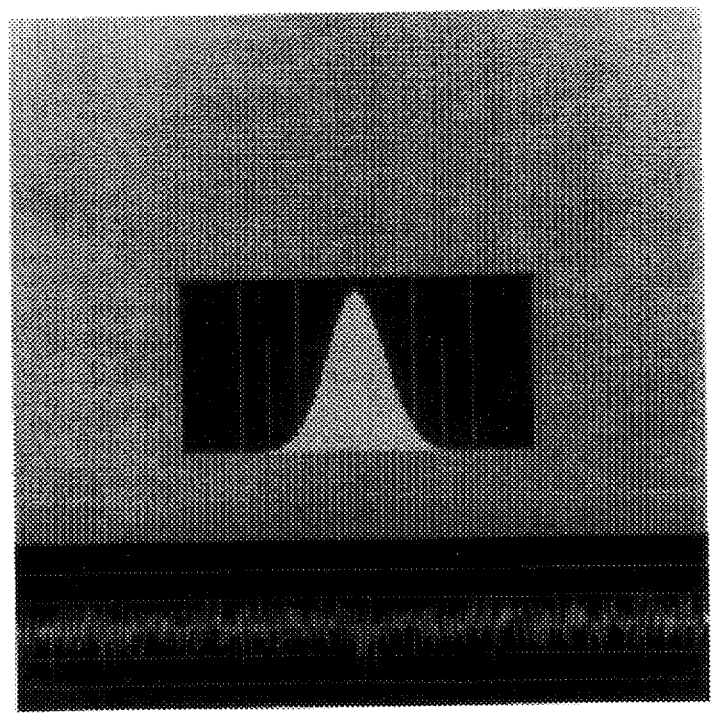
FIGS. 7A-F depicts a test pattern of Gaussian noise having been processed using the noise smoothing technique of this invention with and without prior randomization of the image.
Figure 7B:
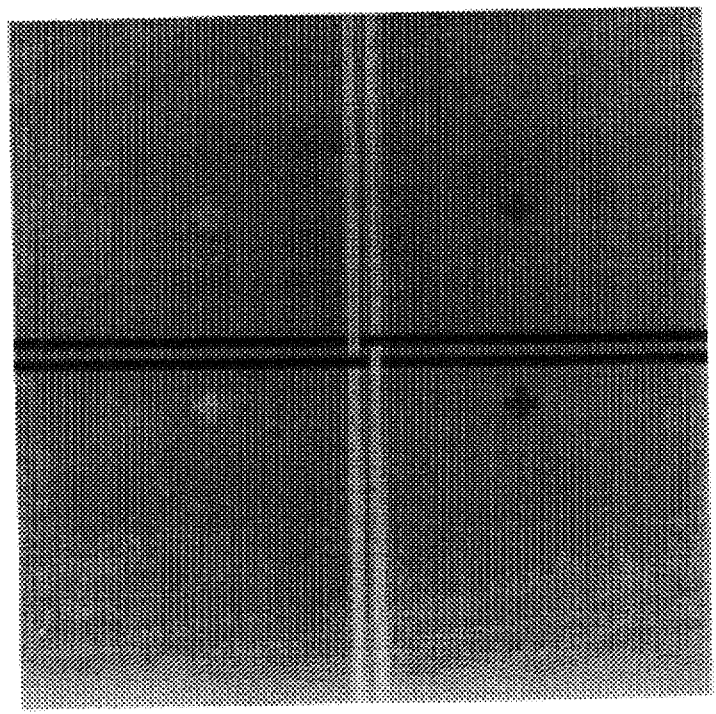
Figure 7C:
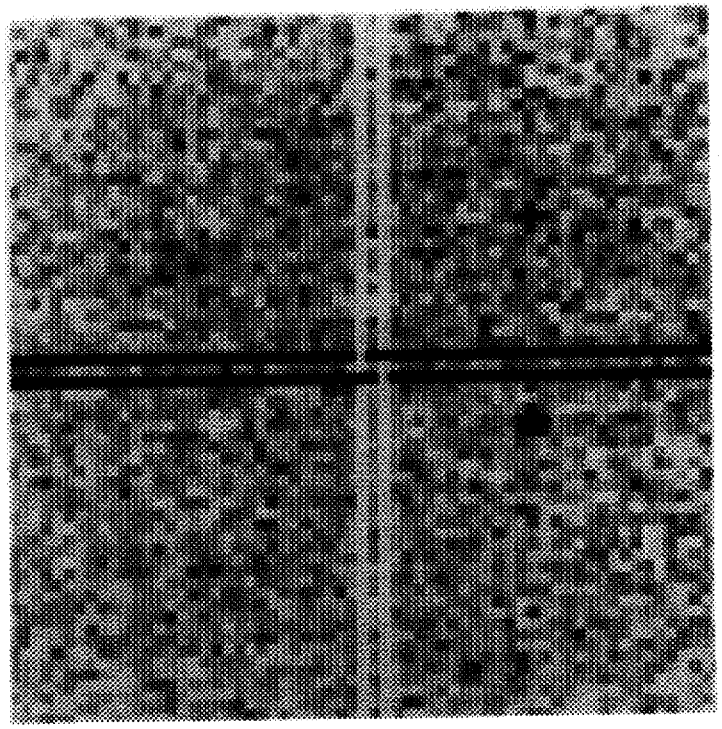
Figure 7D:
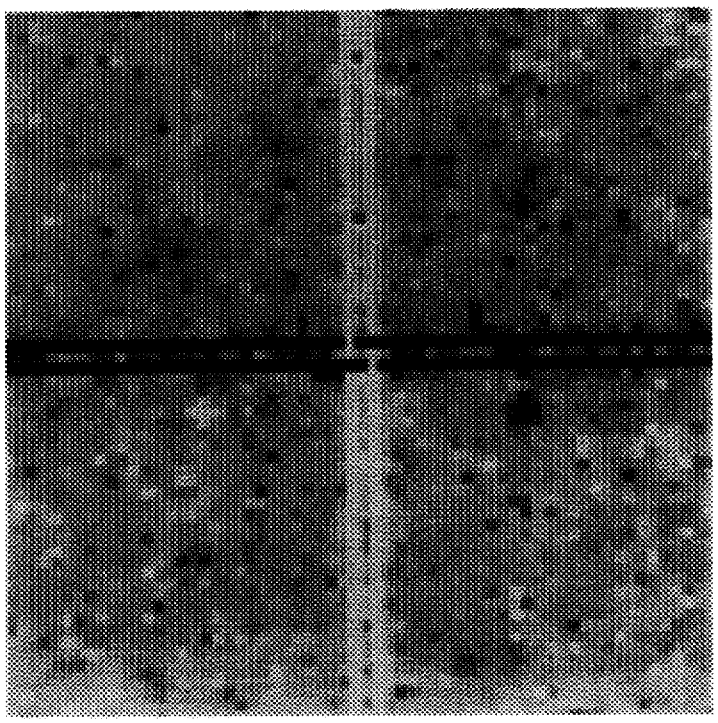
Figure 7E:
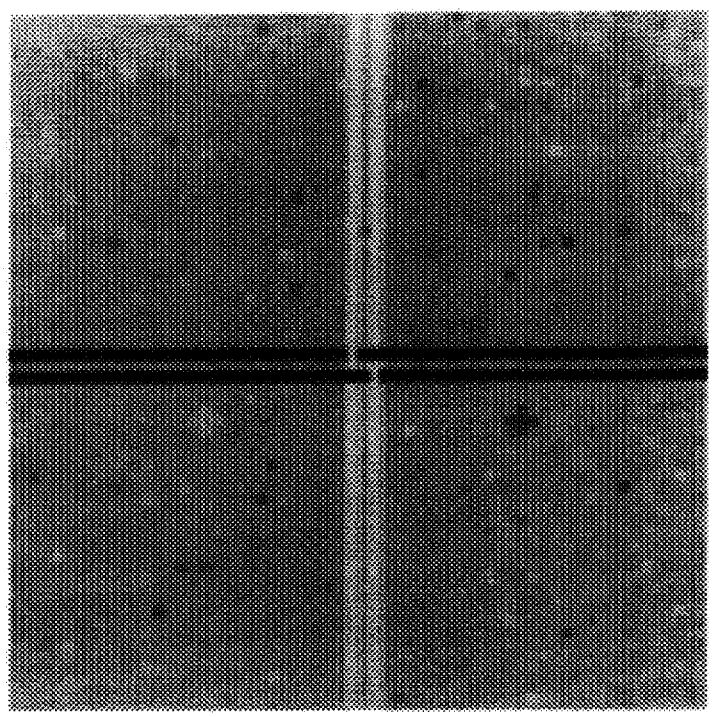
Figure 7F:
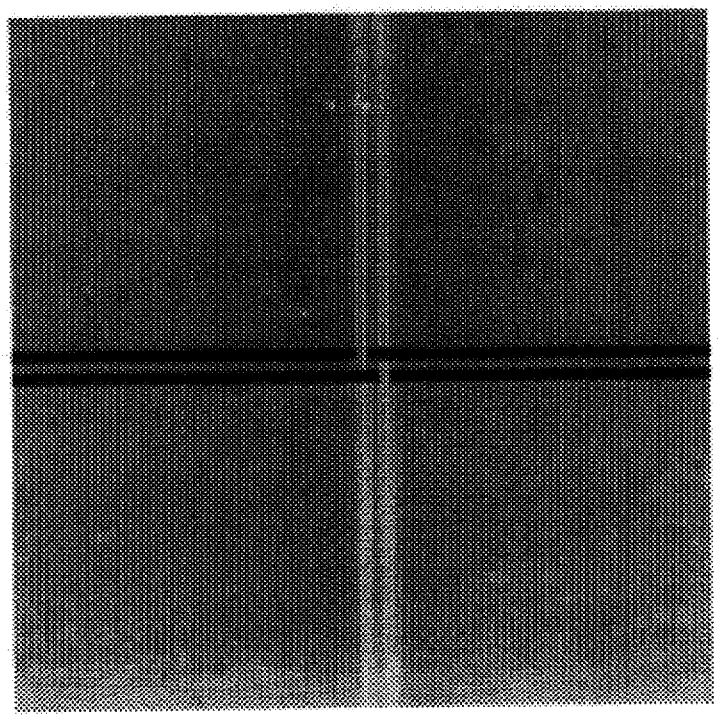
Figure 7G:
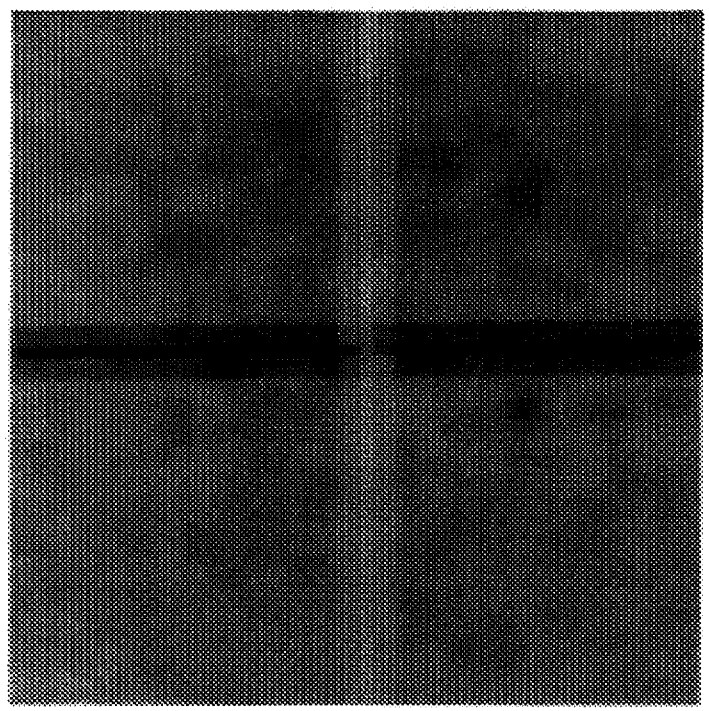
FIGS. 7G-H depicts a test pattern of Gaussian noise and conventional noise reduction techniques.
Figure 7H:
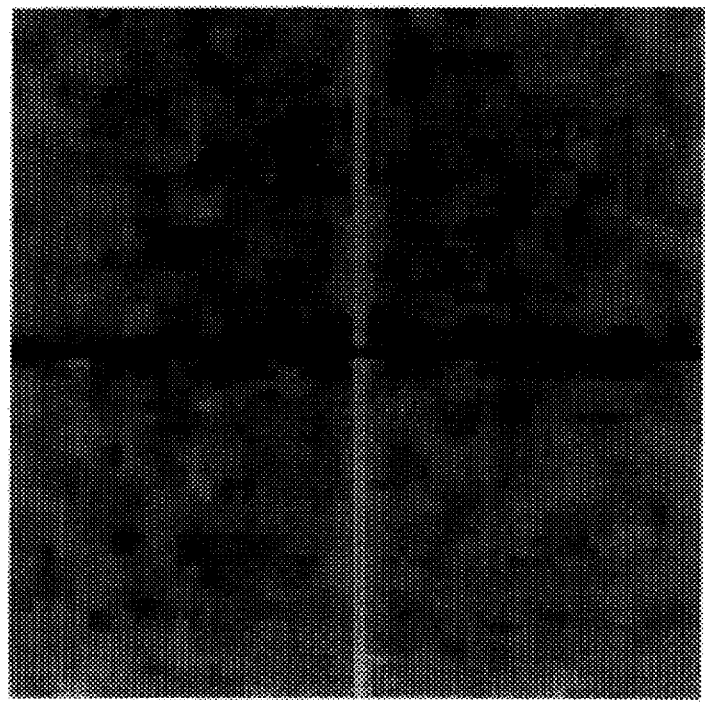

The noise smoothing capability of the digital process imaging of this invention can be demonstrated using a test pattern derived from Gaussian noise of ±4 standard deviations (SD) width (1024×1024×8 bit, mean pixel value of 127, minimum and maximum pixel values of 43 and 211, standard deviation of 21, and 0.0001% clipping accuracy) (FIG. 7A). A superimposed spacial test pattern consisted of only one pixel wide features, i.e., two perpendicular double lines of 0 and 255 intensities, and two sets of small crosses of either ±2 SD (top half) or ±3 SD (bottom half) intensities (FIG. 7B: 16× enlarged by nearest neighbor zoom). Processing of the complete test pattern, superimposed onto the noise (FIG. 7C), with the "smoothing" technique of this invention (FIGS. 7D–F) preserved all significant spacial features and smoothed the background with increasing significance factor (cursor width) which may be set depending on the level of required processing. At a ±1 SD intensity level processing, all features (crosses and double lines) and noise pixels of higher flower intensity values were maintained without distortion of their spacial integrity (FIG. 7D). All lower-frequency noise components were maintained and were recognizable in a spotty pattern. Smoothing at ±2 SD eliminated only the ±2 SD crosses and all pixels within that significant intensity range (FIG. 7E) and were dramatically improved (10 times) in their signal to noise (S/N) ratio. Finally, detail enhancement processing at a ±3 SD level (FIG. 7F) eliminates all noise and crosses but the double line feature. For the two latter processing examples (since the image has an even median intensity background), the noise image was first randomized prior to processing and then afterwards derandomized. Only intensity oriented "PAIP processing" in accordance with this invention can maintain the significant image content; all prior art spacial processing will corrupt the randomized data and not preserve all spacial features (FIG. 7A–H). Neither conventional "averaging" (FIG. 7G: 3×3 mask with center weight 1) nor conventional median filtering (FIG. 7H: 3×3 mask) maintained the test features' spacial integrity. Commonly, noise reduction algorithms utilize spacial masks (in the space domain or Fourier filters) and may produce spacial distortions of image details at a maximum level set by the mask or filter size. The PAIP technique of this invention maintains the spacial integrity of image details at the precision level of the raw data (pixel level) and thus is ideally suited for image processing in microscopy, radiology, astronomy or technical applications in which the primary objective is detail acquisition and evaluation.

C. Microscopy

Microscopic data evaluation concerns the recognition of contrast mechanisms which allow deduction of specific specimen properties. The raw data display such contrasts as spacial intensity variations with a characteristic significant intensity range and spacial distribution. In some cases a direct visual interpretation of contrasts is possible, in other cases reconstruction of spacial properties is required. However, in all microscopic data analyzed so far with the new intensity processing technology of this invention, the pertinent contrast information was present only in a very small significant intensity range of 1–10% of the overall intensity range of the data. The majority of raw data contained a high noise component which was as large or even larger than the high precision contrasts making intensity slicing necessary for separation of noise from pertinent spacial data. Sometimes, the relevant data was buried deep within the intensity profile. No other known image processing technology is able to recover this information automatically and produce a complete image without any spacial or proportional intensity distortions.

1. Scanning Electron Microscopy

Many microscopic data sets contain large dominant image features which occupy most of the image intensity range leaving little room for contrasts of image details at the level of the instrumental precision (single pixels). This is especially true for low magnification scanning electron microscopy (SEM). One of the superior capabilities of SEM is low magnification imaging of large specimens with high depth of field. However, at low magnification (<1,000×), on large objects very strong signal "collection efficiency contrasts" are generated which are more or less independent of local electron beam-specimen interactions. The presence of these detector dependent contrast mechanisms was well known and their utilization for image creation was well perfected with multi-detector systems. However, their extent could not be quantitatively assessed. Moreover, low magnification images, commonly lacking detail contrasts, were commonly used only for the communication of the large image features. Local small contrasts generated by electron beam-specimen interaction could only be utilized at higher magnifications where collection efficiency contrasts produced a signal, empty of spacial information, background reducing the image quality (signal/noise ratio). PAIP image enhancement revealed that all expected local contrasts were generated and collected at low, as well as at high, magnification but that detail contrasts were compressed in inverse proportion to the extent of the feature contrasts or background level. In addition, the visual recognition of local, small intensity variations was reduced in close proximity to large bandwidth intensity variations. PAIP image enhancement in accordance with the present invention provides an easy and fast procedure for adjustment of the proportion of detail and feature/background intensity range by interactively reducing the latter and visually evaluating the effectiveness.

(a) Conventional Scanning Electron Microscopy (SEM)

Figure 8A:
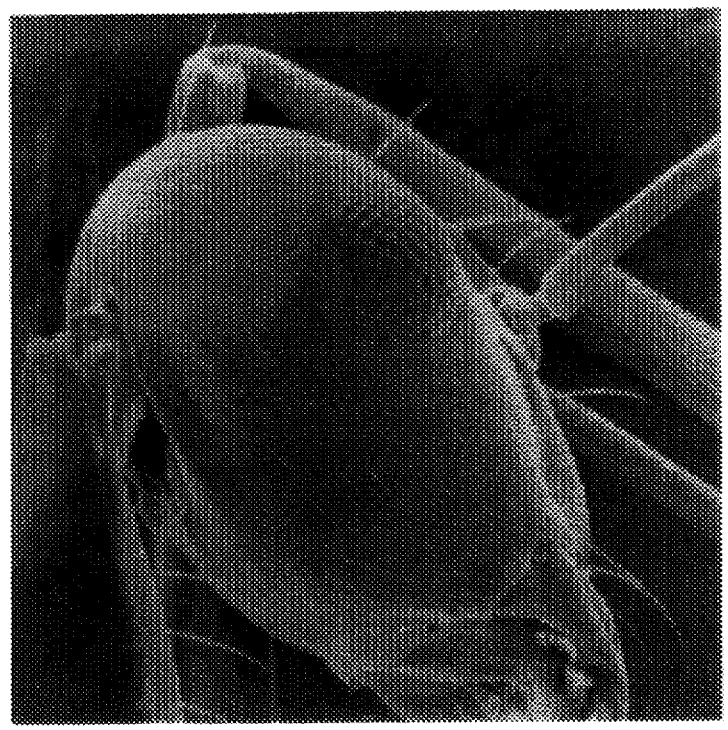
FIGS. 8A-H are images of low magnification SEM data depicting the information classes and pixel-accuracy of the detail enhancement using the detail enhancement techniques of this invention.
Figure 8B:
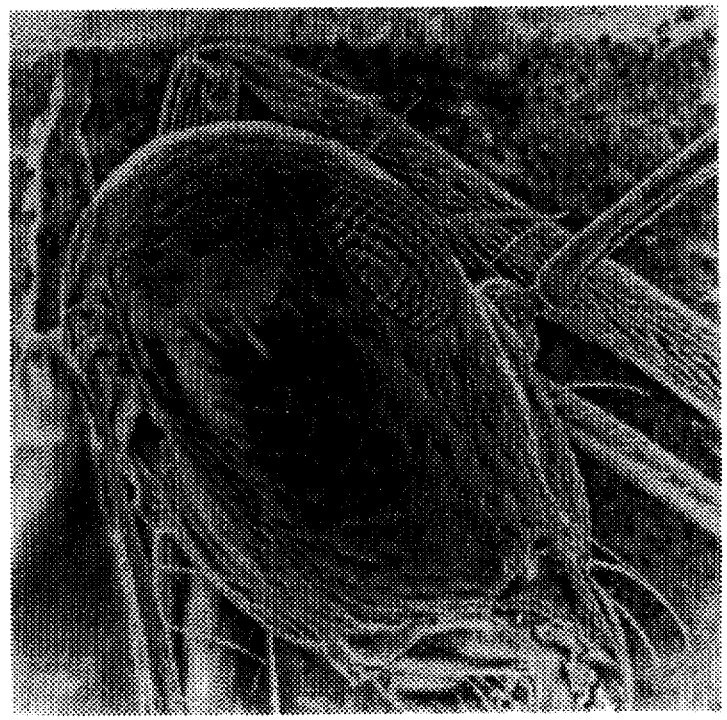
Figure 8C:
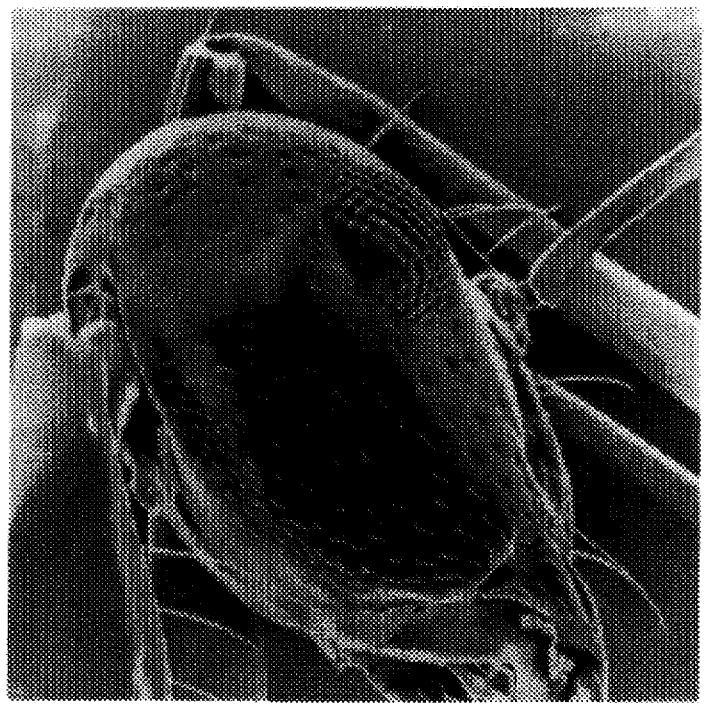
Figure 8D:
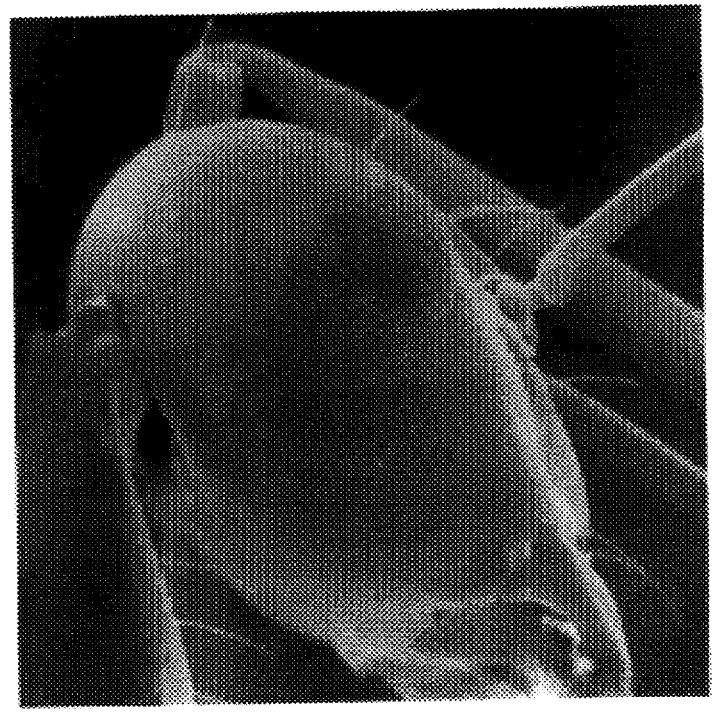

The conventional SEM image of an ant head (FIG. 8A) occupied the full intensity range (IR=0–255) and left little room for the detail contrasts produced by local electron beam specimen interaction. This high precision electron beam information was contained as spacial detail information (FIG. 8B) within a significant intensity range ($IR_S$= 1–35) of only 14% of the overall intensity range. The contrasts were comprised, distorted and reduced by signal collection efficiency contrasts of two origins. Firstly, local specimen-dependent charging phenomena modified the signal yield producing an intensity variation at the samples surface summarized as "charging contrast" (FIG. 8C) which were imaged in the intensity detail slice ($IR_S$=35–71). Secondly, local detector-dependent "detector contrasts" (FIG. 8D) produced an overall topographic aspect of the large feature ($IR_S$=71–256). The latter signal component was produced by backscattered electrons at the pole piece of the microscope and was well characterized for producing the overall low magnification image aspect in conventional SEM. However, the collection efficiency contrasts lead to a reduction of the detail contrast which were only recognizable on a background of middle gray levels and were fully absent in the saturated high and low intensity areas of the feature (ant head).

Figure 8E:
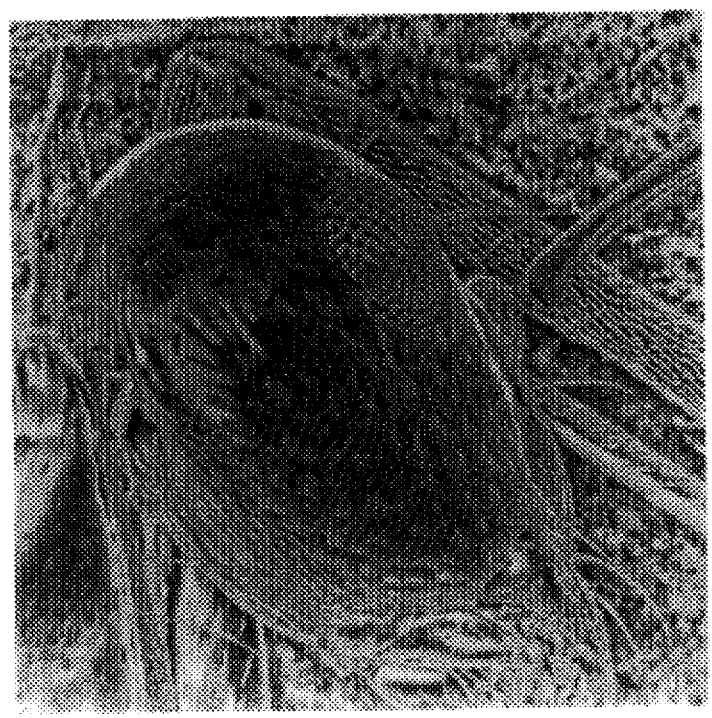
Figure 8F:
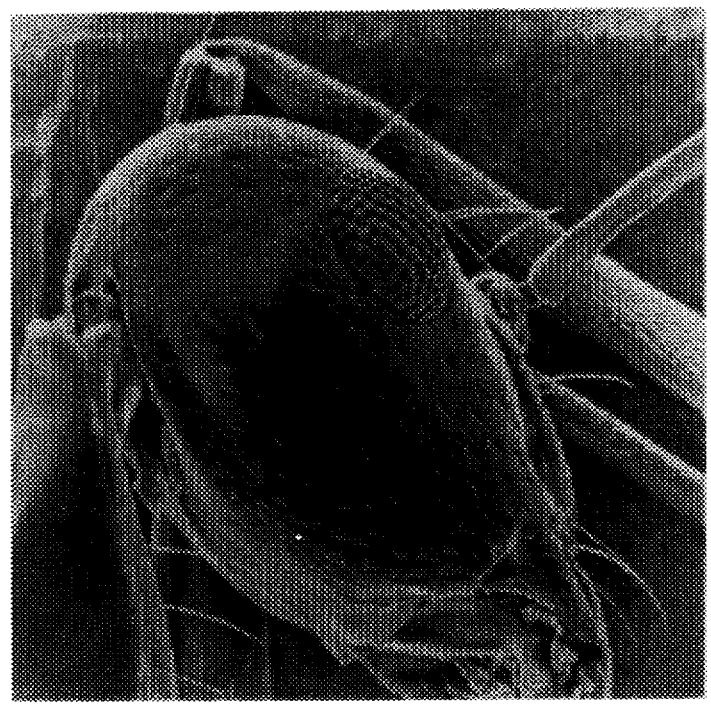

Image enhancement with stepwise reduction of the significant intensity range lead to a reduction of the feature contrast and to an inverse proportional increase of the detail contrasts. An over 50% reduction (FIG. 8E) maintained the major feature contrasts but visibly increased much smaller detail contrasts within the whole image preserving the overall character of the image features but also emphasized most of the image details ($IR_S$=1–100). Notably, the signal collection efficiency contrasts were reduced and the electron probe induced contrasts were somewhat enhanced. A further reduction of the significant intensity range to 6% of the overall image intensity range ($IR_S$=1–15) finally led to a dominance of local electron beam scattering contrasts (FIG. 8F). The image quality changed dramatically once the electron beam induced contrast mechanisms were visualized. Especially, intensity details (micro-roughness) contrasts on the specimen support and spacial details (edges along the chitinous plates covering the animal, and smallest hairs and bristles) became dominant. The enhanced image proved that the electron probe was capable of detail imaging despite an overwhelming contrast range produced by other mechanisms. Quick adjustment at the significant intensity range in the overall intensity or an intensity slice was essential for seeing what signals the electron probe was generating and thus promoted contrast interpretation.

Figure 8G:
Figure 8H:
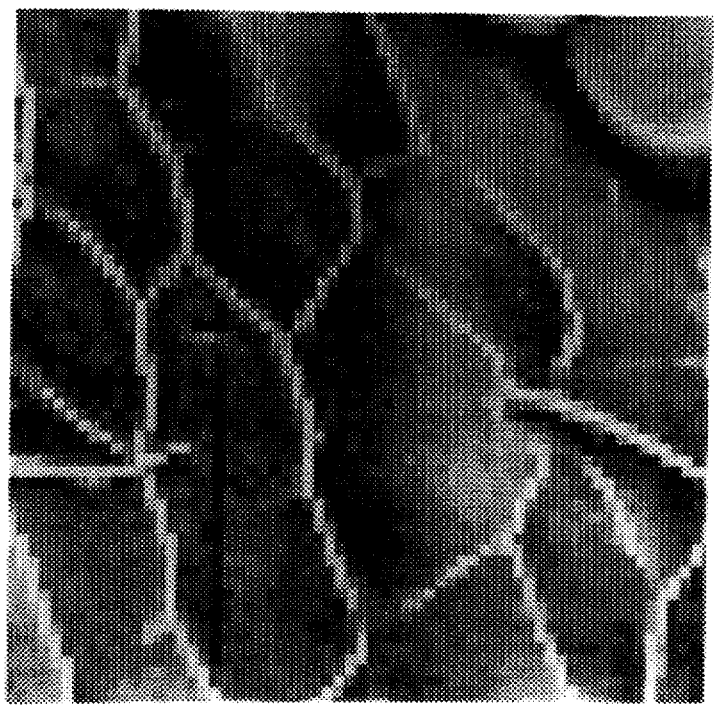

Detail evaluation by digital magnification was facilitated if the image's intensity range was appropriately adjusted to the size of dominating contrasts. Since the raw data was nearly free of noise ($IR_S$ of less than 1%) and the spacial detail was contained in a relatively wide intensity range, detail evaluation was performed at an intensity slice of $IR_S$=1–15. (see FIG. 8F). FIGS. 8G–H depict digitally enlarged (16× by nearest neighbor zoom for visualization of the individual pixels) details (just underneath the eye) of the raw data and the selected intensity range ($IR_S$=0–15). The enhancement revealed truthfully (pixel accurate) fine structures and minute contrasts produced by the electron probe on the sample surface expanding scanning electron microscopy to scanned electron probe microscopy. Besides spacial information, small topography contrasts (relief contrasts) became identifiable. Comparison of the enhanced data with the raw data for the interpretation of structural detail was possible by flipping between both images with the stroke of one key of the keyboard. It proved that no spacial or intensity artifacts were observable even at enlargements of 10–20 times. Every detail seen in the enhanced images was present in the original data set but with lower contrasts.

(b) Medium Magnification Field Emission SEM (FSEM)

In SEM at medium magnification, a possible low magnification feature contrast converts into an empty background signal which has adverse properties similar to that of the large features, i.e., it compresses the microscopic specimen-specific contrasts inversely proportional to its size. The lack of high precision spacial information limits the optimizing of SEM application in important areas as found in industrial R&D and semiconductor failure.

Figure 9A:
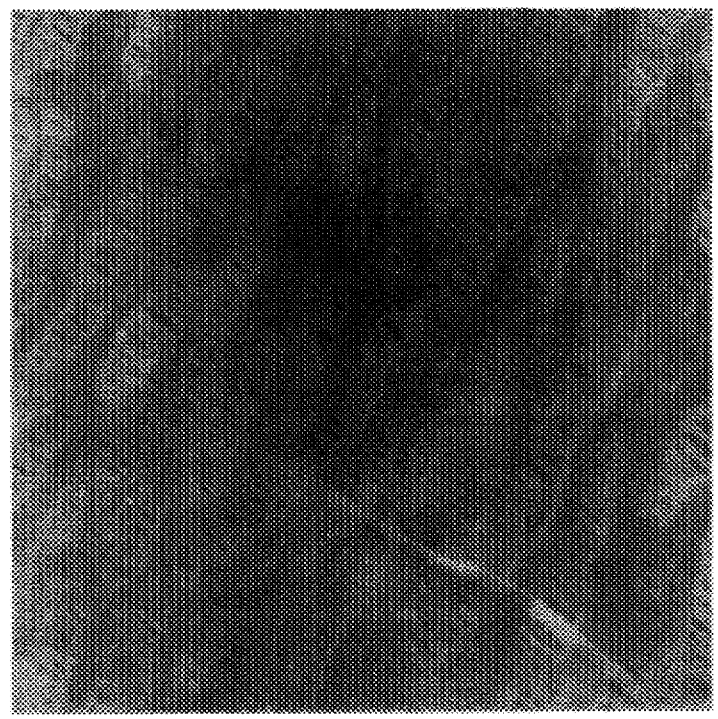
FIGS. 9A-B are images of high magnification SEM data having been processed using the detail enhancement techniques of this invention.
Figure 9B:
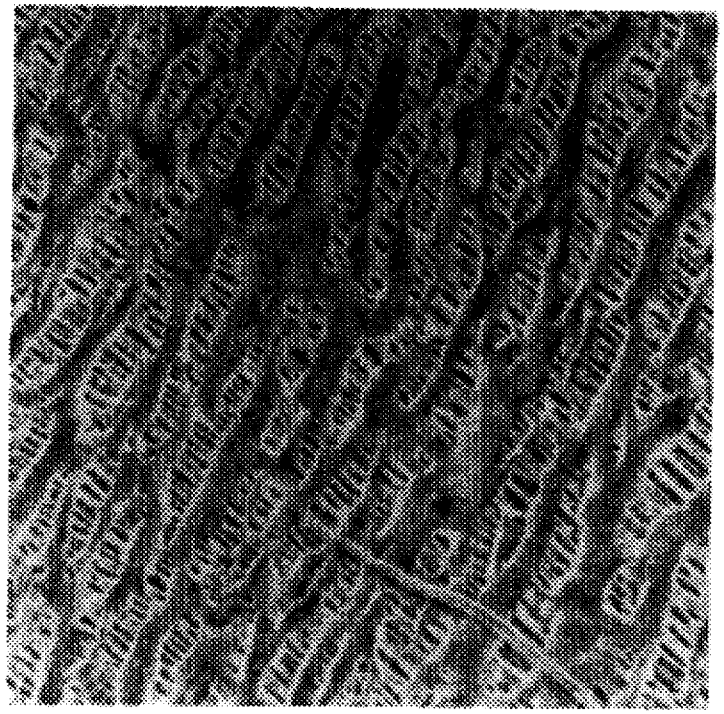

For evaluation of the porosity of polypropylene filters, thin metal coating (3 nm Pt), high acceleration voltage (30 keV) and 20,000× magnification were required, but signal-to-noise and all image contrasts were week (FIG. 9A). An intensity slice within the intensity detail of only 2% width ($IR_S$=21–27) reduced effectively the noise component and enhanced the material contrasts (FIG. 9B) so that the pore volume became easily quantifiable. The selective extraction of this contrast allowed the reduction of noise and charging contrasts and the full recovery of the spacial high precision information generated by the electron problem on this difficult sample.

Figure 10A:
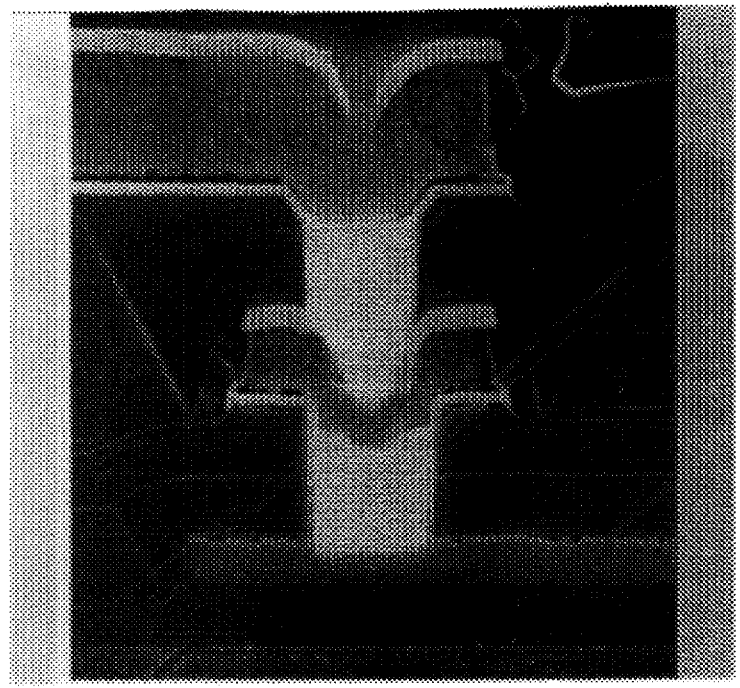
FIGS. 10A-B are images of high magnification field emission SEM data having been processed using the detail enhancement techniques of this invention.
Figure 10B:
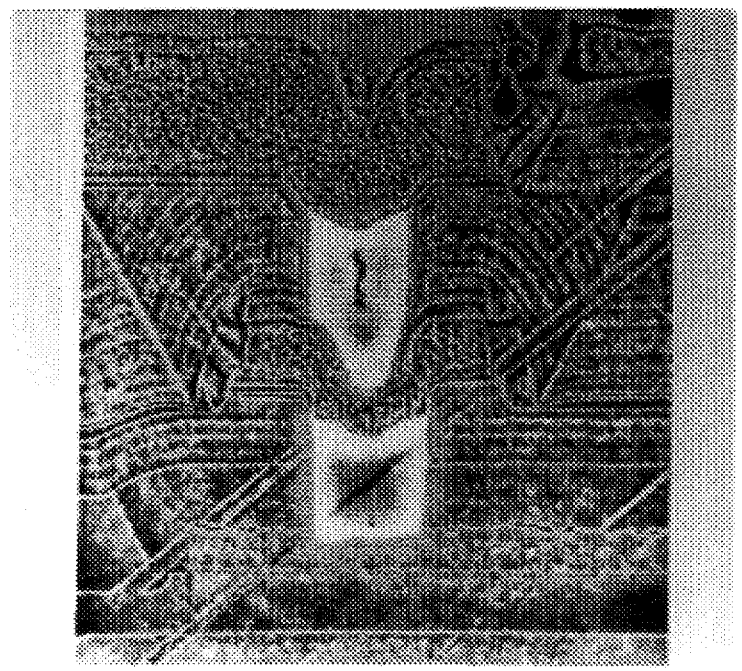

Similar constraints are encountered at medium magnification imaging for failure analysis in the semiconductor industry. In this application, cross sections of devices were polished, slightly etched and successively coated with 3 nm of Cr. Imaging at high performance conditions (30 kV, field emission electron source) produced only weak detail contrasts (FIG. 10A: 2× bicubic zoom) which did not allow an identification of the device architecture. An intensity slice underneath the noise component of only 4 intensity steps ($IR_S$=7–11) included all spacial detail of the raw data and revealed the cross section's topography in short range contrasts at the precision level of the electron beam (individual pixels) (FIG. 10B). Such enhancement is invaluable for routine FSEM application.

(c) Low Voltage Field Emission SEM (LVFSEM)

Figure 11A:
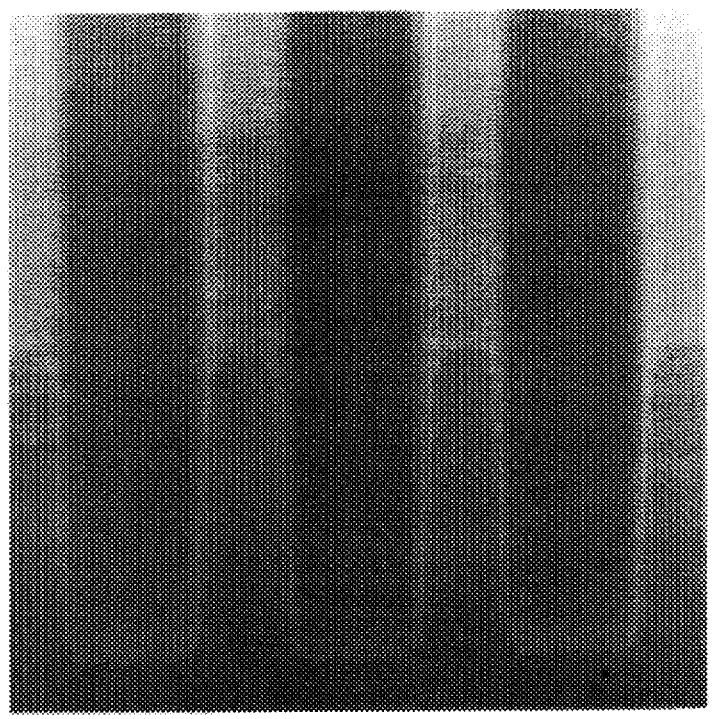
FIGS. 11A-B are low voltage field emission SEM data having been processed using the detail enhancement techniques of this invention.
Figure 11B:
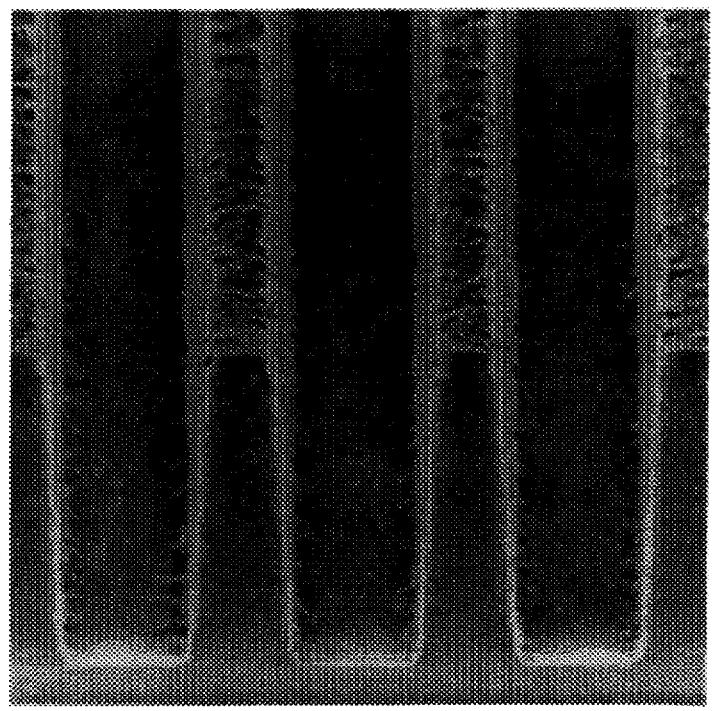

In on-line production control in semiconductor manufacturing, cross sectional line width measurements are performed routinely with low voltage field emission scanning electron microscopy (LVFSEM) since it allows imaging of non-conductors with increased over-all contrast. However, the resulting high magnification images revealed only low high resolution (short range) contrasts reduced by a background from the dramatically increased long-range signal (FIG. 11 A: 2× bicubic zoom). In resist on polysilicon cross sections, pertinent details at the base and top of the resist lines were not evident. Despite a high noise level, fine structural detail was recovered from 5% of the over-all intensity range ($IR_S$=13–25) excluding the noise component (FIG. 11B). Since the detail enhancement is pixel-accurate, direct manual or automatic measurement of the line width becomes possible without the need for any further image processing.

(d) Environmental SEM (SEM)

Figure 12A:
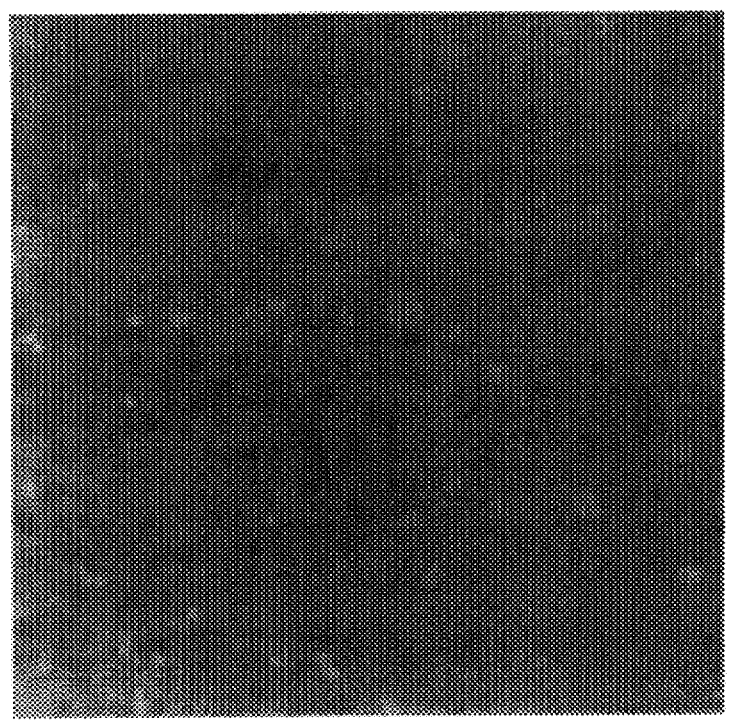
FIGS. 12A-B are environmental SEM data having been processed using the detail enhancement techniques of this invention.
Figure 12B:
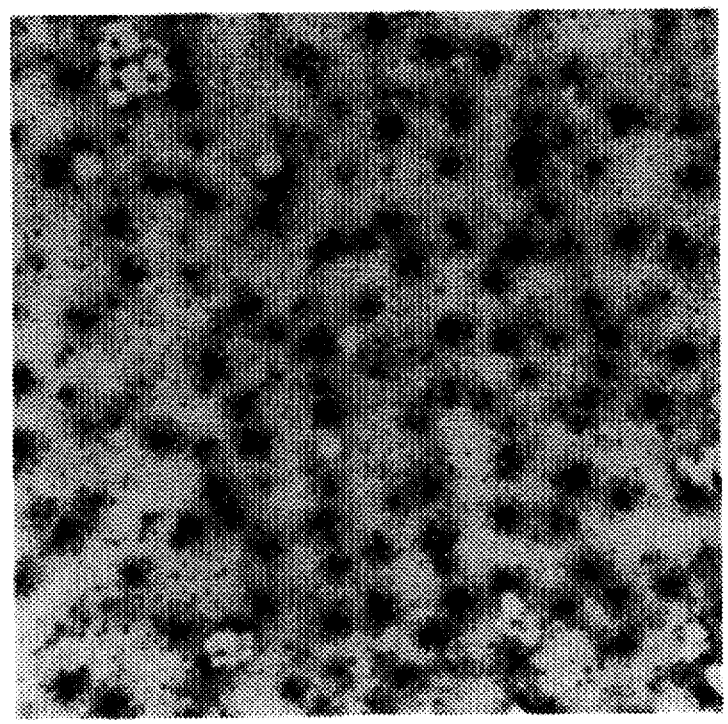

The new low vacuum SEM technology images non-conductors and wet surfaces, both often consisting of samples with low mass density and low signal yield. Higher magnification images therefore are limited by a very large noise component in addition to the common large signal background component. At medium magnification (20,000× and 20 kV), latex spheres on a fully hydrated plastic filter were imaged only with weak contrasts (FIG. 12A: 2× bicubic zoom) obscuring the interaction of the spheres with the filter's pores. Using a narrow intensity slice ($IR_S$=13–23) and additional digital zooming (lower fight image corner) allowed an evaluation of the filter properties (FIG. 12B: 4× bicubic zoom). In order to preserve the ultra-structural details of the filter pores (double zones), some of the high intensity noise component had to be included in the extracted contrast information.

(e) High Resolution Field Emission SEM (HRFSEM)

Figure 13A:
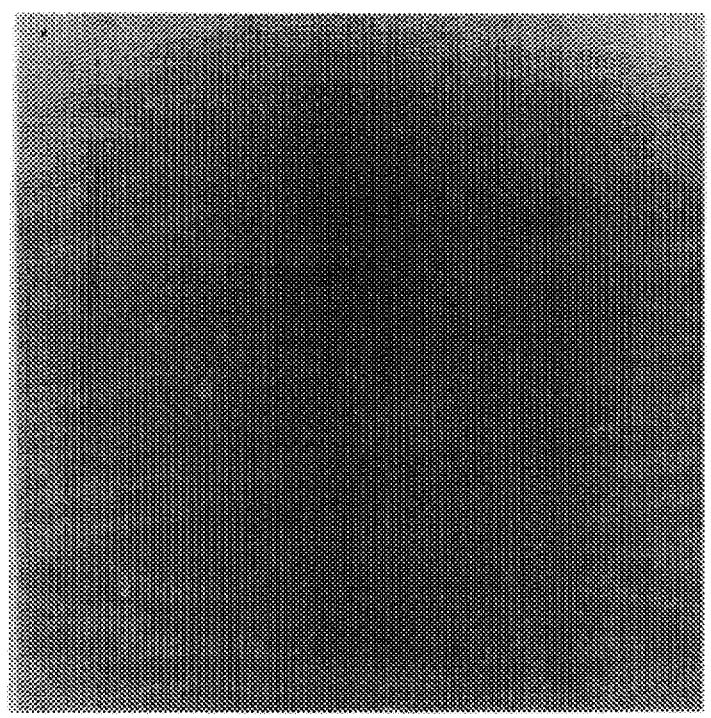
FIGS. 13A-B are high resolution field emission SEM data having been processed using the detail enhancement techniques of this invention.
Figure 13B:
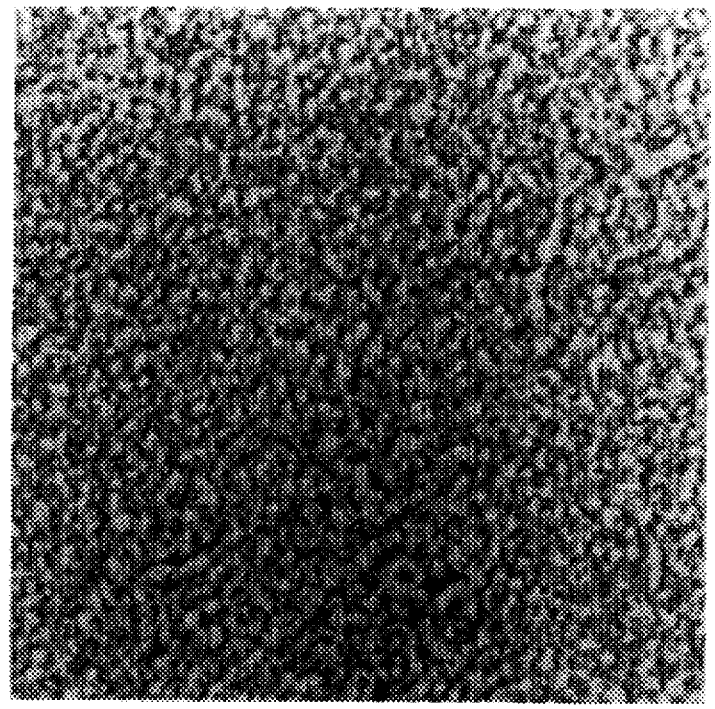

The new ultra-high resolution FSEM instruments provide a 0.5 nm probe diameter and are capable of working at magnifications of 100,000–1,000,000× in order to take advantage of the high theoretical resolution. In practice, contrast quality sets the limitation at high magnification. At high magnification, even in these in-lens microscopes, a large signal background is generated which compresses the high precision short-range contrasts (spacial detail information). High magnification cryo-imaging (100,000×, 30 kV, sample temperature –120° C.) of a molecular preparation on thin C film (2 nm thickness), shadowed with a 1 nm continuous Cr film, produced only disappointingly low contrasts with no molecular details being visible (FIG. 13A). After digital zoom and intensity slicing beneath the noise component, all expected high precision contrasts were revealed ($IR_S$=5–15), i.e., all small structures (2–5 nm in size) were imaged with a distinct shadow produced by the high resolution contrasts of the aimed-for SE-I signal component (FIG. 13B). The small size of the SE-I contrasts was unexpected but indicative for the large background produced here even under optimal imaging conditions (very thin specimen, low-Z metal coating, cryo-imaging for contamination reduction).

2. Transmission Electron Microscopy Images

TEM contrasts are a good example for the superposition of various contrast mechanisms and the difficulty in visual contrast information interpretation in the space domain (the image). In the TEM at the level of smallest structural details, both phase contrast and scattering contrast occur and are superimposed. Phase contrasts can be easily analyzed and reconstructed in the Fourier domain using the transfer function of the optical system and microscope imaging parameters. Low-dose imaging is a prerequisite for beam sensitive materials but increased noise and lack of contrast hinders immediate evaluation of acquired raw data. In addition, the image quality may be obscured by beam damage, insufficient dose, and other factors (contamination, instabilities etc.).

(a) Cryo-Transmission Electron Microscopy (Cryo-TEM)

Figure 14A:
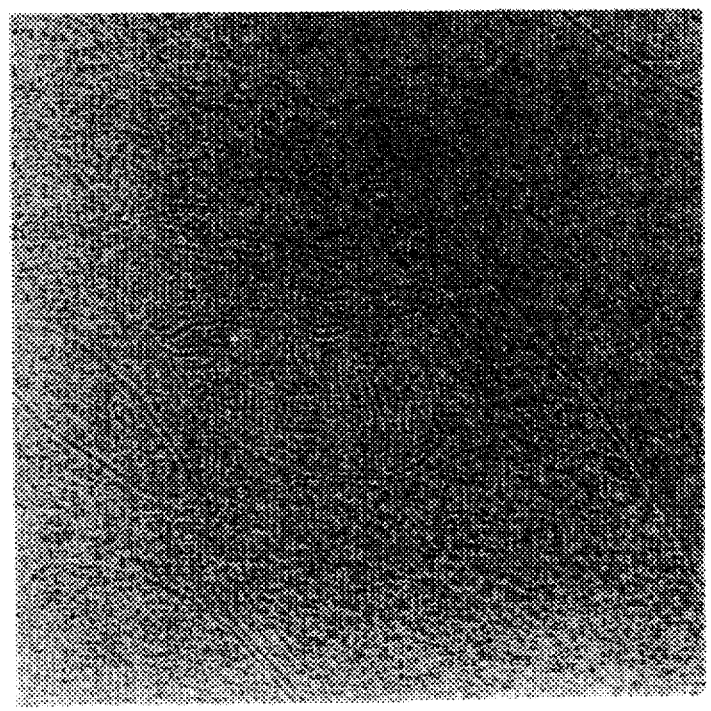
FIGS. 14A-D are cryo-TEM energy filtered, phase contrast data having been processed using the detail enhancement techniques of this invention.

Cryo-TEM is of utmost importance in biomedical electron microscopy. It is the high-resolution microscopy of choice for the imaging of the ultrastructure of cells and tissues. In a further advance, energy filtering is applied for a reduction of the signal background which obscures and compresses the contrasts of interest. Since in cryo-TEM on vitrified sectioned materials, no staining is applied, only weak phase contrasts are available for high resolution information. However, the contrasts do not present a coherent spacial information but image parts of the spacial frequencies in positive and other parts in negative contrast according to the transfer function of the particular imaging conditions (lens aberrations, illumination and defocusing). The phase contrast transfer function relates a specific intensity characteristic to each of the spacial frequencies. This inherent intensity characteristic of the TEM contrasts can be determined by the processing technology described in this application and used for a separation and imaging of each of the existing particular spacial frequencies of the raw data. Even if the energy filtering is applied for generating an enriched phase contrast data set, other signal component with the same energy range are included and produce a large background signal (up to 80% of the total signal as can be shown here). Intensity background reduction through intensity slicing maintains the spacial character of the data and generates enhanced phase contrast images enriched in certain spacial frequencies. This imaging technology is especially important for high resolution cryo-TEM in phase contrast on frozen-hydrated biological materials. The original low-dose energy-filtered TEM raw data set of a frozen-hydrated unstained cryo-section of an apple leaf(25,000× instrumental magnification) revealed uneven contrast distribution exhibited by a large background signal (FIG. 14A). Most of the overall intensity range (IR=0–232) was occupied by scattering contrasts of large image features. Small structural details had low phase contrast and were barely visible and buried in noise. Lack of contrast hindered quality assessment. Conventional contrast enhancement by histogram equalization did not improve the phase contrast image quality because it also enhanced all other intensity variations in a non-spacial manner and may lead to a disintegration of detail components or loss of intensity details, i.e., loss of some intensity values which were summed into bins of especially inappropriate intensity levels.

Figure 14B:
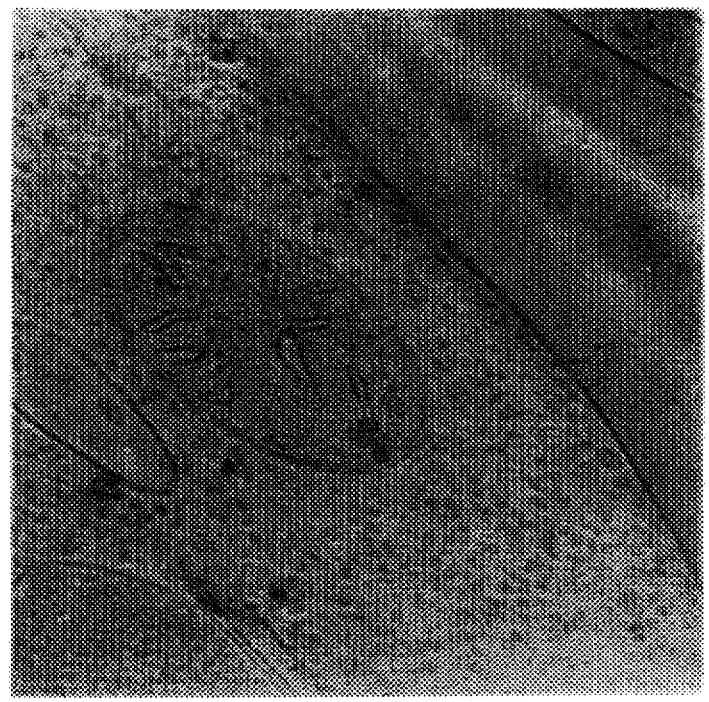
Figure 14C:
Figure 14D:
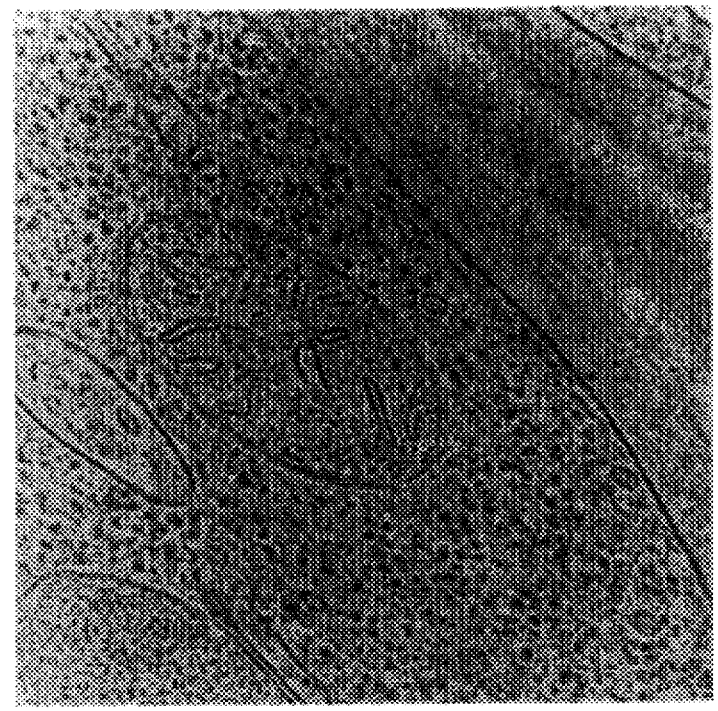

The different spacial phase contrast component were enriched in different successive intensity slices proving the coherence of the intensity profile and validating the new image information processing technology. Interactive visual control facilitated the determination of a significant intensity level at which noise reduction and preservation of fine structural detail were optimized. Intensity slicing ($IR_S$= 25–35) just underneath the noise component revealed the smallest spacial phase contrast components (FIG. 14B) and successive slicing ($IR_S$=35–45) extracted larger spacial phase contrast components (FIG. 14C). Finally, the largest spacial frequencies of this data set were found buried well in the depth of the intensity profile ($IR_S$=55–75). The latter component contained the knife marks (originating from the cryo-sectioning) as well as ice crystal contamination. Separation of the phase contrasts or its various components will facilitate the reconstruction of the specimen's ultrastructure.

(b) High Voltage TEM (HVTEM)

Figure 15A:
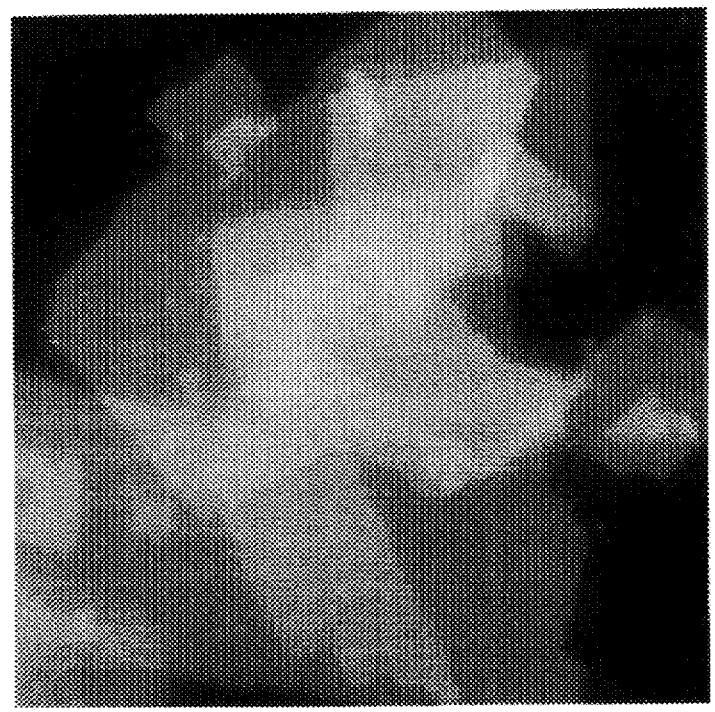
FIGS. 15A-B are high voltage dark field TEM data having been processed using the detail enhancement techniques of this invention.
Figure 15B:
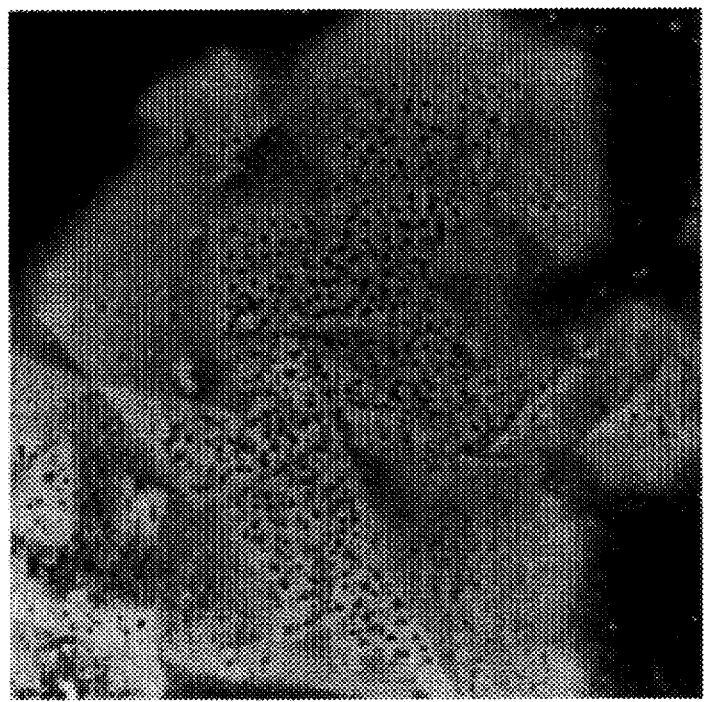

High voltage microscopy provides for high resolution but is limited by a reduction of image contrast. Therefore, often dark field microscopy is used for a recovery of some of the low contrasts components. The extent of collected fine structural information in such high precision data was unknown but can be assessed through intensity slicing. A 300 kV TEM image (60,000× magnification in conical dark field illumination) of mineral platelets coated with surfactant reveals only few fine structural details (FIG. 15A: 2× zoom) seen in some darker areas in between plates (holes in the surfactant bilayer, 5–10 nm thick, formed in between the plates). A narrow intensity slice ($IR_S$=3–15) revealed underneath the noise components all contrasts produced by the surfactant bilayers in between the plates as well as on top of the plates (surfactant monolayers). The majority of the intensity data were occupied by scattering contrasts from the mineral plates and a signal background. The very high precision obtainable with high voltage TEM was, although not visible, present in the raw data. This finding will dramatically improve the application of these expensive research tools.

(c) High Resolution TEM (HRTEM)

Figure 16A:
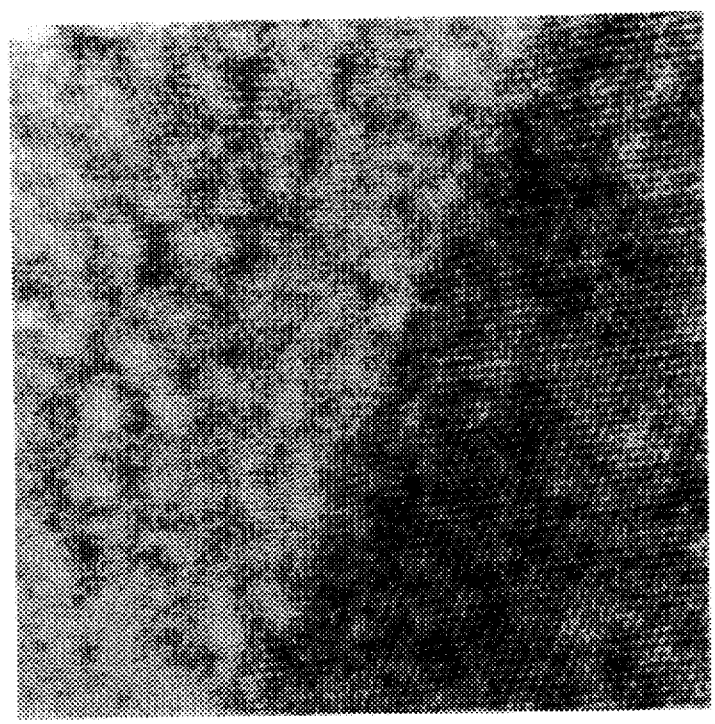
FIGS. 16A-B are high resolution TEM data having been processed using the detail enhancement techniques of this invention.
Figure 16B:
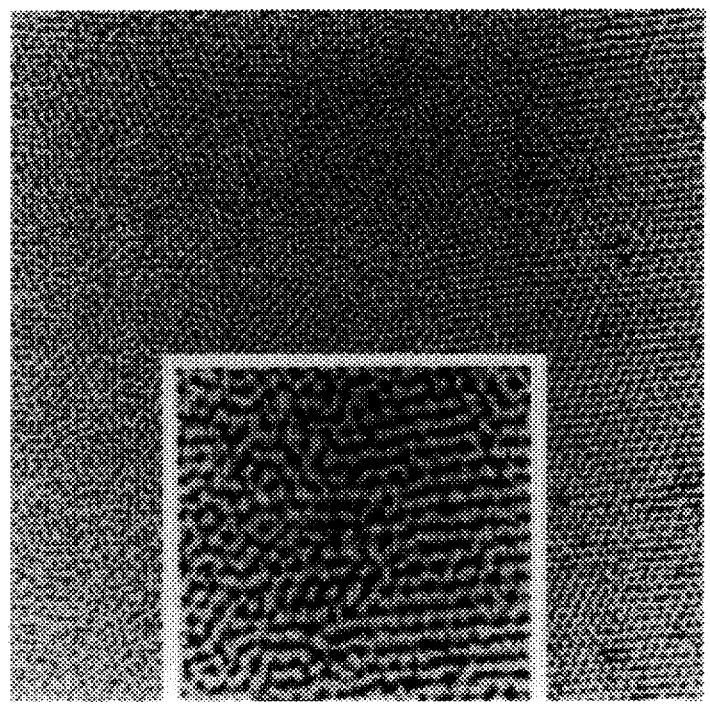

Highest, atomic resolution can be achieved in high voltage TEM at very high acceleration voltages on very thin specimens. However, phase contrasts and scattering contrasts always superimpose and obscure the desired high resolution information. In an evaporated gold island preparation at 5,000,000× magnification, atoms of the gold as well as the supports were imaged but obscured by mass inhomogeneities of the sample (FIG. 16A). Intensity slicing ($IR_S$= 3–35) of the phase contrasts revealed a coherent image of the atomic ultrastructure of the sample (FIG. 16B). Digital zoom (Insert: 4×) allowed easy first evaluation of the image quality. Reconstruction of these data will be required for a spacial data output of highest precision.

3. Scanning Transmission Electron Microscopy Images

Scanning transmission electron microscopes are important instruments in R&D due to their ultra high resolution capability, high depth of field and limited demand for specimen preparation. However, the imaging capabilities of these instruments are limited as well as other microscopies by the proportion of high precision, short range contrasts and their intensity background.

(a) Scanning Transmission Electron Microscopy (STEM)

Figure 17A:
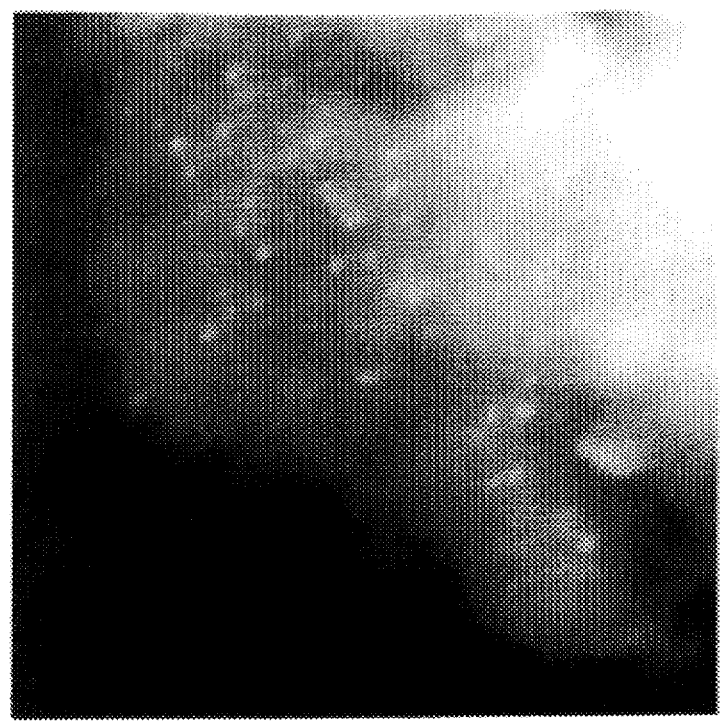
FIGS. 17A-B are high magnification scanning transmission electron microscopy data having been processed using the detail enhancement techniques of this invention.
Figure 17B:
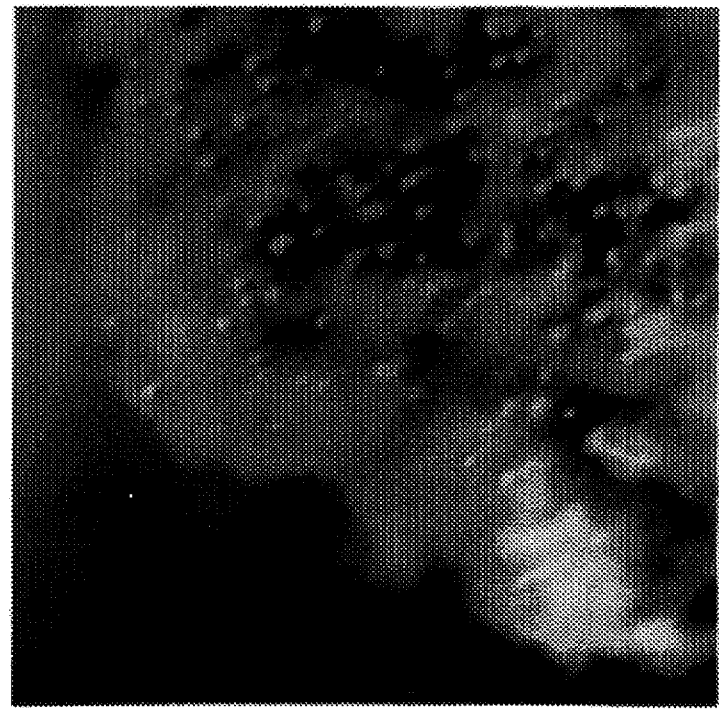

The analysis of STEM data (2,300,000× magnification) of small (only a few nm large) grains of high-Z metal in a low-Z matrix (FIG. 17A: 2× zoom) was limited by the uneven sample thickness (producing the background signal). High precision contrast information was found in a narrow intensity slice ($IR_S$=5–35). The enhanced data revealed all particles present and facilitated particle quantitation. The intensity background was produced by the extensive electron scattering in the thicker portions of the sample. However, conventional background intensity compensation would not be effective in preserving the particles differential contrasts. Only intensity slicing as described in this application can reveal the particles differential contrast as evenly high (and undistorted) in the entire image.

4. Scanning Probe Microscopy Images

The new scanning probe microscopes promised acquisition of high precision data from all specimens but in practical applications their use is limited by a lack of contrast at the expected precision level. In fact, the microscope's precision is the highest available for any surface microscope, measuring in fractions of one Angstrom, but such short-range contrast information is not visible in images of rough surface found in routine applications.

(a) Atomic Force Microscopy (AFM)

Figure 18A:
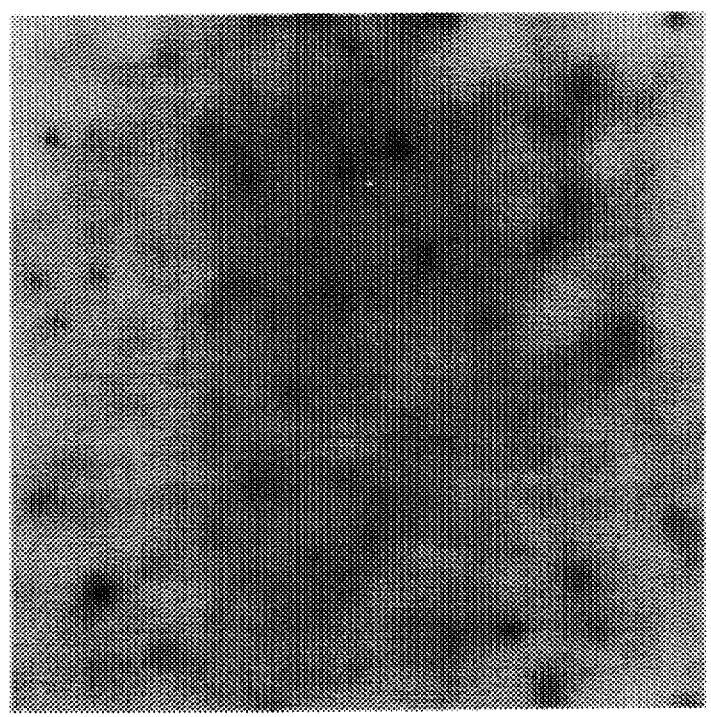
FIGS. 18A-B are images of atomic force microscope or AFM data having been processed using the noise smoothing and detail enhancement techniques of this invention.
Figure 18B:
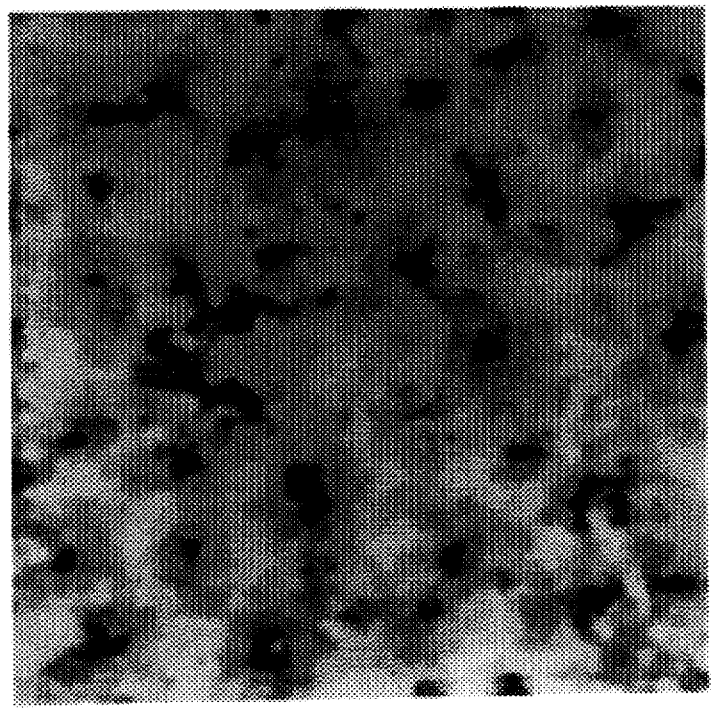

A typical data set is presented by polymer coating films (800,000 magnification) formed from 20 nm small flat particles on a Teflon surface (FIG. 18A: 2× zoom). The few Angstrom high substructures of the film surface were barely recognizable in the raw data. Since the AFM contrasts are proportional to the height of image components, the particulate substructure contrasts covering the whole film surface was compressed to a few intensity levels. Intensity slicing below the noise ($IR_S$=7–13) revealed within only 17 intensity levels the small high precision contrasts and generated a detailed image adequately representing the expected AFM image quality.

5. Light Microscope Images

Light microscope contrasts were always accompanied by large background components which derived from light scattering in inhomogeneous samples. A method for reduction of this contrast limiting background was introduced through the confocal LM. However, also CFLM data find a general limitation in noise as well as the small intensity range of short range contrasts.

(a) Light Microscopy (LM)

Figure 19A:
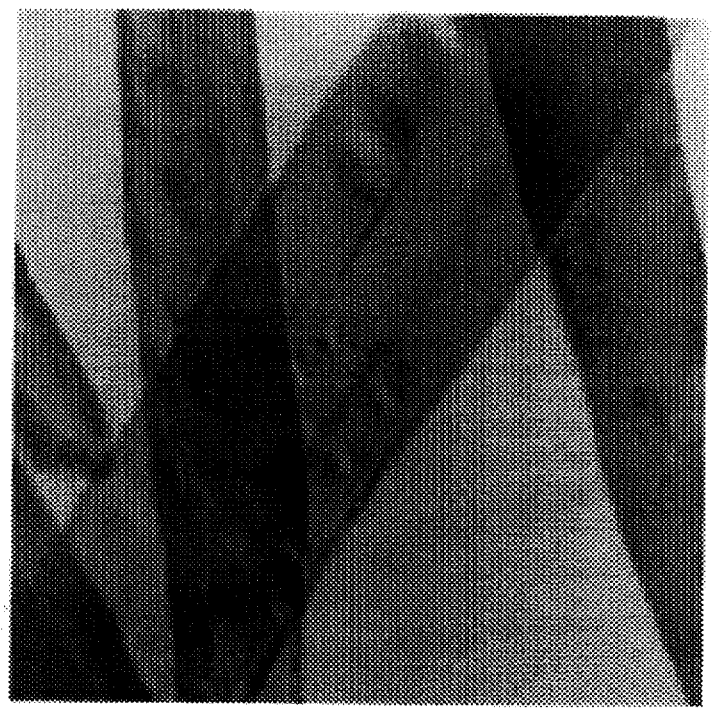
FIGS. 19A-B are images of light microscope data having been processed using detail enhancement techniques of this invention.
Figure 19B:
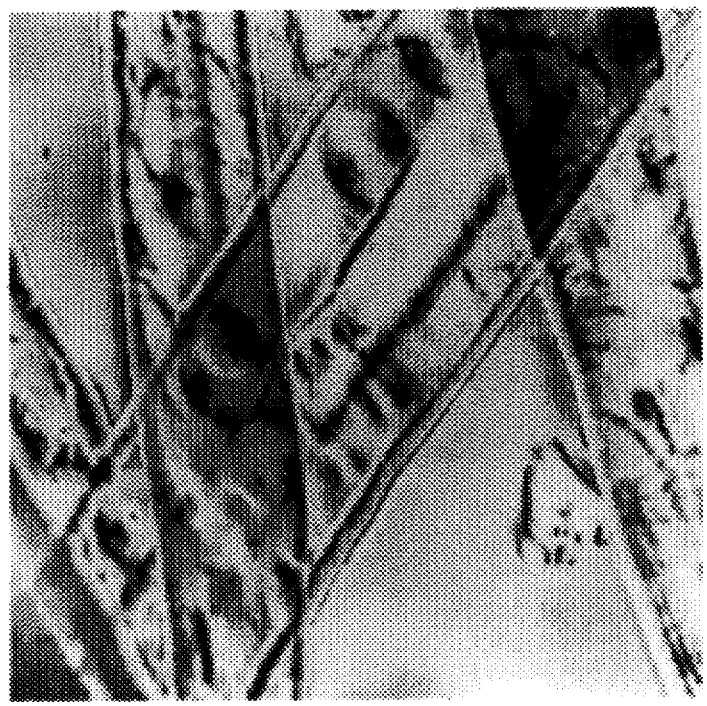

The bright field image of paper fibers, suspended in water, at medium magnification (400×) was dominated by adsorption contrasts while the short range contrasts, resulting from optical properties, were barely visible (FIG. 19A). Contrast enhancement of this high precision information was easily established by a simple intensity slice beneath the noise component at 10% of the full intensity range (IRs=7–23). Through this processing, all expected refraction, diffraction and polarization contrasts became visible (FIG. 19B); although it was thought that this precision information is available only in certain circumstances.

(b) Confocal Laser Light Microscopy (CFLM)

Figure 20A:
FIGS. 20A-D are images of confocal laser light microscopy data having been processed using the noise smoothing and detail enhancement techniques of this invention.
Figure 20B:
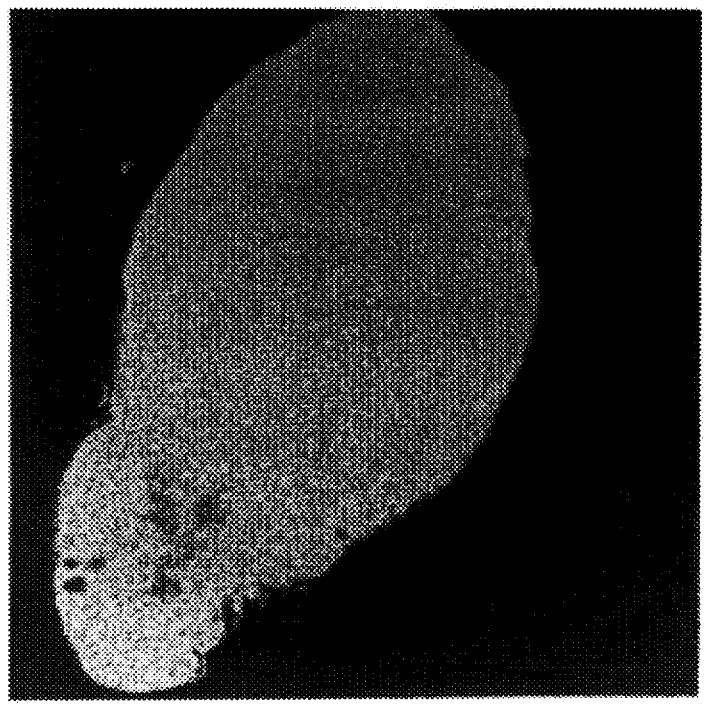
Figure 20C:
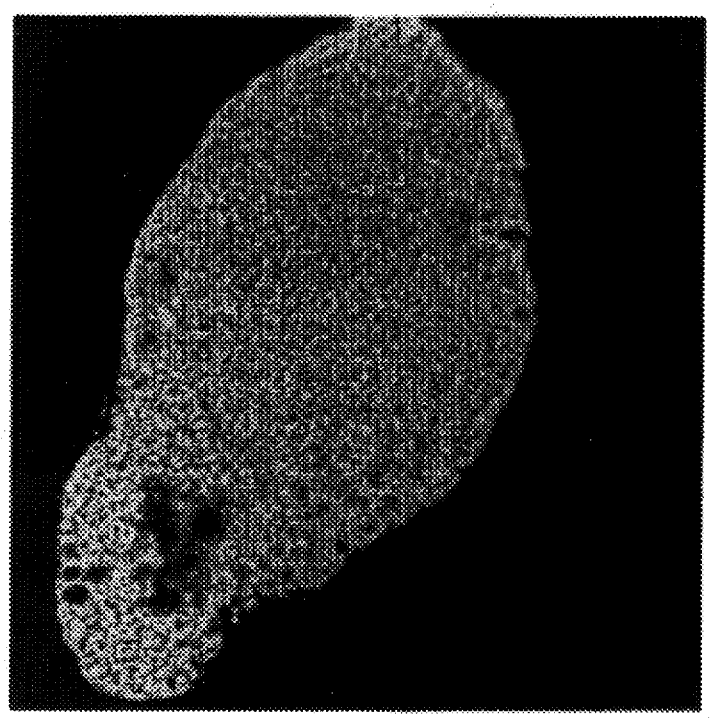
Figure 20D:
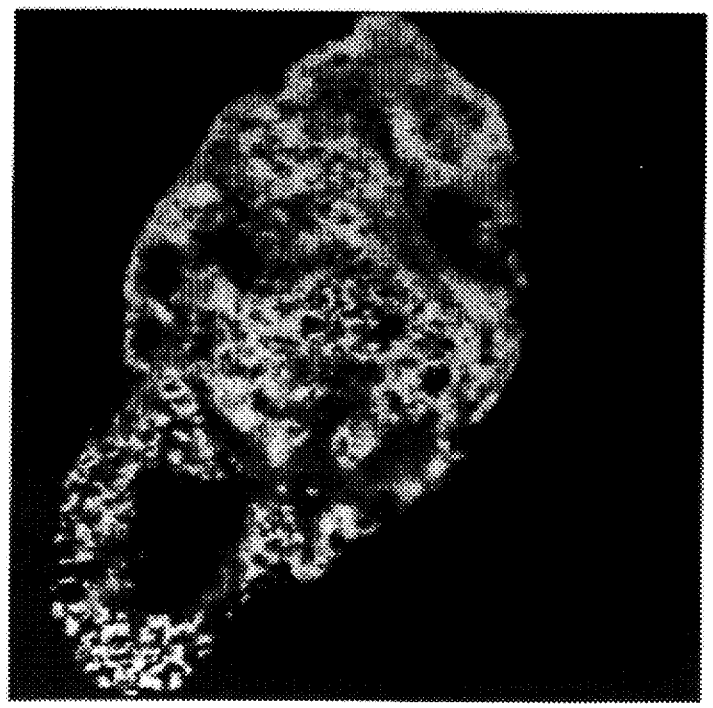

The confocal laser light imaging technology aims for a reduction of the signal background produced from light scattering with the sample. However, low signal yields and high noise levels are characteristic for the CFLM data. As in other microscopy data, noise management is important and can be facilitated through the intensity slicing since random and non-random (structural) information can easily be visually recognized and assessed. An image of an in-situ injection of a fluorescent lipid dye into a living photo receptor cell revealed little detail (FIG. 20A). The extent of the image noise component was fast determined by several intensity slices, i.e., FIG. 20B: upper noise component ($IR_S$=1–17), FIG. 20C: median noise component ($IR_S$=17–37). All structural data (FIG. 20D) were found below the large noise component ($IR_S$=1–57: 22% IR) within only 15 intensity levels ($IR_S$=57–72). The data slice was easily found by slicing through the intensity profile and evaluating in each slice the proportion of random and non-random information. The ability to "see" the noise component, and to evaluate its penetration into the fine structural data is of utmost importance for microscopy since it allows one to visually assess the practical intensity threshold which separates noise and structural information at minimized loss of detail information.

D. Medical Imaging

Of special interest is digital image enhancement for medical image data evaluation. Although Radiologists are well trained for visual evaluation of image documented on photographic films, detail and pattern recognition and evaluation is restricted by the individual visual abilities and the excess of data beyond the visual limitations. New digital medical image sensors acquire images at 12-bit or 16-bit level and a resolution better than films. New digital mammograms provide 10K×12K× 12 bit-data (PrimeX, Carlsbad, Calif.). Visual evaluation of such large data at the precision level of acquisition is not possible and will require digital image processing technologies. The described intensity slicing technology provides the only strategy for the evaluation of the data information without any compromise in precision. The following two examples were digitized from film.

1. Mammography

Figure 21A:
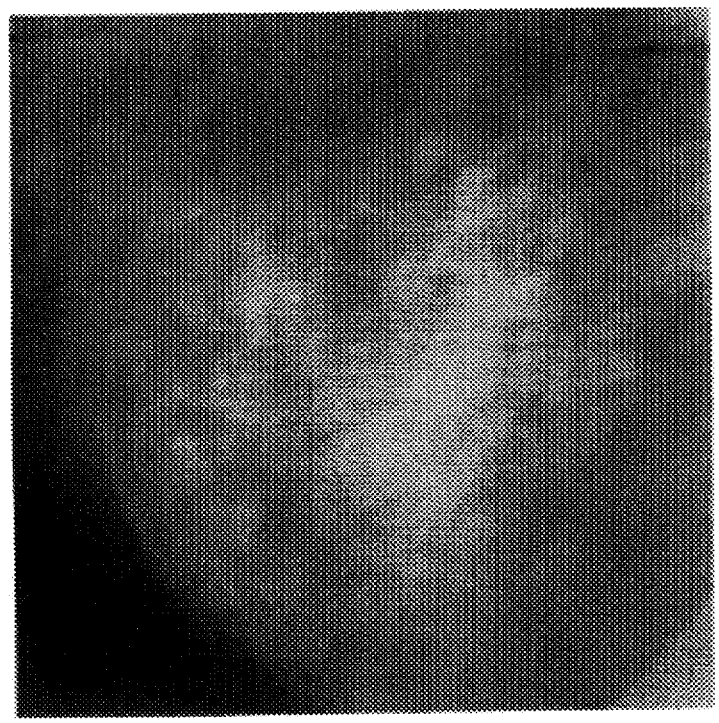
FIGS. 21A-D are images of mammogram data having been processed using the noise smoothing and detail enhancement techniques of this invention.
Figure 21B:
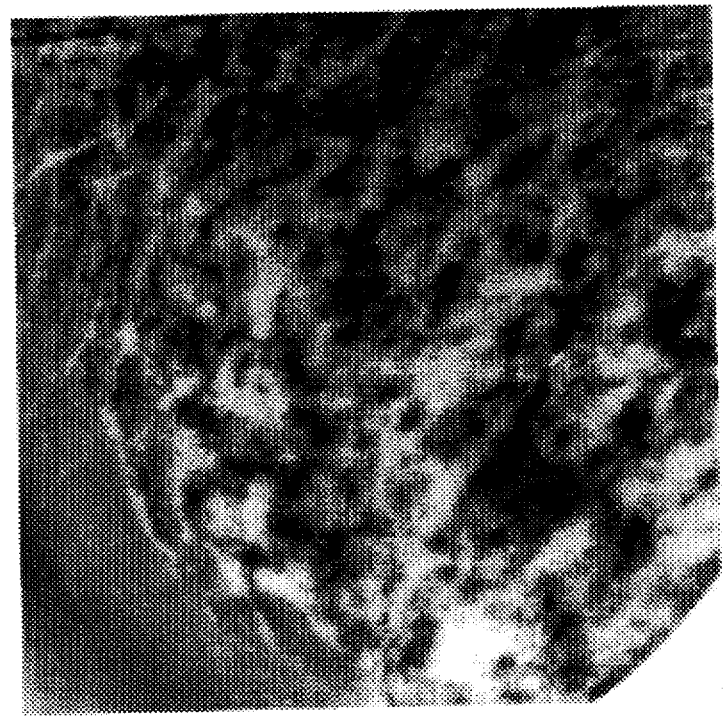
Figure 21C:
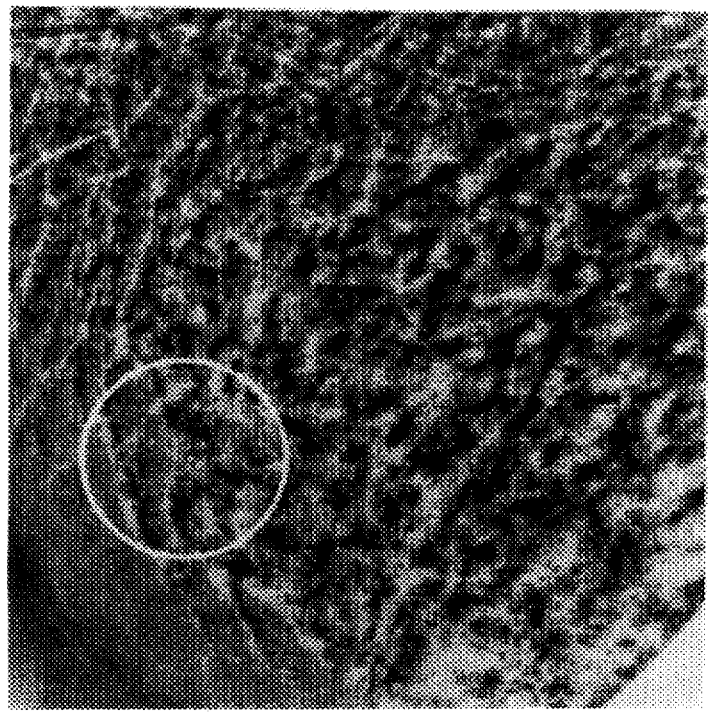
Figure 21D:
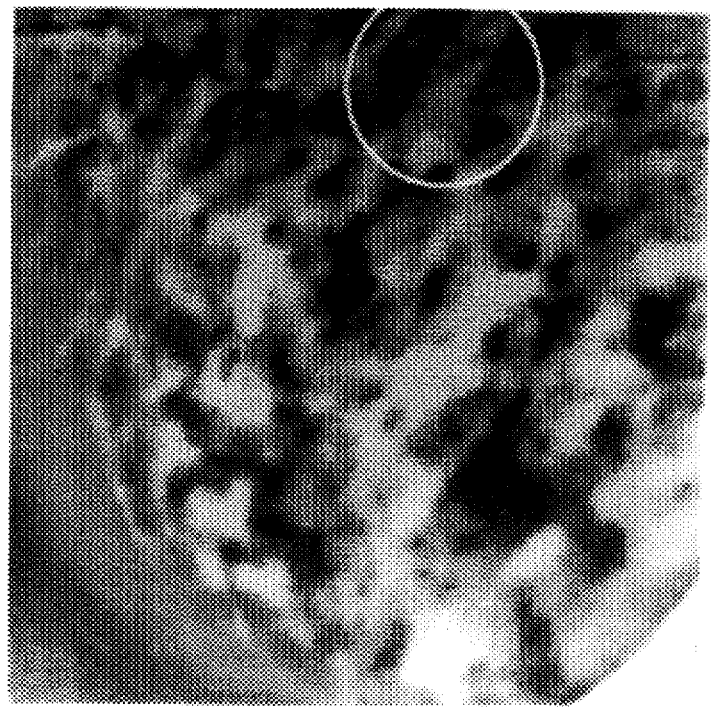

Mammogram evaluation assesses the tissue structure of the mammary gland. Two stages of tumor growth pattern can be distinguished: 1. Early indications are seen in widening of gland ducts and in micro-calcifications composed of groups of small high contrast deposits. 2. Late indications are seen in growth of tissue masses in round areas of increased contrast (more water content from dense cell accumulations). The structural diagnostic criteria fall into the two basic image information classes of image details, i.e., spacial details (smallest contrast variations as found in fibers and micro-calcifications) and intensity details (large area contrasts as found in tissue components and alterations). Problems in mammogram evaluation arise from excessive tissue density and concomitant superposition of contrasts. A dense mammogram (FIG. 21A) was evaluated by digital PAIP image information enhancement. Very little detail is visible in the original raw data image. As in the previous data sets, all detail information was imaged within a small significant intensity range of only 12%. In a routine screening of the X-ray film at a light table, the analog image evaluation must be completed within less than 1.5 minutes. The composite detail image (FIG. 21B: $IR_S$=1–21) allowed a correlation of both detail information, the spacial detail (FIG. 21C: 1–11) and the intensity detail (FIG. 21D: $IR_S$= 11–21). The spacial detail image allowed an easy recognition of the tissue fibers and of a group of individual micro-calcifications (FIG. 21C: circle). Other high intensity detail may arise from superimposition of fibrous components which could be easily identified. The intensity detail image revealed the gland ducts and large round areas of decreased contrast indicative of fat depositions (less water content). Nearly all gland ducts can be followed leading to a point of origin (nipple). Some ducts were found dramatically increased in width (FIG. 21D: circle).

However, in traditional mammograms, detail information may be inaccessible due to structural super-position. This phenomena can be reduced through stereoscopic three-dimensional (3-D) imaging. New high sensitivity digital mammogram sensors will make it possible to take two tissue exposures under altered angle of view (stereo angle of 4°–6° without much increased risk of excessive X-ray exposure. The PAIP filter of this invention is fully equipped for stereo imaging of detail enhanced and enlarged image details. It is ideally suited for stereo imaging since it produces images of tissue details with high contrast and high edge sharpness, a prerequisite for visual 3-D perception.

The PAIP evaluation of spacial and intensity details takes less than one minute in automatic grid search mode at four times enlargement. It is much less straining than analog image evaluation (aided with a magnifying glass) since the image information is presented in an optimal visual fashion. The easy recognizable display of all detail information insures that data interpretation is no longer limited by lack of visual access to the data but only by limitations in data quality or diagnostic experience of the investigator which in addition could now be supplemented through image communication via electronic networks.

2. Chest X-Ray

Many medical data sets contain large dominant image features which occupy most of the image intensity bandwidth leaving little room for contrasts of image details. This is especially true for chest and other X-rays which image bones and tissue together. Local contrasts are constrained within only a few percent of the image intensity range. PAIP image enhancement in accordance with the present invention revealed that all expected local contrasts were generated and collected but that detail information contrasts were compressed in inverse proportion to the extent of the background contrasts. In addition, the visual recognition of local, small intensity variations was reduced in close proximity to large intensity variations.

Figure 22A:
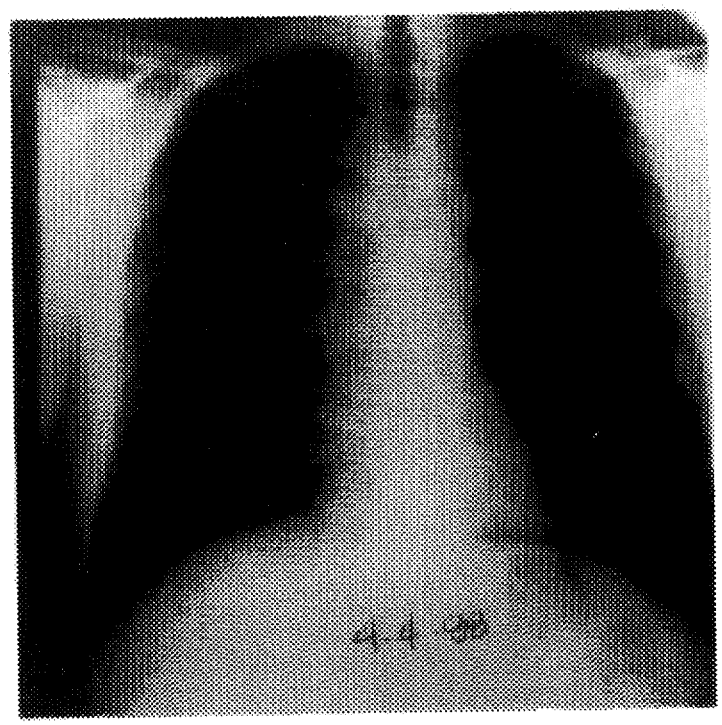
FIGS. 22A-D are images of chest x-ray data having been processed using the noise smoothing and detail enhancement techniques of this invention.
Figure 22B:
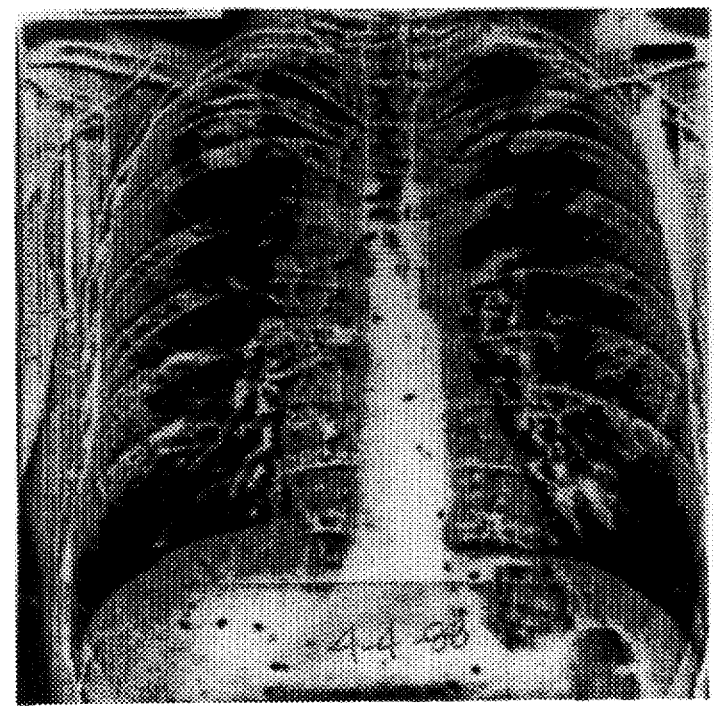
Figure 22C:
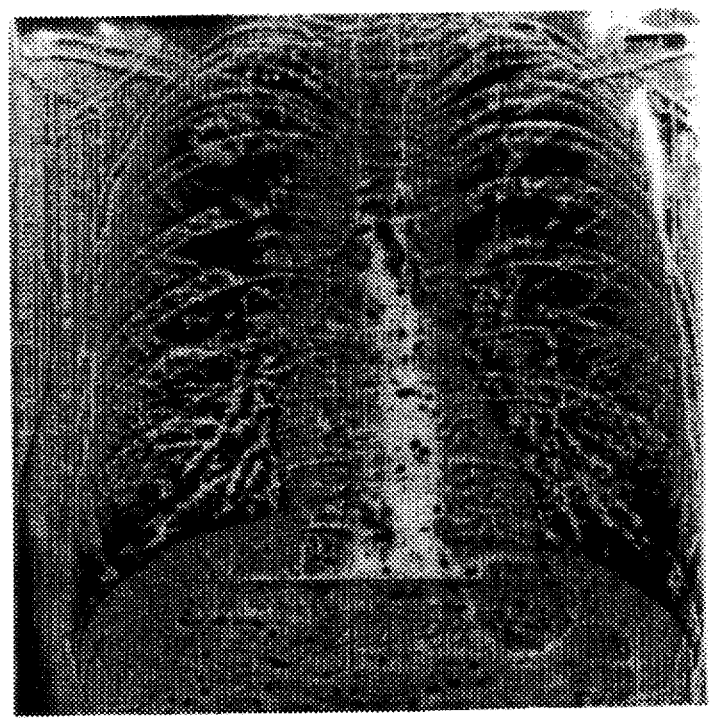
Figure 22D:
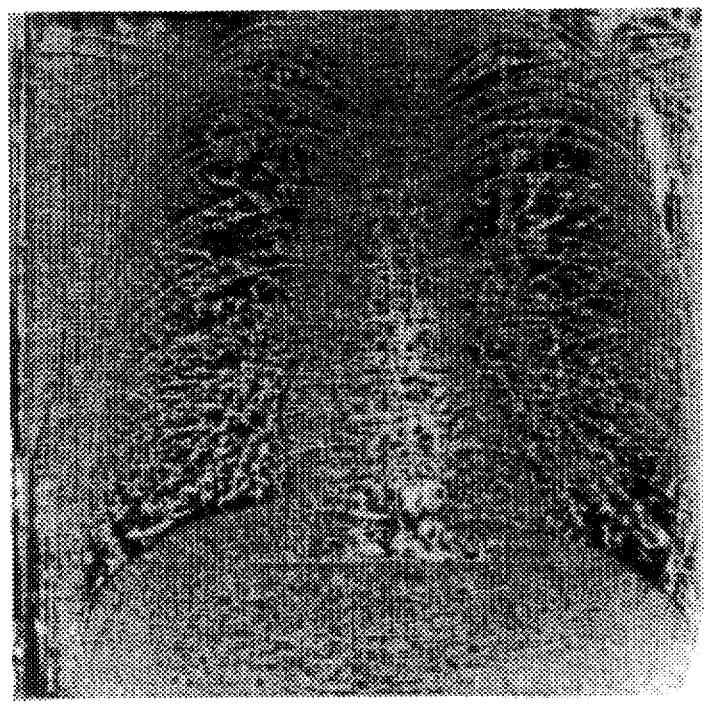

PAIP image enhancement provided an easy and fast procedure for adjustment of the proportion of detail and feature intensity ranges by interactive reduction of the latter while visually evaluating the processing effectiveness. A chest X-ray image (FIG. 22A) occupied the full intensity range and left little room for the detail contrasts which had a significant intensity range of only 5%. They were only recognizable in part within the soft tissue background and were fully absent in the high and low intensity areas of the X-ray. Detail enhancement with stepwise reduction of the significant intensity range lead to a reduction of the feature intensity range and to an inverse proportional increase of the detail contrasts. An over 90% reduction (FIG. 22B: $IR_S=$ 1–10) still maintained the major feature contrasts but visibly increased much smaller detail contrasts within the whole image. A further reduction of the significant intensity range to 5% of the overall image intensity range finally led to a dominance of local contrasts (FIG. 22C: $IR_S=1-5$). The image quality changed dramatically once the sensitive small X-ray adsorption contrasts were visualized. In high intensity areas at 1% significant intensity level, mostly noise was imaged (FIG. 22D $IR_S=1-3$), bottom right) but finest spacial details were preserved in dark areas. Such a typical non-linear noise component can be easily reduced though processing using a non-linear enhancement.

E. Quantitation of Digital Image Information

Figure 23:
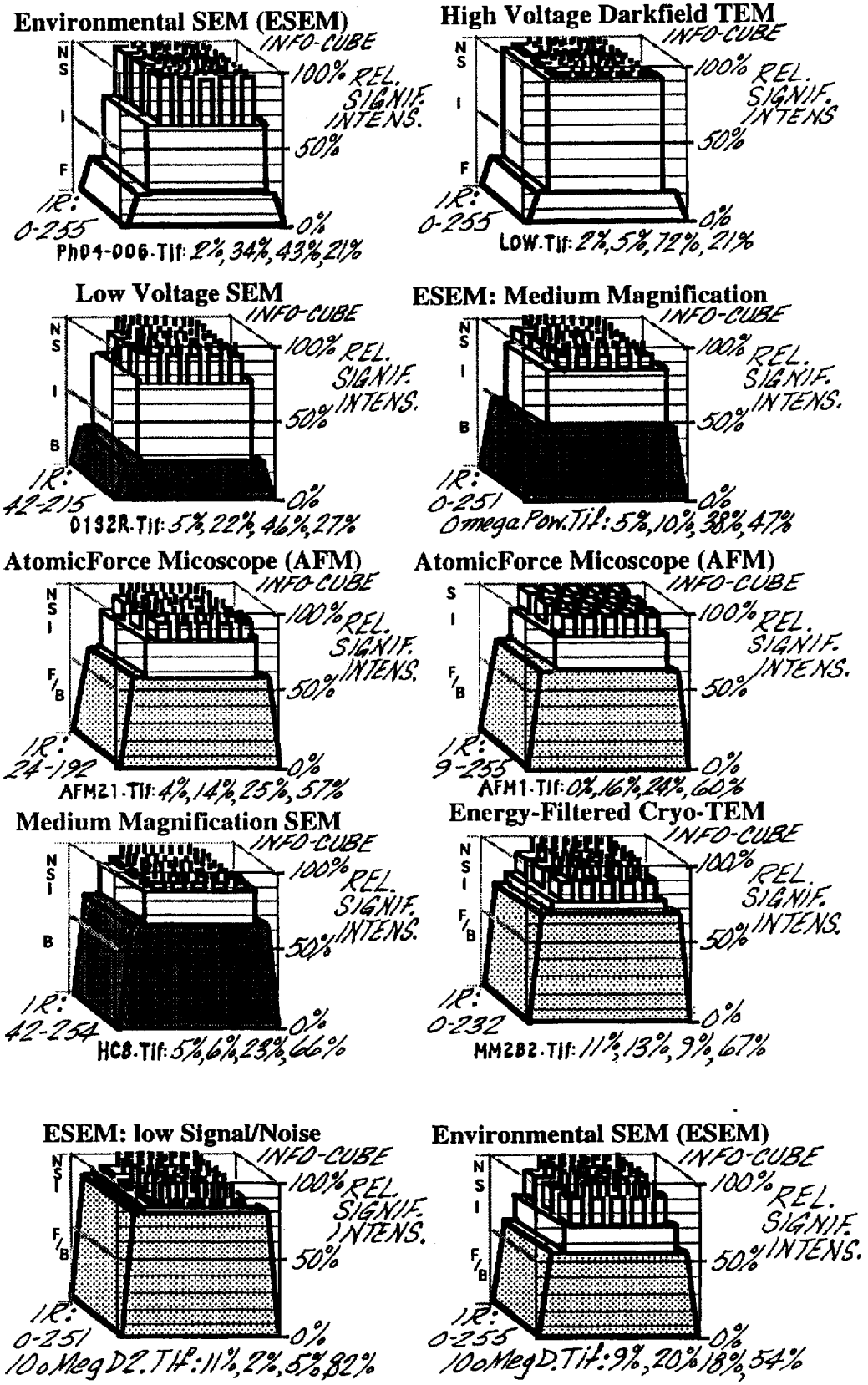
FIG. 23 is a group of graphs depicting quantitation of image data "information cubes" using the smoothing and detail enhancement techniques of this invention.

The definition in digital images of any origin and content through PAIP of defined contrast classes and the quantitation of these classes provides a unique and new tool for image quality quantitation. The four intensity information classes can be schematically represented in an information cube (FIG. 23) which depicts the relative significant intensity (z coordinate) over the image (x and y coordinates). Each information class is presented by a simplified three-dimensional intensity profile and stacked upon each other in the sequence of access through PAIP processing; at the top is the image noise, followed by the spacial detail, the intensity detail, and at the base is the image feature/background The latter is shaded if its spacial information is limited (light gray) or absent (background: dark gray). In FIG. 23 info-cubes are presented of some of the microscopy data sets depicted in FIGS. 8–20. As additional information, the information classes are labelled with symbols along the left vertical axis, the total intensity range (IR) of the data set it indicated in the lower left corner, and the file name and the percentage range of each of the information classes is given in sequence to their appearance in the data. It is evident, that each image shows an individual proportion of its information components, but that common to all images is a reduction of visually perceivable "image quality" when the proportion of the feature component is more than 50% of the maximum relative significant intensity range. In FIG. 23, the data are arranged with decreasing image quality. Another application of the image quality assessment is found in image evaluation at the time of acquisition. This is important in microscopy, where constantly varying contrast conditions as well as degradation of the specimen during microscopy hinder visual data assessment. In FIG. 23 at the very bottom two image data characteristics are shown for a low quality data acquisition and subsequent improvement of image quality through adjustment of microscopic parameters. Although the size of the noise component remained nearly unchanged, the proportion of the spacial and intensity detail was dramatically changed by a factor of 4–10 affecting both image information components differently. These examples indicate the power of the new digital image processing technology of this invention which may be applied to all possible digital image applications due to its intensity processing character, accuracy, objectivity and automation capability.

In accordance with another embodiment, enhancement of image detail contrast is accomplished by adding a differential hysteresis pattern to a digital image. The differential hysteresis image processing, described hereinbefore, utilizes the persistence of intensity variations (i.e., hysteresis) as means for data reduction and image detail contrast enhancement. Image hysteresis is determined by a hysteresis cursor of an interactively chosen hysteresis range. The cursor is stepped through the image pixel by pixel, evaluating intensity changes between neighboring pixels. The cursor's intensity position is maintained when the differential intensity values fall within the range, but follows the data, when the values are outside the range. The processing proceeds bi-directionally on continuous lines at various angles and the averaged values of the cursor positions in each pixel generate a hysteresis image. The hysteresis image contains hysteresis-free areas of maintained input data and continuously merged hysteresis areas of modified input data, resulting in, the input intensity variations being replaced by the local hysteresis value or the input intensity variations being reduced in intensity range proportionally to the local hysteresis characteristic, maximally by one half of the hysteresis range. The image maintains its full integrity as well as the spacial position of all remaining contrast components. These properties allow an artifact-free recovery of the intensity changes made by the hysteresis processing through subtraction of a hysteresis image from the input image or by substraction of two hysteresis images each processed with a different hysteresis range.

Significantly, the scaling of the resulting differential images to full display intensity range produces a differential hysteresis image having unique properties, i.e., they represent visually discrete differential intensity pattern of additive character. From most images, irrespectively of their original, only a limited number of basic visual patterns can be extracted which represent all the contrast information present in the data, e.g., a CCD (charge coupled device) video portrait image, atomic force microscopy image, which, e.g., provides data in the 14-bit range, a CT image (computerized tomography), which, e.g., provides data in the 11-bit range, and a radiogram, which, e.g., provides data in the 12-bit range.

Most instrumental precision information of maximum contrast resolution is found only in a fraction of the data's intensity range and is often too low to be visually recognizable. This pertinent information can be made visible as enhanced distinct images or can be contrast enhanced within the original images by adding the extracted differential hysteresis pattern components to the original images. The enhancement dramatically improves the image resolution of any imaging instrument and guaranteed maximum efficacy in image evaluation. For the first time and without requiring special knowledge of digital image processing or computer operation, digital image processing, the present invention provides an interactive process for objective and exhaustive visual real-time access to any level of image resolution including the maximum sensor resolution using only one single parameter (i.e., the differential hysteresis range). Importantly, this process allows visualization of any image at the resolution level of the image sensor, rather than the eye, extending the "visual recognition level" to the acquisition level of the imaging device.

Present imaging sensors provide data in the 10–16 bit range (i.e., 1,024–65,536 levels) but the visual system (i.e., human eyes) only can "see" part of the data since it is limited in "perception" to approximately the 8-bit range (i.e., 256 intensity levels) and in pattern "recognition" to the 4–5 bit range (i.e., 16–32 intensity levels). This limited information content of the visual image challenges digital image processing in finding general mechanisms for translating the non-perceivable or unrecognizable part of the sensor information into a recognizable image, i.e., patterns of image data details should be presented with a limited number of intensity steps spread over the full visual perception range. For example, high precision microscopes, as found in the atomic force microscope (AFM), acquire digitally much more image data (e.g. in the 12–16 bit range) than the human eye can accept and data presentation becomes a limiting factor rather than spacial or contrast resolution. Similar problems are encountered in other sensor obtained images, e.g., medical imaging, satellite data or non-destructive testing. Accordingly, large data sets of many KBytes in dimension and 16-bit in depth have to be visually analyzed in a very short time and with demanding precision.

It will be appreciated, that the gap between sensor and visual resolution is well known, and data reduction is intensively pursued in the art, at the level of the spacial information of the images. However, the complexity and diversity of images require that conventional image processing must match processing parameters or filters with the spacial image content, using complex adaptive neighborhood processing with fixed-sized masks either in the space domain or filters in the Fourier domain. This kind of image enhancement may create serious artifacts which may extend from the processing point as far into the data as the mask is wide. In order to reduce such artifacts processing parameters must preserve the duality of contrast and spacial information since neither can be visualized without the other.

Spacial information presented as intensity variation against a local background can be seen in a line scan through such image components. In addition to the large image features of high contrast, which can be visualized without constraint, the eye lacks sensitivity for recognition of small low-contrast components. The image detail components may include small structural components of low contrast, i.e., the spacial details, as well as large components of higher contrast, i.e., the intensity detail. Both detail components are preferably preserved by image enhancement. One approach to overcoming these limitations is the processing of local intensity components instead of local spacial components. Intensity variations can be characterized by their hysteresis properties which are accessible by intensity processing and provide an alternative to conventional spacial image processing. Hysteresis processing has been used for linear spectral data, wherein intensity variations between neighboring pixels were compared by simple binary hysteresis evaluation using a moving "one-dimensional" cursor for sequential reading of pixels intensity values, i.e., either the intensity difference between consecutive reading falls within a given hysteresis range or not, see Ledley R. S., Rotolo L. S., Golab T. J., Jacobsen J. D., Ginsberg M. D. and Wilson J. B. (1965), FIDAC: Film input to digital automatic computer and associated syntax-directed pattern-recognition programming systems, Optical and Electro-Optical Information Processing (Tippett J. T. Ed.), MIT Press, Mass, pp. 591–613. A two-dimensional neighborhood assessment for single pixels can be performed by radial processing determination of each pixel hysteresis response of its surrounding, as described hereinbefore. Hysteresis areas are defined by intensity variations which fall within a pre-selected hysteresis range (i.e., cursor range) and which are removed, and other areas of intensity variations which are outside of the given range and are maintained proportional to the local hysteresis response. Thus the hysteresis character of the specific data merges both areas into a continuous hysteresis image. Hysteresis images are visually not very effective because they maintain only the large intensity variations which can be readily recognized. However, the unique properties of hysteresis images can be utilized for a visualization of the differences between hysteresis images including the original image data (which may be considered to represent a hysteresis image of unity hysteresis) and being characterized only by a single processing parameter, the differential hysteresis range. The differential hysteresis image, scaled to full visual perception range, includes both the spacial details and the intensity details and thus provides an efficient tool for image detail enhancement.

Figure 24:
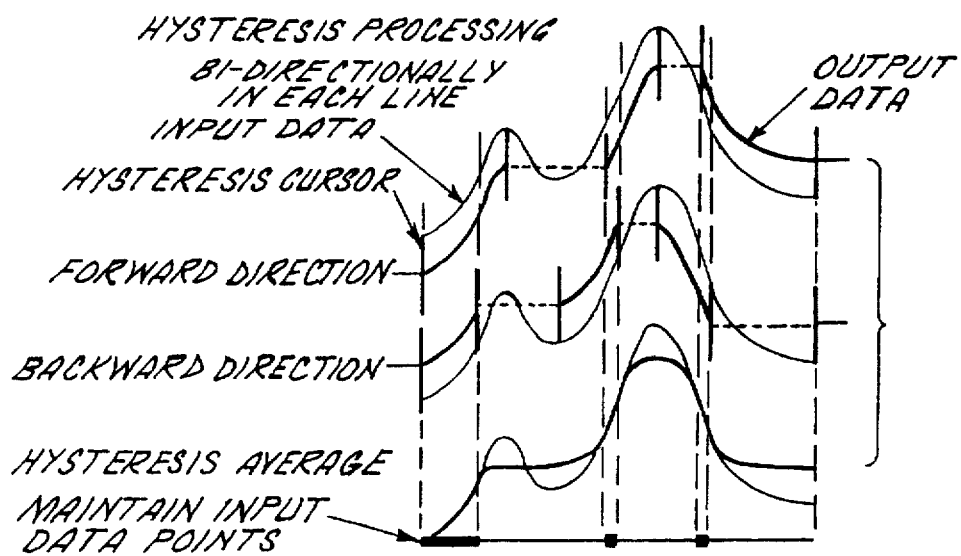
FIG. 24 is a series of plots diagrammatically illustrating hysteresis line processing.

Referring to FIG. 24, hysteresis line processing reads the image data in lines using a hysteresis cursor having a pre-selected range (i.e., hysteresis cursor range) and is moved pixel by pixel along the line while its midpoint is read as output data. The cursor follows the input data with one of the cursor's ends if the next pixel value is outside of the present cursor value, or remains unchanged if the next pixel value is inside of the cursor values. The cursor may start reading a line by positioning its midpoint at the input data point. A directional lag of the hysteresis is compensated for by processing the input line a second time but in a backward direction and then averaging both cursor output values generating the final hysteresis line. The hysteresis line has several important characteristics which are essential to hysteresis image processing: (1) intensity variations smaller than the hysteresis range are eliminated and replaced by a hysteresis value which represent the last read hysteresis-free data point, whereby the hysteresis value has a different character than the conventional averaging or median filter values since it relates the output data value to the preserved data portion rather than the replaced data portion; (2) the intensity of input data maxima and minima larger than the cursor range are uniformly reduced by one half of the cursor range independently of their specific intensity values or their height or depth, and intensity variations smaller than the cursor range are reduced in proportion to the local hysteresis character; (3) portions of the hysteresis line are preserved input data, whereby these data points tie the data areas together that were modified by the hysteresis processing; and (4) the directional hysteresis processing produces in forward direction of the cursor movement streaks at the top and the bottom of intensity profiles larger than cursor range. These streaks are important since they lead to a linearly averaged transition between the reduced intensity minima and maxima and the input data point.

Each successively read line has its own specific hysteresis character which reflects only the one-dimensional neighborhood along the reading direction. In an image that is composed of a single set of hysteresis lines, the hysteresis character produces a streaky pattern in reading direction. In order to ascertain the two dimensional neighborhood of each pixel, radial processing is preferred.

This two-step processing follows along lines of neighboring pixels and averages for each pixel the hysteresis character of its local environment in all directions without any spacial restriction other than the image boundaries. A hysteresis cursor of selected intensity range (i.e., hysteresis cursor range) follows the input data with one of its ends if the intensity value of the next pixel falls outside of the present cursor endpoint values. The midpoint of the cursor provides the output data (i.e., the solid output data line in FIG. 24). The cursor output value remains unchanged in the intensity of the next pixel falls within the actual cursor endpoint values (i.e., the hatched output line in FIG. 24). Each line is read in both directions and the arithmetical average provides a final hysteresis line. The hysteresis line contains segments which represent unchanged intensity variations of the input values (e.g., when read in both directions), reduced intensity variations (e.g., when read only in one direction) or eliminated variations (e.g., when read in neither direction). The spacial position of maintained input intensities and the spacial position of reduced intensity peaks and valleys are not changed and provide for the high precision or "pixel-accuracy" of the hysteresis processing.

Figure 25:
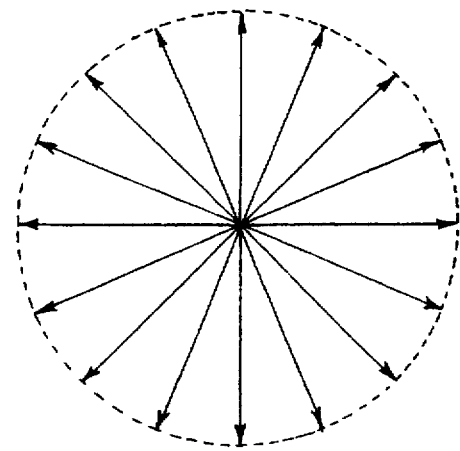
FIG. 25 is a plot diagrammatically illustrating hysteresis image processing radially in each pixel.

Referring to FIG. 25, radial hysteresis lines, such as described hereinbefore, are formed in many directions and arithmetically averaged in each pixel. The processing requires between 100–200 or more different angles per half circle for the generation of the final hysteresis image. Within a data set, hysteresis lines are generated in many directions and then averaged in each pixel. For this purpose, the reading direction of the input lines is changed symmetrically within the half-circle and for each new direction a complete new data set is formed and averaged with the previous hysteresis processed data. The resulting averaged data represents the hysteresis image. A full frame viewing of the hysteresis image often requires only 4–8 different reading directions (i.e., a 45°–22.5° offset angle between each reading directions) for the suppression of major hysteresis streaking which, if recognizable, would indicate a lack in local hysteresis correlation (i.e., precision). At a low number of reading directions, streaks are observed when a large hysteresis cursor range (e.g., >~5% of the intensity range of the data) is used, high contrast image components are processed, or the image border is considered, wherein it is assumed that the hysteresis persists over a much larger area than that included in the averaging. The further away from a pixel's position a neighborhood has to cover, the more hysteresis line angles are required for hysteresis averaging. Streaking can be reduced to a non-disturbing level when massive processing of the 100–200 or more directions is applied. Such massively processed hysteresis images have a precision, such that they no longer show dependence on image content, cursor range and image border, sizes or depth. This level of precision is important for differential hysteresis imaging of the present invention.

Figure 26:
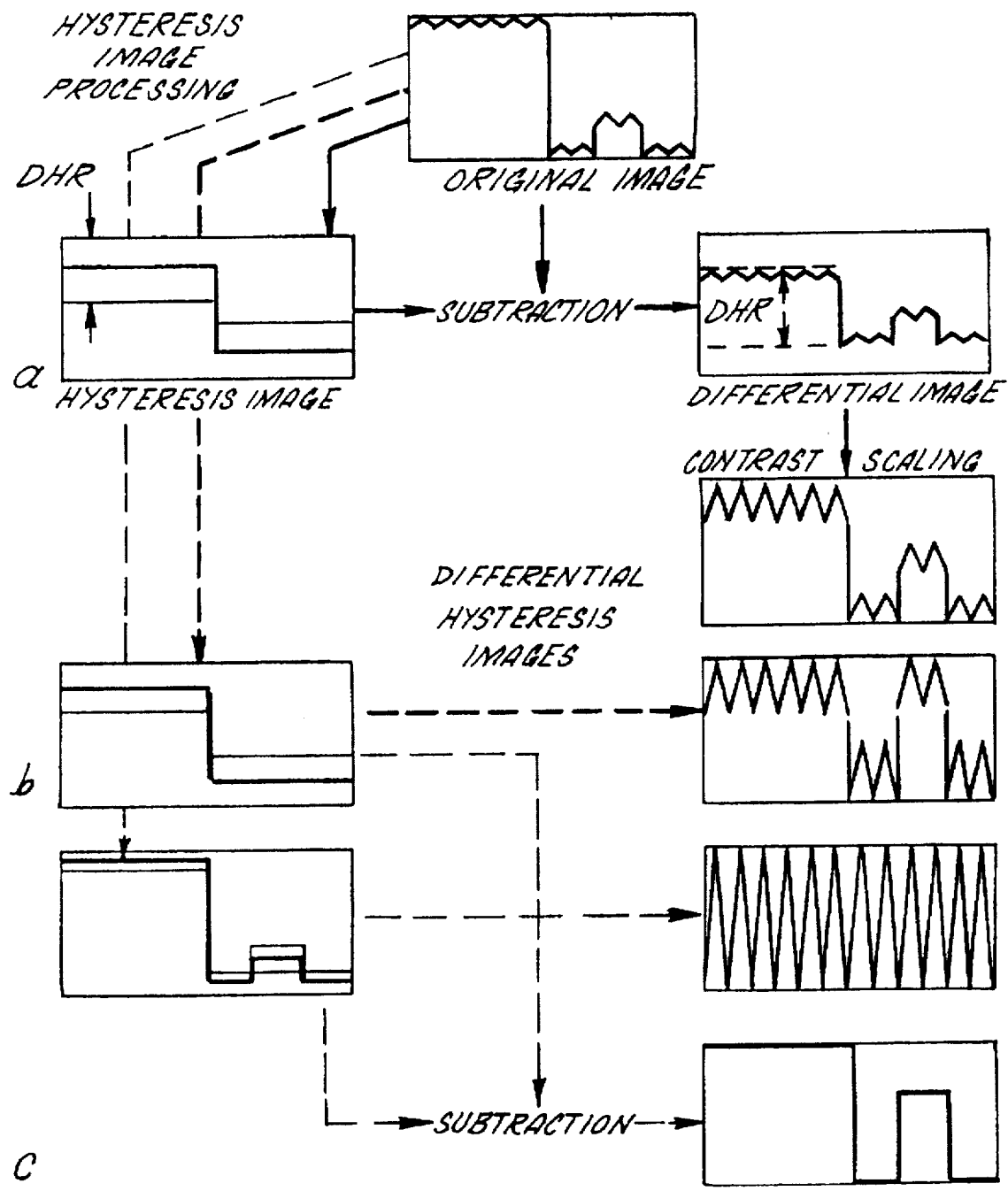
FIG. 26 is a block diagram illustrating differential hysteresis image processing in accordance with the present invention.

Referring to FIG. 26, high precision hysteresis images maintain all the characteristics of hysteresis lines, i.e., "pixel-accuracy" of preserved intensity components which were larger than the hysteresis range, by maintaining their spacial position and their intensity character, but reducing their individual maximum intensity range by as much as one half the cursor range. Also, eliminated intensity components which were smaller than the hysteresis range are replaced by a base intensity level which was determined by the bordering preserved data, see FIG. 26 designated "a". Differential hysteresis processing recovers those intensity components which were lost after hysteresis image processing through subtraction of the hysteresis image from the input image. Since the original image (i.e., raw data) can be interpreted as a hysteresis image of a hysteresis cursor range equal to one (i.e., the top and bottom values, as well as the reading point, all equal 1), differential images can be described as being processed with a differential hysteresis range equal to the bottom values of both hysteresis ranges. Then, the differential image has a maximum intensity range equal to the differential hysteresis range and contains all the intensity components removed from the original image by the hysteresis image processing. This includes all small intensity components of the original image which were larger than the top value of the differential hysteresis range and a representation of all original large intensity components which were smaller than the bottom value of the differential hysteresis range. More importantly, the differential image can contain spacial details as well as intensity details if included in the differential hysteresis range, see FIG. 26 designated "a". The limited intensity range of the differential image allows for linear scaling to the 8-bit range to produce the final differential hysteresis image. In general, the images do not need any further image processing since they have a balanced contrast range.

In hysteresis processing reduction of the differential hysteresis range value leads to a reduction of the intensity range of the differential image and stronger contrast enhancement of its information content in the scaled differential hysteresis image, see FIG. 26 designated "b". Smaller deferential hysteresis ranges excluded image components of the larger intensity range. At a certain minimum differential hysteresis range in images, where both detail components are present (i.e., intensity details and spacial details of smaller intensity ranges than intensity details), the intensity details are excluded from the differential hysteresis image because they are maintained in the hysteresis image. This pattern extraction provides a powerful new way for data reduction because it can separate from the original image, the differential hysteresis pattern of defined minimum and a maximum intensity variations. If the top value of the differential hysteresis range excludes the spacial details and the bottom value includes the intensity details, then the intensity detail can be extracted and the image scaled to the 8-bit range, as a discrete differential hysteresis image, see FIG. 26 designated "c". Accordingly, it will be appreciated that differential hysteresis imaging allows extraction and display of any contrast level of a given minimum and maximum range as a differential hysteresis pattern.

The specific "pixel-accuracy" of the hysteresis images (FIG. 26) allows a recovery of those intensity variations which were removed from an image (the original or the hysteresis image) by hysteresis processing. Subtraction of a hysteresis image from the original image produces a differential image of an intensity range equal to the hysteresis cursor range used for the generation of the hysteresis image. Due to its reduced intensity range the differential image can be linearly scaled to the full intensity range proportionally enhancing all contrasts of the details which may include spacial details as well as intensity details depending on the hysteresis range applied. Image features of contrasts larger than the hysteresis range are maintained only at a contrast equal to the maximum cursor range thus they will be imaged with reduced contrast contribution in the differential image. Decreasing hysteresis cursor ranges will result in increasing contrast enhancement of intensity variations smaller than the cursor range. In this way smallest spacial hysteresis details may be extracted from the original image. Alternatively, differential hysteresis images can be formed as well between two hysteresis images each processed with a different hysteresis range. Original image components of contrasts larger than the smaller hysteresis range and smaller than the larger hysteresis range will be extracted and contrast enhanced in proportion to the differential hysteresis range. In this way certain hysteresis patterns can be extracted from the original image and displayed as discrete images, i.e., the intensity hysteresis detail component. Importantly, hysteresis patterns are a powerful tool for data analysis since they are of discrete and additive character.

Referring to FIGS. 27A–F, objective visual evaluation of image enhancement is limited by the subjectivity of perception and recognition as well as the familiarity with the image content. For purposes of explanation of the differential hysteresis imaging process, these limitations are taken into consideration by using a common visual pattern, e.g., a human face. A portrait image was acquired with 1,024×1,024× 8-bit resolution with a CCD camera and input and output intensities were approximately linear over the full range of 256 intensity steps. While the general image pattern is familiar, the image details are somewhat unfamiliar, but were objectively and quantitatively accessible and presentable.

Figure 27A:
FIG. 27A is an original image of a human face.
Figure 27B:
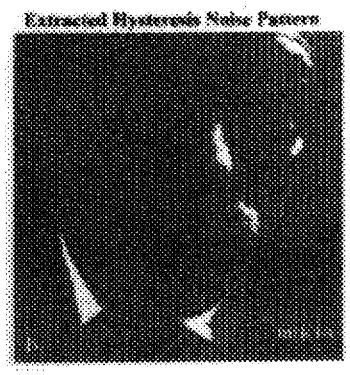
FIG. 27B is an extracted hysteresis noise pattern image obtained from the original image of FIG. 27A.
Figure 27C:
FIG. 27C is an extracted spacial hysteresis details image obtained from the original image of FIG. 27A.
Figure 27D:
FIG. 27D is an extracted intensity hysteresis details image obtained from the original image of FIG. 27A.
Figure 27E:
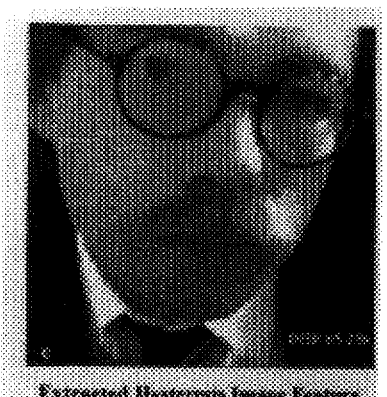
FIG. 27E is an extracted hysteresis image feature obtained from the original image of FIG. 27A.
Figure 27F:
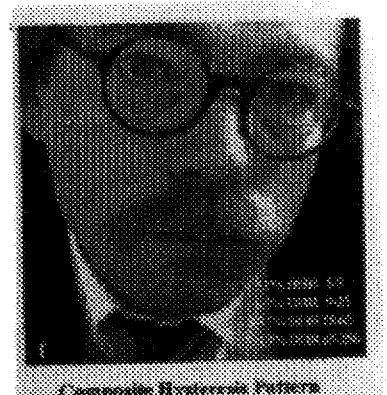
FIG. 27F is a composite hysteresis pattern image obtained from the images of FIGS. 27B-E.

The raw image (FIG. 27A) represents a video portrait (1,024×1,024 pixels) of 8-bit intensity range and contained some saturated high lights (i.e.,white areas). FIG. 27B shows the smallest intensity variations within a differential hysteresis range of 1 (i.e., the raw data image) and 9 intensity steps (indicated as DHR 1–9) represented a hysteresis noise pattern. Most images exhibit a hysteresis noise component as a structurally random pattern which may include some non-random components (e.g., in case of non-linear noise). FIG. 27C shows that successive differential hysteresis analysis with increased hysteresis values reveal a spacial hysteresis detail pattern. This component represented the smallest non-random contrasts which produced a visually useful coherent image. Generally, in all image data, this component included the high precision contrasts of an imaging system at the level of its contrast resolution. This pattern often extended only over short distances representing the smallest spacial image components. In this particular image they were found in small variations of light absorption and reflection on the face and the clothing. FIG. 27D shows that below the spacial hysteresis detail pattern resided a pattern of larger contrasts, the intensity hysteresis detail pattern. Often, this pattern represented contrasts which extended over larger areas then the spacial details. In this data set this component represented shadows from the directional illumination as well as facial characteristics. FIG. 27E reveals that the largest contrasts often represented the major structural features of an image. This hysteresis image feature pattern was bare of hysteresis detail data. It contained here the major compositional portrait components. FIG. 27F shows all the hysteresis patterns summed at the proportion at which they were found in the raw data and the resulting composite hysteresis pattern produced an image indistinguishable from the original image (FIG. 27A). The additive character of the discrete differential hysteresis patterns provided the basis for an objective visual display of all available data information as enhanced images.

Figure 28A:
FIG. 28A is an original image of a human face.
Figure 28B:
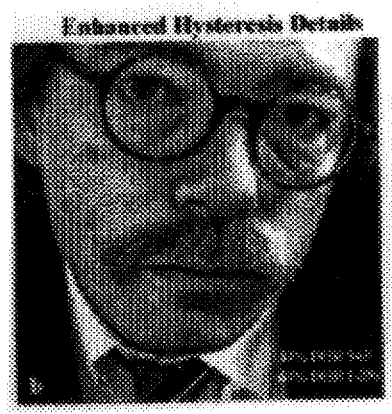
FIG. 28B is an enhanced hysteresis details image of the image of FIG. 28A.
Figure 28C:
FIG. 28C is an enhanced intensity hysteresis details image of the image of FIG. 28A.
Figure 28D:
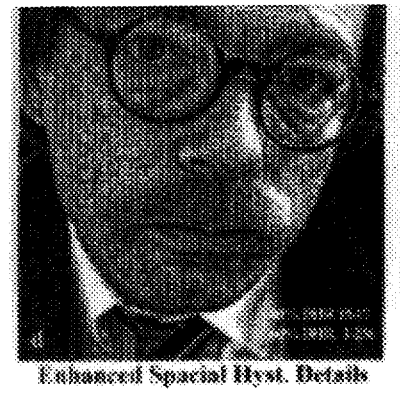
FIG. 28D is an enhanced spacial hysteresis details image of the image of FIG. 28A.

Referring to FIGS. 28A-D, a differential hysteresis enhanced display of the high precision detail information in a 8-bit video image is produced by adding to the image the previously extracted differential hysteresis pattern. FIG. 28A, which is the same as FIG. 27A shows that the original image which does not reveal many of the image details that the CCD camera captured due to its high sensitivity and resolution, but that are at or below visual recognition limits due to the contrast range in the final image. FIG. 28B shows that all of the differential hysteresis details present in the image data (DHR 9–65, differential hysteresis range of 9 and 65 intensity steps) were visually enhanced by adding to the original image (FIG. 28A) a portion of the hysteresis detail pattern. However, the smallest high precision contrasts still were not readily visible. A further amplification was required by adding selected contrast-enhanced detail patterns to the original image. FIG. 28C shows that selected intensity hysteresis details (contrast enhanced by a reduced DHR 35–37, differential hysteresis range of 35 and 37 intensity steps), were interactively added to the original image (FIG. 28A) in such proportion (i.e., 40%) that they were clearly recognizable. The enrichment of the original image with high contrast details clearly indicated their relationship to the whole image without interference from the low-contrast details. FIG. 28D shows that minute surface contrasts were visualized when selected spacial hysteresis contrasts (contrast enhanced by a narrow DHR of 15–17, differential hysteresis range of 15 and 17 intensity steps) were enriched in the original image (FIG. 28 A). This representation of the 8-bit image data visualized the high precision contrasts while maintaining the integrity of the whole image by including all other contrast components of larger contrast ranges. Most importantly, the present invention makes it possible to "see" the image data at the contrast resolution level of the digital camera.

Figure 29A:
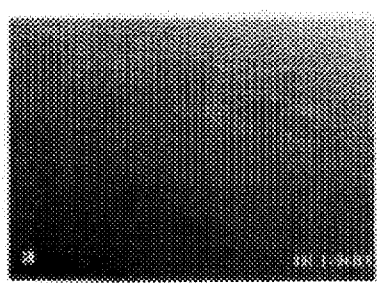
FIG. 29A is a raw data image of an ultra-thin section of plastic embedded retina tissue.
Figure 29B:
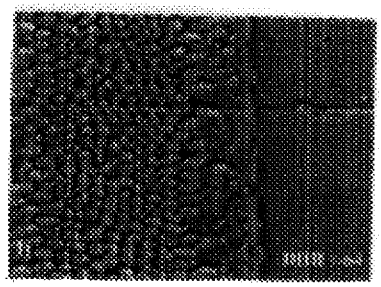
FIG. 29B is a differential hysteresis pattern image of a DHR 1-65 contrast range of the image of FIG. 29A.
Figure 29C:
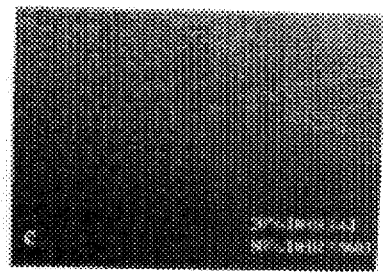
FIG. 29C is a differential hysteresis pattern image of a 20% DHR 1-64, 80% DHR 1-9603 contrast range of the image of FIG. 29A.
Figure 29D:
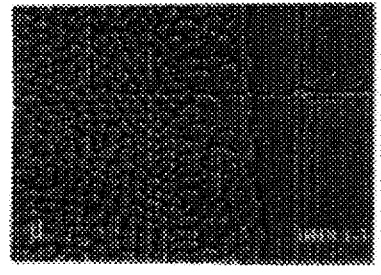
FIG. 29D is a differential hysteresis pattern image of a DHR 1-3 contrast range of the image of FIG. 29A.
Figure 29E:
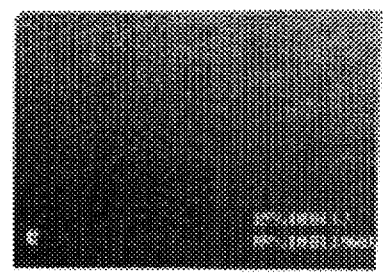
FIG. 29E is a differential hysteresis pattern image of a 15% DHR 1-3, 85% DHR 1-9603 contrast range of the image of FIG. 29A.
Figure 29F:
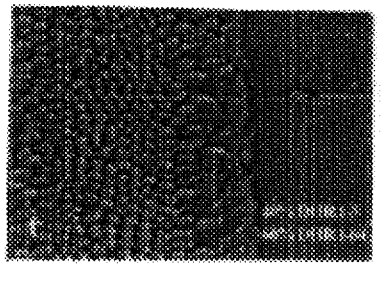
FIG. 29F is a differential hysteresis pattern image of a 40% DHR 1-3, 60% DHR 1-64 contrast range of the image of FIG. 29A.

An atomic force microscope is a high precision microscope having a contrast resolution 250-times higher than the human eye (i.e., 16-bit versus 8-bit). Referring to FIGS. 29A–F, differential hysteresis imaging provides visual access to the instruments precision imaging capabilities by enriching the precision contrasts patterns in scaled raw data images. FIG. 29A shows scaled raw data (intensity range (IR) 1–9,603) of an image of an ultra-thin section of plastic embedded retina tissue which was tilted to a 100 nm height difference at opposite edges (1 nm=10 Å=96 intensity steps). Minute surface contrasts were compressed by this low resolution contrast background (DHR 64–9,603) at a proportion of 38:1 and thus reduced or eliminated from the image. FIG. 29B shows that the major topographic details of this data set were imaged as a differential hysteresis pattern of ~5 Å (DHR=1–65) contrast range and revealed all the micro topography. This precision information was compressed to two intensity steps in the scaled 8-bit image and thus did not contain the major topography information (i.e., the tilted surface). FIG. 29C shows that micro and macro topography were displayed together by mixing the 8-bit scaled images of each component (80% DHR 1–9,603+20% DHR 1–65). FIG. 29D shows that the highest contrasts resolution was found in a differential hysteresis pattern that represented height information of 0.3 Å (DHR 1–3). Although limited by reduced spacial resolution, at low magnification, the microscopic data revealed at full contrast resolution an expected wealth of topographic details at an astonishing low level of noise. FIG. 29E shows that the maximum precision imaging capability can be visualized at the 14-bit level by hysteresis detail pattern enrichment (15% DHR 1-3+85% DHR 1-9,603) providing both the contrast of the major tilt and the contrast of the minor surface roughness. FIG. 29F shows that even the closer visual inspection of the extracted hysteresis detail image at the 6-bit level required an enhancement of the precision information (40% DHR 1-3+60% DHR 1-65) due to the limited visual perception. Thus, a step wise increase of contrast pattern enhancement was required for the visual presentation and recognition of all the image information in high precision micrographs.

Figure 30A:
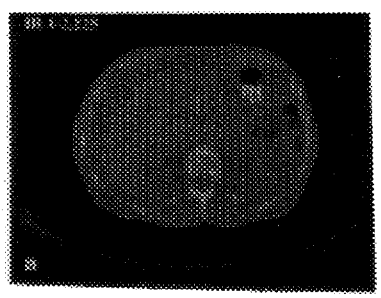
FIG. 30A is a computerized tomography cross section image.
Figure 30B:
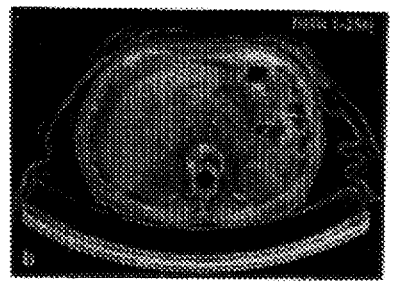
FIG. 30B is a differential hysteresis pattern image of a DHR 1-256 contrast range of the image of FIG. 30A.
Figure 30C:
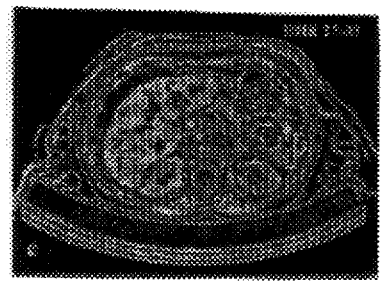
FIG. 30C is a differential hysteresis pattern image of a DHR 27-35 contrast range of the image of FIG. 30A.
Figure 30D:
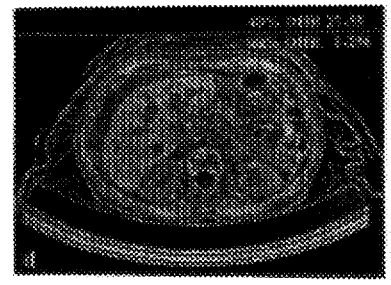
FIG. 30D is a differential hysteresis pattern image of a 40% DHR 27-35, 60% DHR 1-256 contrast range of the image of FIG. 30A.
Figure 30E:
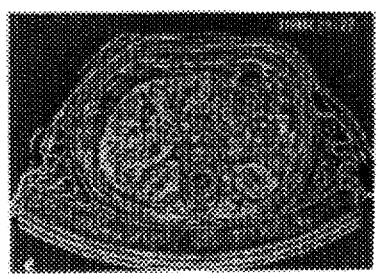
FIG. 30E is a differential hysteresis pattern image of a DHR 21-23 contrast range of the image of FIG. 30A.
Figure 30F:
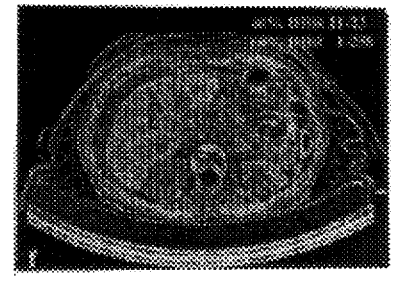
FIG. 30F is a differential hysteresis pattern image of a 40% DHR 21-23, 60% DHR 1-256 contrast range of the image of FIG. 30A.

Referring to FIGS. 30A–F, the conventional display of computerized tomography (CT) is shown to discriminate fine structural information and windowing (i.e., selected intensity range of imaged pixels) is used for the extraction of tissue-specific sensor data. This reduction data was based on the absorption coefficient for the bulk materials, but ignored that thickness contrasts of the same materials may be present but will be eliminated by the windowing. All available sensor contrasts can be made visible through differential hysteresis imaging in the non-windowed raw data and visual pattern recognition can be enhanced by enrichment of the precision differential hysteresis pattern in the data. FIG. 30A shows that a CT cross section (IR 1–2048) scaled to 8-bit image revealed little data. FIG. 30B shows that differential hysteresis image for a large differential hysteresis range of 8-bit improved the overall structural contrasts. FIG. 30C shows that the enhanced hysteresis intensity details (DHR 27–35) reveals details in all tissues, i.e., the liver region showed a dramatic increase of fine structures. FIG. 30D shows an improved image with enriched selected intensity details (40% DHR 27–35+60% DHR 1–256). FIG. 30E shows that the highest contrast resolution hysteresis detail patterns (DHR 21–23) were found below the relatively small noise component (1% IR). Although noisy, the liver fine structure indicated a zoning and ultra structures at the level of single canaliculae and vessels. FIG. 30F shows that an improved image was obtained by enrichment of the spacial hysteresis details. The differential hysteresis enhancement revealed that the signal-to-noise ration of the spacial details was insufficient for utilizing the surprisingly high spacial resolution of the CT data acquisition system. The extension of image resolution by differential hysteresis imaging provides a powerful tool in optimizing imaging devices.

Figure 31A:
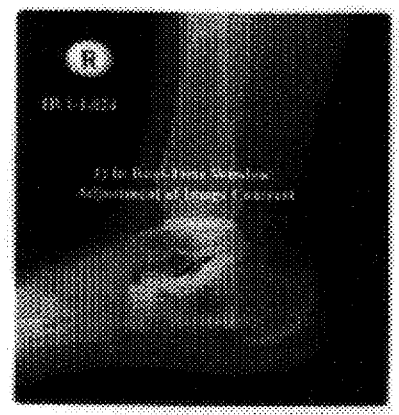
FIG. 31A is a digital Fugi plate image.
Figure 31B:
FIG. 31B is a differential hysteresis pattern image of a DHR 1-256 contrast range of the image of FIG. 31A.
Figure 31C:
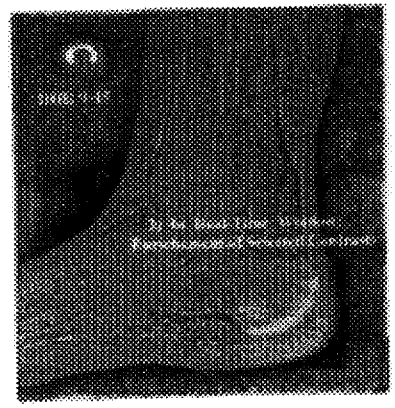
FIG. 31C is a differential hysteresis pattern image of a DHR 9-15 contrast range of the image of FIG. 31 A.
Figure 31D:
FIG. 31D is a differential hysteresis pattern image of a 25% DHR 9-15, 75% DHR 1-256 contrast range of the image of FIG. 31A.

Referring to FIGS. 31A–D, the important contrasts of a image data set can be found interactively with ease under computer mouse control by applying the differential hysteresis filters and the pattern enrichment in a "real-time window". FIG. 31A shows a digital Fuji plate image (i.e., raw data 884×947×10-bit: IR=1–1,024) of an extremity, which did not reveal much detail. In a first step, an adjustment for the overall detail contrast was performed in order to see the data as an acceptable image. The real-time window was placed over an apparent area of poor visibility and the differential hysteresis range was decreased from its maximum value (DHR 1–1,024) to a range at which the image contrasts were slightly increased to a familiar level (DHR 1–256). Then the whole image was processed with the determined differential hysteresis range generating the adjusted image. FIG. 31B shows that in a second step, within the adjusted image the area of interest was defined and diagnostically important contrasts were determined and enhanced. Here, soft was well as hard tissue were analyzed using a narrow differential hysteresis range which excluded the hysteresis noise component but including the spacial precision information (DHR 9–15). FIG. 31C shows that the diagnostically important contrasts were enriched in the adjusted data at an appropriate percentage using the real-time window (25% DHR 9–15 and 75% DHR 1–64). FIG. 31D shows that the sensor data could be visualized combined in an enhanced image, extending the contrast resolution from that of the eye to that of the sensor. High contrast resolution was found only within 0.5% of the IR which indicated a very low contrast resolution of the imaging plate compared to that of the digitized film radiogram. The differential hysteresis range of the spacial differential hysteresis pattern can be used as a quantitative tool for optimizing the acquisition parameters.

TABLE 1

```
/************************************************************
*           APx Hysteresis Smoothing Functions
*
*           (c) Copyright Visionary Systems Inc. 1992, 1993
*
*
* These functions process images on Visionary Systems' APx boards.
*
* The images are processed using 16-bit signed integer arithmetic, unless
*
* specified otherwise.  Images in APx memory are referred to by number,
*
* with the allowable range dependent on the memory configuration of the
*
* APx system.
*
*
* dst, src:    Source and destination image numbers.
*
*              Unless otherwise noted,'src' and 'dst' can be the same.
*
* Return values: 0 = successful completion
*
*                1 = program load error
*
*                2 = subroutine selection error
*
*                3 = subroutine parameter error
*
*                4 = subroutine timeout error
*
*                5 = subroutine result error
*
************************************************************/
include <stdio.h>
include <stdlib.h>
#include <ctype.h>
#include <conio.h>
#include <math.h>
#include "\apx\apx.h"

static struct apx_config   *cfg;
static unsigned short      rows, columns, col_per_proc;
static unsigned short      max_image, image_incr;
static unsigned short      params[8];
static unsigned short      pattern[2][2*16];  /* hysteresis line patterns */
static double              pi = 3.14159265359;

/************************************************************
* apx_setup  -  The size of images to be processed is specified in 'nrows'
*
*               and 'ncols'. 'ncols' must be a multiple of the two times the
*
*               number of processing elements for packed 8-bit pixels.
************************************************************/
int apx_setup(struct apx_config *cf, int nrows, int ncols) {
    cfg = cf;
    rows = nrows;
    columns = ncols/2;  /* packed pixels */
    if (cfg == NULL) return(1);
```

TABLE 1-cont'd

```
    if (columns < cfg->numprocs || rows < 1) return(3);
    if (columns % cfg->numprocs != 0) return(3);
    col_per_proc = columns / cfg->numprocs;
    max_image = (unsigned short)((cfg->sizevmem)/((long)rows*col_per_proc))-1;
    if (max_image < 3) return(1);
/*  image_incr = rows * col_per_proc; */
    image_incr = 1024 * 4;
    return(0);
}

/************************************************************************
 * call - Move parameters to APx and call APx subroutine.
 *
 ************************************************************************/
static int call(char *entry, int dst, int src) {
    int result;
    if (src < 1 || src > (int)max_image) return(3);
    if (dst < 0 || dst > (int)max_image) return(3);
    params[0] = dst * image_incr;
    params[1] = src * image_incr;
    params[2] = col_per_proc;
    params[3] = rows;
    apx_put(params,0,0,8L);
    if (apx_select(entry,NULL)) return(2);
    apx_go();
    result = apx_wait(60);
    if (result > 0) result = 5;
    if (result < 0) result = 4;
    return(result);
}

/************************************************************************
 * apx_hysteresis   -  The 'src' image is filtered into the 'dst' image using
 *
 *                  a hysteresis algorithm.
 *
 *                  The 'dst' image number must be a multiple of 2.
 *
 ************************************************************************/
static void make_pattern(int j, double theta);

int apx_hysteresis(int dst,int src,short height,short numlines,short maxval) {
    int result, i;
    if (dst&1) return(3);
    if (numlines<8 || numlines > 128 || numlines%8 != 0) return(3);
    if ((height&1) == 0) height++;
    if (height < 1) return(3);
    if (cfg == NULL) return(1);
    params[4] = height/2;
    params[5] = numlines/8;
    params[6] = (1<<maxval)-1;
    params[7] = (maxval<=8? 0: 3);  /* crude shift distance calculation; should
be improved later */
    for (i=0; i<numlines/8; i++)
        make_pattern(i, pi/4+i*pi/(4*numlines/8));
    apx_put(pattern[0],1,0,32L);
    apx_put(pattern[1],2,0,32L);
    col_per_proc *= 2;
    result = call("apx_hysteresis",dst,src);
    col_per_proc /= 2;
    return(result);
}
```

TABLE 1-cont'd

```
/******************************************************************
 * make_pattern - Make pattern for apx_hysteresis.
 *
 ******************************************************************/
static long round(double x) {
    double y;
    long n;
    if (x < 0.0) y = -x; else y = x;
    n = (long)(y+0.5);
    if (x < 0.0) n = -n;
    return(n);
} static void make_pattern(int j, double theta) {
define PL 32  /* pattern length */
    int i;
    double tanx, fi;
    unsigned long y=0, y2=0;
    long b;
    b = round(PL/tan(theta));
    if (b==0) tanx=tan(theta);
    else tanx = (double)PL/b;
    fi = 0.0;
    for (i=0;i<PL;i++) {
        y <<= 1;
        y2 >>= 1;
        if (round((fi+1.0)/tanx) != round(fi/tanx)) {
            y++;
            y2 |= 0x80000000;
        }
        fi += 1.0;
    }
    pattern[0][2*j]   = (unsigned short)(y & 0xffff);
    pattern[0][2*j+1] = (unsigned short)(y >>16);
    pattern[1][2*j]   = (unsigned short)(y2 & 0xffff);
    pattern[1][2*j+1] = (unsigned short)(y2 >>16);
    return;
}
```

TABLE 1 cont'd

```
/************************************************************
*                                                            *
*   APx Subroutines for Image Processing                     *
*                                                            *
*   Copyright 1992: Visionary Systems Inc. All rights reserved. *
*                                                            *
************************************************************/
NPE     equ     128
        sysinfo 16 NPE                  ; 16-bit words, NPE processing elements
        export  apx_hysteresis
        import  transpos2_inplace
        import  apx_debugger
        optim   space off /************************************************************
* get_hparams  -  Load hysteresis parameters.                *
************************************************************/
; Registers:
;   ar0  =  temporary
;   ar1  =  temporary
;   ar10=   local counter shift distance
;   ar11=   output base address
;   ar12=   input base address
;   ar13=   #rows
;   ar14=   columns/PE (depth)
;   ar15=   number of hysteresis lines/8
;   r11  =  max. pixel value
;   r12  =  pattern vector 0
;   r13  =  pattern vector 1
;   r14  =  cursor height/2
        seg code
get_hparams:
        ld      r0  0           ; r0 = input parameters
        ldoel   lp  r15         ; lp = PE0
        bcast   ar11 lp         ; ar11 = output base address
        shoel   lp
        bcast   ar12 lp         ; ar12 = input base address
        shoel   lp
        bcast   ar14 lp         ; ar14 = depth (#cols / #processors)
        shoel   lp
        bcast   ar13 lp         ; ar13 = #rows
        shoel   lp
        bcast   ar0 lp          ; ar0 = cursor height/2
        shoel   lp
        bcast   ar15 lp         ; ar15 = #lines/8
        shoel   lp
        bcast   ar1 lp          ; ar1 = max. pixel value
        shoel   lp
        bcast   ar10 lp         ; ar10 = local counter shift dist.
        bcast   all ar1
        move    r11 r0          ; r11 = max. pixel value
        ld      r12 1           ; r12 = pattern vector 0
        ld      r13 2           ; r13 = pattern vector 1
        bcast   all ar0
        move    r14 r0          ; r14 = height/2
        ret /************************************************************
* apx_hysteresis  -  The 'src' image is filtered into the 'dst' image using
*
*                    the Univ. of Conn. hysteresis algorithm.
*
************************************************************/
; Local memory map:
```

TABLE 1 cont'd

```
;    0       = sums storage (lsw,msw for each column)
;    2*depth = input row storage
;    3*depth = midpoint storage (one group of columns for each line pattern)
;
; Global register assignments:
;    ar7  =   pattern mask low
;    ar8  =   pattern mask msw
;    ar9  =   row offset
;    ar10 =   local counter shift distance
;    ar11 =   output base address
;    ar12 =   input base address
;    ar13 =   #rows
;    ar14 =   columns/PE (depth)
;    ar15 =   number of hysteresis lines/8
;    r11  =   max. pixel value
;    r12  =   pattern vector 0
;    r13  =   pattern vector 1
;    r14  =   cursor height/2
; Local registers:
;    ar0-ar6 =   temporary
;    r0-r10  =   temporary
         seg code
apx_hysteresis:
         call    get_hparams         ; load parameters
; initialize the sums
         bcast   all ar15
         shl     r0  r0  2           ; r0 = #lines/2 (for rounding on divide)
         if ar10 nz then
            for ar10 do
               shr  r0  r0  1        ; shift initial value
            end                      ; end for
         end                         ; end if
         move    ar0 ar11            ; ar0 = output pointer
         for ar14 do                 ; for all columns
            refresh
            for ar13 do              ; for all rows
               st    r0  [ar0++]     ; initialize counters
            end
         end
; miscelaneous initializations
         clr     ar8                 ; initialize pattern mask
         clr     ar7
         clr     ar9                 ; clear data offset
; vertical hysteresis
         call    hyst_ur             ; hysteresis up,right
         call    hyst_dl             ; hysteresis down,left
         call    not_patt1           ; invert the first pattern
         call    hyst_ul             ; hysteresis up,left
         call    hyst_dr             ; hysteresis down,right
; transpose the input data & sums
         move    ar0 ar12            ; ar0 = input base address
         move    ar1 ar12            ; ar1 = input base address
         move    ar2 ar14            ; ar2 = cols/PE
         move    ar3 ar14            ; ar3 = rows/PE
         call    transpos2_inplace   ; transpose the input data
         move    ar0 ar11            ; ar0 = output base address
         move    ar1 ar11            ; ar1 = output base address
         call    transpos2_inplace   ; transpose the counters
; horizontal hysteresis
         call    hyst_ur             ; hysteresis up,right
         call    hyst_dl             ; hysteresis down,left
         call    not_patt1           ; invert the first pattern
         call    hyst_ul             ; hysteresis up,left
         call    hyst_dr             ; hysteresis down,right
```

TABLE 1 cont'd

```
; divide totals
        move    ar0 ar11           ; ar0 = output base addr.
        clr     r2                 ;
        bcnst   all ar15           ;
        move    r5 r0              ; r5 = # lines/8
        ldi     ar1 3              ;
        sub     ar1 ar10           ; ar1 = global shift distance
        if ar1 nz then             ;
           for ar1 do              ; for global shift count
              shl r5 r5 1          ; shift divisor
           end                     ; end for
        end                        ; end if
        for ar14 do                ; for all columns
           refresh                 ; the pause that refreshes
           for ar13 do             ; for all rows
              ld r1 {ar0}          ; load total
              div r4 r1 r2 r1 r5   ; divide by #lines/8
              st r4 {ar0++}        ; store output value
           end                     ; end for all rows
        end                        ; end for all columns
; transpose the input & output data
        move    ar0 ar12           ; ar0 = input base address
        move    ar1 ar12           ; ar1 = input base address
        move    ar2 ar14           ; ar2 = cols/PE
        move    ar3 ar14           ; ar3 = rows/PE
        call    transpos2_inplace  ; transpose the input data
        move    ar0 ar11           ; ar0 = output base address
        move    ar1 ar11           ; ar1 = output base address
        call    transpos2_inplace  ; transpose the output data
        ret                        ; return to system /************************************************************
* hyst_setup - Initialization for hysteresis routines.      *
************************************************************/
hyst_setup:
        refresh                    ; the pause that refreshes
        clr     ar5                ; ar5 = column offset
        if ar9 nz then             ; if beyond top row,
           sub  ar5 ar14           ; ar5 = offset for top row
        end                        ;
        move    ar1 ar14           ;
        add     ar1 ar14           ;
        add     ar1 ar14           ; ar1 = midpoint base ptr
        for ar14 do                ; for all columns
           call adjust_midpoints   ; read & adjust initial midpoints
           inc  ar5                ;
           move ar2 ar1            ; ar2 = midpoint pointer
           for ar15 do             ; for all line patterns
              st r10 {ar2}         ; store midpoint data in local memory
              add ar2 ar14         ; ar2 += depth
           end                     ; end for all line patterns
           inc ar1                 ; point to next column
        end                        ; end for all columns
        ret                        ;

/************************************************************
* hyst_?? - Hysteresis (up/down, left/right) routines.      *
************************************************************/
hyst_ur:
        call    hyst_setup         ; hysteresis setup code
        ldsnl   rp r15             ; rp = PE0
        clr     ar5                ; ar5 = offset to 1st shift column
        for ar13 do                ; for all rows
           call process_row        ; process an input row
```

TABLE 1 cont'd

```
        call    shift_mask          ; shift the pattern mask
        call    adjust_midpoints    ; fixup the midpoints
        for ar15 do                 ; for all line patterns
            move    r0  r12         ; r0 = pattern vector 0
            call    get_mask        ; ar2 = shift flag
            if ar2 nz then          ; if non-zero, shift the midpoints
                move    r1  r10     ; r1 = first column midpoint
                for ar14 do         ; for all columns
                    ldi     r0  [ar1]   ; r0 = midpoints
                    right   r0  r0  1   ; shift to right neighbor
                    move    r2  r0      ;
                    move    r0  r1  rp  ; handle wraparound
                    sti     r0  [ar1++] ; save shifted midpoints
                    move    r1  r2      ;
                end                     ; end for all columns
            else                        ; else if not shifting,
                add     ar1 ar14        ; point to next set of midpoints
            end                         ; end if
        end                             ; end for all line patterns
        add     ar9 ar14                ; point to next row
    end                                 ; end for all rows
    ret hyst_dl:
    call    hyst_setup              ; hysteresis setup code
    set     r0                      ;
    ldsel   rp  r0                  ; clear rp flags
    nhsel   rp  1                   ; rp = rightmost PE
    move    ar5 ar14                ; ar5 = offset to 1st shift column
    dec     ar5                     ;
    for ar13 do                     ; for all rows
        sub     ar9 ar14            ; point to next row
        call    shift_mask          ; shift the pattern mask
        call    adjust_midpoints    ; fixup the midpoints
        add     ar1 ar5             ; ar1 = midpoint ptr. (last col, 1st block)
        for ar15 do                 ; for all line patterns
            move    r0  r13         ; r0 = pattern vector 1
            call    get_mask        ; ar2 = shift flag
            if ar2 nz then          ; if non-zero, shift the midpoints
                move    r1  r10     ; r1 = last column midpoints
                for ar14 do         ; for all column
                    ldi     r0  [ar1]   ; r0 = midpoints
                    left    r0  r0  1   ; shift to left neighbor
                    move    r2  r0      ;
                    move    r0  r1  rp  ; handle wraparound
                    sti     r0  [ar1--] ; save shifted midpoints
                    move    r1  r2      ;
                end                     ; end for all columns
                add     ar1 ar14        ;
            end                         ; end if
            add     ar1 ar14            ; point to next set of midpoints
        end                             ; end for all line patterns
        call    process_row             ; process an input row
    end                                 ; end for all rows
    ret                                 ;

hyst_ul:
    call    hyst_setup              ; hysteresis setup code
    set     r0                      ;
    ldsel   rp  r0                  ; clear rp flags
    nhsel   rp  1                   ; rp = rightmost PE
    move    ar5 ar14                ; ar5 = offset to 1st shift column
    dec     ar5                     ;
    for ar13 do                     ; for all rows
```

TABLE 1-cont'd

```
         call   process_row          ; process an input row
         call   shift_mask           ; shift the pattern mask
         call   adjust_midpoints     ; fixup the midpoints
         add    ar1 ar5              ; ar1 = midpoint ptr. (last col, 1st block)
         for ar15 do                 ; for all line patterns
           move    r0   r12          ; r0 = pattern vector 0
           call    get_mask          ; ar2 = shift flag
           if ar2 nz then            ; if non-zero, shift the midpoints
             move  r1   r10          ; r1 = last column midpoints
             for ar14 do             ; for all columns
               ldl    r0   [ar1]     ; r0 = midpoints
               left   r0   r0   1    ; shift to left neighbor
               move   r2   r0        ;
               move   r0   r1   rp   ; handle wraparound
               stl    r0   [ar1--]   ; save shifted midpoints
               move   r1   r2        ;
             end                     ; end for all columns
             add    ar1 ar14         ;
           end                       ; end if
           add    ar1 ar14           ; point to next set of midpoints
         end                         ; end for all line patterns
         add    ar9 ar14             ; point to next row
         end                         ; end for all rows
         ret                         ;

hyst_dr:
         call    hyst_setup          ; hysteresis setup code
         ldsel   rp   r15            ; rp = PE0
         clr     ar5                 ; ar5 = offset to 1st shift column
         for ar13 do                 ; for all rows
           sub    ar9 ar14           ; point to next row
           call   shift_mask         ; shift the pattern mask
           call   adjust_midpoints   ; fixup the midpoints
           for ar15 do               ; for all line patterns
             move   r0   r13         ; r0 = pattern vector 1
             call   get_mask         ; ar2 = shift flag
             if ar2 nz then          ; if non-zero, shift the midpoints
               move  r1   r10        ; r1 = first column midpoints
               for ar14 do           ; for all columns
                 ldl    r0   [ar1]   ; r0 = midpoints
                 right  r0   r0   1  ; shift to right neighbor
                 move   r2   r0      ;
                 move   r0   r1   rp ; handle wraparound
                 stl    r0   [ar1++] ; save shifted midpoints
                 move   r1   r2      ;
               end                   ; end for all columns
             else                    ; else if not shifting,
               add    ar1 ar14       ; point to next set of midpoints
             end                     ; end if
           end                       ; end for all line patterns
           call   process_row        ; process an input row
         end                         ; end for all rows
         ret                         ;

/***********************************************************************
* process_row - Hysteresis processing on a row of data.                *
***********************************************************************/
process_row:
; clear local memory sums
         clr    ar0                  ; point to sums
         clr    r1                   ;
         ldl    r1    4              ; set initial sum = 4 (for rounding)
         clr    r2                   ;
         for ar14 do                 ; for all columns
```

TABLE 1 cont'd

```
        stl     r1     [ar0++]         ; clear sum low
        stl     r2     [ar0++]         ; clear sum msw
        end                            ; end for all columns
; read input data into local memory
        move    ar1 ar12               ;
        add     ar1 ar9                ; ar1 = xmem input data ptr.
        move    ar2 ar0                ; ar2 = lmem input data ptr.
        for ar14 do                    ; for all columns
            ld      r0     [ar1++]     ; read input data
            stl     r0     [ar0++]     ; copy input data to local memory
        end                            ; end for all columns
; compare input data with all midpoints & add midpoints to sums
        clr     r7                     ; r7 = zero
        for ar15 do                    ; for all line patterns
            clr     ar4                ; ar4 = sums pointer
            move    ar1 ar2            ; ar1 = input data ptr.
            for ar14 do                ; for all columns
                ldl     r10    [ar0]   ; r10 = midpoint
                ldl     r0     [ar1++] ; r0 = input data
                move    r8     r10
                sub     r8     r14     ; r8 = current low
                move    r9     r10
                add     r9     r14     ; r9 = current high
                ifv  r0 slt r8 then    ; if pixel < low
                    move    r10 r0     ; r10 = new midpoint
                    add     r10 r14    ; add height/2
                end ifv
                ifv  r0 sgt r9 then    ; if pixel > high
                    move    r10 r0     ; r10 = new midpoint
                    sub     r10 r14    ; subtract height/2
                end                    ; end ifv
                stl     r10   [ar0++]  ; store midpoint data
                ldl     r1    [ar4++]  ; r1 = sum lsw
                ldl     r2    [ar4--]  ; r0 = sum msw
                add     r1    r10      ; add midpoint to sum
                addc    r2    r7       ;
                stl     r1    [ar4++]  ; store sum
                stl     r2    [ar4++]  ;
            end                        ; end for all columns
        end                            ; end for all line patterns
; update external memory sums
        clr     ar0                    ; ar0 = local sum pointer
        move    ar1 ar11               ;
        add     ar1 ar9                ; ar1 = external sum pointer
        for ar14 do                    ; for all columns
            ldl     r2     [ar0++]     ; r2 = sum lsw
            ldl     r4     [ar0++]     ; r4 = sum msw
            ld      r0     [ar1]       ; get external sum if ar10 nz then            ;
                for ar10 do            ; for local shift count
                    shr     r4  r4  1  ; shift local sum
                    shrc    r2  r2  1  ;
                end                    ; end for
            end                        ; end if ;           shr     r3  r2  3          ; divide local sum by 8
;           shl     r2  r4  13         ;
;           or      r2  r3             ;
            add     r0  r2             ; add local sum to external sum
            st      r0     [ar1++]     ; store new external sum
        end                            ; end for all columns
        refresh                        ; the pause that refreshes
        ret                            ;
```

78

TABLE 1 cont'd

```
/************************************************************
* adjust_midpoints - Read input data & convert it to a midpoint.  *
************************************************************/
adjust_midpoints:
        move    ar0 ar12        ;
        add     ar0 ar9         ;
        add     ar0 ar5         ; ar2 = xmem input data ptr.
        ld      r10 [ar0]       ; read input data
        ifv r10 slt r14 then    ; if midpoint < height/2
          move  r10 r14         ; midpoint = height/2
        end                     ; end ifv
        move    r9  r11         ; r9 = max. pixel value (255 ?)
        sub     r9  r14         ; high = max. value - height/2
        ifv r10 sgt r9 then     ; if midpoint > high
          move  r10 r9          ; midpoint = high
        end                     ; end ifv
        ret                     ;

/************************************************************
* get_mask & shift_mask - Pattern mask handling subroutines.  *
************************************************************/
shift_mask:
        move    ar1 ar14        ;
        add     ar1 ar14        ;
        add     ar1 ar14        ; ar1 = midpoint base ptr
        ldoel   lp  r15         ; lp = PE0
        add     ar8 ar8         ; shift mask mnw
        add     ar7 ar7         ; shift mask lsw
        if cf then              ; if carry then,
          inc   ar8             ; increment mask mnw
        end                     ; end if
        if ar7 z then           ; if mask is zero,
          if ar8 z then         ;
            inc ar7             ; reset to 1
          end                   ;
        end                     ;
        ret                     ;

get_mask:
        bcast   ar2 lp          ; ar2 = pattern lsw
        shnel   lp              ;
        and     ar2 ar7         ; "and" pattern with mask
        bcast   ar3 lp          ; ar3 = pattern msw
        shnel   lp              ;
        and     ar3 ar8         ; "and" pattern with mask
        add     ar2 ar3         ; add the masked patterns
        ret                     ;

not_patt1:
        ldoel   lp  r15         ; lp = PE0 & PE1
        shnel   lp  1           ;
        move    r0  r12         ;
        not     r0              ; invert the first pattern
        move    r12 r0  lp      ;
        move    r0  r13         ;
        not     r0              ; invert the first pattern
        move    r13 r0  lp      ;
        ret                     ;
        end_program
```

TABLE 1

```
/************************************************************
 *            APx Detail Extraction Functions
 *
 *            (c) Copyright Visionary Systems Inc. 1992, 1993
 *
 *
 * These functions process images on Visionary Systems' APx boards.
 *
 * The images are processed using 16-bit signed integer arithmetic, unless
 *
 * specified otherwise.  Images in APx memory are referred to by number,
 *
 * with the allowable range dependent on the memory configuration of the
 *
 * APx system.
 *
 *
 * dst, src;    Source and destination image numbers.
 *
 *              Unless otherwise noted,'src' and 'dst' can be the same.
 *
 * Return values: 0 = successful completion
 *
 *                1 = program load error
 *
 *                2 = subroutine selection error
 *
 *                3 = subroutine parameter error
 *
 *                4 = subroutine timeout error
 *
 *                5 = subroutine result error
 *
 ************************************************************/ include <stdio.h>
include <stdlib.h>
#include <ctype.h>
#include <conio.h>
#include <math.h>
#include "\apx\apx.h"

static struct apx_config  *cfg;
static unsigned short     rows, columns, col_per_proc;
static unsigned short     max_image, image_incr;
static unsigned short     params[8];

/************************************************************
 * apx_setup -  The size of images to be processed is specified in 'nrows'
 *
 *              and 'ncols'.  'ncols' must be a multiple of the two times the
 *
 *              number of processing elements for packed 8-bit pixels.
 *
 ************************************************************/
int apx_setup(struct apx_config *cf, int nrows, int ncols) {
    cfg = cf;
    rows = nrows;
    columns = ncols/2; /* packed pixels */
    if (cfg == NULL) return(1);
    if (columns < cfg->numproc || rows < 1) return(3);
    if (columns % cfg->numproc != 0) return(3);
```

TABLE 1 cont'd

```
    col_per_proc = columns / cfg->numprocs;
    max_image = (unsigned short)((cfg->sizevmem)/((long)rows*col_per_proc))-1;
    if (max_image < 3) return(3);
/*  image_incr = rows * col_per_proc; */
    image_incr = 1024 * 4;
    return(0);
}

/************************************************************************
 *  call - Move parameters to APx and call APx subroutine.
 *
 ************************************************************************/
static int call(char *entry, int dst, int src) {
    int result;
    if (src < 1 || src > (int)max_image) return(3);
    if (dst < 0 || dst > (int)max_image) return(3);
    params[0] = dst * image_incr;
    params[1] = src * image_incr;
    params[2] = col_per_proc;
    params[3] = rows;
    apx_put(params,0,0,8L);
    if (apx_select(entry,NULL)) return(2);
    apx_go();
    result = apx_wait(60);
    if (result > 0) result = 5;
    if (result < 0) result = 4;
    return(result);
}

/************************************************************************
 * apx_sub_stretch -  The 'src' image is subtracted from the 'dst' image and
 *
 *                    contrast stretched.
 *
 ************************************************************************/
int apx_sub_stretch(int dst,int src) {
    int result;
    if (cfg == NULL) return(1);
    if (apx_select("apx_sub_stretch",NULL)) return(2);
    apx_go();
    result = apx_wait(60);
    if (result > 0) result = 5;
    if (result < 0) result = 4;
    return(result);
}
```

TABLE 1 cont'd

```
/***********************************************************
*                                                           *
*   APx Subroutines for Image Processing                    *
*                                                           *
*   Copyright 1992: Visionary Systems Inc. All rights reserved. *
*                                                           *
***********************************************************/
NPE     equ     128
        sysinfo 16 NPE               ; 16-bit words, NPE processing elements
        export  apx_sub_stretch
        import  apx_debugger
        optim   space off /***********************************************************
* apx_sub_stretch  - Subtract one image from another.       *
*                    Next, find the minimum & maximum pixel values. *
*                    Finally, do linear contrast stretching to range 0-255. *
* Note: The two images are assumed to be 1Kx1Kx16-bit and stored at 0x0000 *
*       and 0x2000; the result image is 1Kx1Kx16-bit at location 0x0000.   *
***********************************************************/
        seg code
apx_sub_stretch:
; subtract the images and find minimum & maximum pixel values
        ldi     ar1 0                ; ar1 = image 1
        ldi     ar2 0x2000           ; ar2 = image 2
        ldi     r3  32767            ; r3 = minimum value
        ldi     r4  -32767           ; r4 = maximum value
        for 1024*1024/NPE do         ; for all pixels
          refresh                    ; the pause that refreshes
          ld    r1  [ar1]            ;
          ld    r0  [ar2++]          ;
          sub   r0  r1               ;
          st    r0  [ar1++]          ;
          ifv   r0 slt r3            ; if output < min
            move  r3 r0              ; r3 = new min
          end
          ifv   r0 sgt r4            ; if output > max
            move  r4 r0              ; r4 = new max
          end
        end                          ; end for loop
; find global minimum & maximum pixel values
        for NPE do                   ; for all PE's
          right r0 r3 1              ; send min to neighbor
          ifv   r0 slt r3            ; if output < min
            move  r3 r0              ; r3 = new min
          end
          right r0 r4 1              ; send max to neighbor
          ifv   r0 sgt r4            ; if output > max
            move  r4 r0              ; r4 = new max
          end
        end                          ; end for all PE's
; do linear contrast stretching
        ldi     ar1 0                ; ar1 = image 1
        ldi     r2  255              ; r2 = maximum output value
        sub     r4  r3               ; r4 = max - min
        for 1024*1024/NPE do         ; for all pixels
          refresh                    ; the pause that refreshes
          ld    r1  [ar1]            ; r1 = input pixel
          sub   r1  r3               ; r1 = in - min
          mul   r6 r5 r1 r2          ; r6,r5 = 255*(in-min)
          ifv   r4 z then            ; if (max-min) == 0
            clr r0                   ; r0 = 0
          elsev                      ; else r4 != 0
            div r0 r1 r6 r5 r4       ; r0 = 255*(in-min)/(max-min)
```

TABLE 3 cont'd

```
  end                      ; end lfv
  st    r0   [ar1++]       ;
end                        ; end for loop
ret                        ; return to system
end_program
```

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of enhancing the detail information in a digitized image data array comprising a matrix of pixels including the steps of:

(a) generating first and second image data arrays;

(b) two dimensional hysteresis processing each pixel in said first image data array to produce a hysteresis processed image, said hysteresis processed image having spacial correlation maintained with said first image data array;

(c) subtracting one of said first array which has been hysteresis processed and said second array from the other to define a differential image data array having a selected intensity range; and (d) adding said differential image data array to one of said digitized image data array, said first image data array and said second image data array to provide an enhanced image data array.

2. The method of claim 1 including the step of:

adjusting said selected intensity range of said differential image data array to a desired intensity by contrast stretching.

3. The method of claim 2 wherein:

said contrast stretching comprises linear contrast stretching.

4. The method of claim 3 wherein said linear contrast stretching comprises:

determining minimum and maximum pixel values in said hysteresis processed image data array; and recalculating output pixel values using the following equation:

$$q(x,y)=(p(x,y)-minpix)*maxval(maxpix-minpix)$$

where "p(x,y)" is the initial pixel value, "q(x,y)" is the final output pixel value, "minpix" is the minimum pixel value in said hysteresis processed image data array, "maxpix" is the maximum pixel value in said hysteresis processed image data array, and "maxval" is the maximum pixel value.

5. The method of claim 2 wherein:

said desired intensity is within a visual intensity range.

6. The method of claim 1 wherein:

both of said first and second image data arrays are hysteresis processed.

7. The method of claim 1 wherein:

said selected intensity range defines at least one differential image data array selected from the image groupings consisting of spacial detail, intensity detail and image noise.

8. The method of claim 1 wherein:

said differential image data array is displayed as schematic graphs.

9. The method of claim 1 wherein:

said digitized image data array has a 10-bit to 16-bit accuracy.

10. The method of claim 1 wherein:

said digitized image data array comprises microscopic data obtained from a group consisting of transmission electron microscopy, scanning electron microscopy, light microscopy and atomic force microscopy.

11. The method of claim 1 wherein:

said digitized image data array comprises medical imaging data.

12. The method of claim 11 wherein:

said medical imaging data comprises radiological imaging data.

13. The method of claim 12 wherein:

said radiological imaging data is obtained from a group consisting of mammogram and x-ray imaging data.

14. The method of claim 1 wherein:

said digitized image data array is selected from a group consisting of machine vision data, robotic vision data, remote sensing data and astronomical data.

15. The method of claim 1 wherein:

said digitized image data array is selected from a group consisting of array optical images, video images and computer generated images.

16. The method of claim 1 wherein:

said digitized image dam array comprises a multi-dimensional data array.

17. The method of claim 1 wherein said step of hysteresis processing comprises:

(a) determining if a selected pixel's intensity value along a line in relation to its neighbors' intensities falls within a preselected cursor width;

(b) generating a first processed line in a first direction, said step of generating said first processed line comprising, (1) maintaining the selected pixel's relative intensity value if it is outside the cursor width, and (2) changing the selected pixel's intensity value if it is within the cursor width to an intermediate value which is generally equivalent to the intensity of the last maintained value;

(c) generating a second processed line in a second direction, said step of generating said second processed line comprising, (1) maintaining the selected pixel's relative intensity value if it is outside the cursor width, and (2) changing the selected pixel's intensity value if it is within the cursor width to an intermediate value which is generally equivalent to the intensity of the last maintained value; and (d) bidirectionally averaging said first and second processed lines to generate a one dimensional hysteresis line.

18. The method of claim 17 wherein:

said one dimensional hysteresis lines in step (d) comprise spacially neighboring pixels.

19. The method of claim 18 wherein:

said one dimensional hysteresis lines are linear lines radiating at preselected angles through said selected pixel.

20. The method of claim 19 including:

summing the intensities of each of the one dimensional hysteresis lines for the selected pixel to define a summation value.

21. The method of claim 20 further including the step of:

dividing the summation value by the total number of one dimensional hysteresis lines in the set to define an output value.

22. The method of claim 1 wherein said step of hysteresis processing comprises:

(a) determining if a selected pixel's intensity value in relation to its neighbors' intensities falls within a preselected cursor width;

(b) maintaining the selected pixel's relative intensity value if it is outside the cursor width; and (c) changing the selected pixel's intensity value if it is within the cursor width to an intermediate value.

23. The method of claim 1 wherein both of said first and second image data arrays are processed and wherein:

each of said processed image data arrays is generated using a different hysteresis factor.

24. The method of claim 1 wherein:

said digitized image data array comprises a two dimensional data array.

25. The method of claim 1 wherein:

said digitized image data array comprises a three dimensional data array.

26. The method of claim 1 wherein:

said digitized image data array comprises a data array including x, y and z spacial coordinates.

27. The method of claim 1 wherein:

said digitized image data array comprises a data array including time coordinates.

28. The method of claim 1 wherein:

said digitized image data array comprises a data array including physical values.

29. The method of claim 1 wherein:

said digitized image data array comprises a data array including chemical values.

30. The method of claim 1 wherein:

said digitized image data array comprises a data array including values for statistical analysis.

31. An apparatus for enhancing the detail in a digitized image data array comprising a matrix of pixels including:

(a) means for generating first and second image data arrays;

(b) means for two dimensional hysteresis processing each pixel in said first image data array to produce a hysteresis processed image, said hysteresis processed image having spacial correlation maintained with said first image data array;

(c) means for subtracting one of said first array which has been hysteresis processed and said second array from the other to define a differential image having a selected intensity range; and (d) means for adding said differential image data array to one of said digitized image data array, said first image data array and said second image data array to provide an enhanced image data array.

32. The apparatus of claim 31 including the step of:

means for adjusting said selected intensity range of said differential image data array to a desired intensity by contrast stretching.

33. The apparatus of claim 32 wherein:

said means for contrast stretching comprises linear contrast stretching.

34. The apparatus of claim 33 wherein said linear contrast stretching comprises:

means for determining minimum and maximum pixel values in said hysteresis processed image data array; and means for recalculating output pixel values using the following equation:

$$q(x,y)=(p(x,y)-\text{minpix})*\text{maxval}(\text{maxpix}-\text{minpix})$$

where "p(x,y)" is the initial pixel value, "q(x,y)" is the final output pixel value, "minpix" is the minimum pixel value in said hysteresis processed image data array, "maxpix" is the maximum pixel value in said hysteresis processed image data array, and "maxval" is the maximum pixel value.

35. The apparatus of claim 32 wherein:

said desired intensity being within a visual intensity range.

36. The apparatus of claim 31 wherein:

both of said first and second image data arrays are hysteresis processed.

37. The apparatus of claim 31 wherein:

said selected intensity range defines at least one differential image data array selected from the image groupings consisting of spacial detail, intensity detail and image noise.

38. The apparatus of claim 31 wherein:

said digitized image data array comprises microscopic data obtained from a group consisting of transmission electron microscopy, scanning electron microscopy and light microscopy.

39. The apparatus of claim 31 wherein:

said digitized image data array comprises medical imaging data.

40. The apparatus of claim 39 wherein:

said medical imaging data comprises radiological imaging data.

41. The apparatus of claim 40 wherein:

said radiological imaging data is obtained from a group consisting of mammogram and x-ray imaging data.

42. The apparatus of claim 31 wherein:

said digitized image data array is selected from a group consisting of machine vision data, robotic vision data, remote sensing data and astronomical data.

43. The apparatus of claim 31 wherein both of said first and second image data arrays are processed, with each of said processed image data arrays being generated using a different hysteresis factor.

44. The apparatus of claim 31 further comprising:

means for quantifying image information into at least four image intensity classification including features, image details, intensity details and spacial noise.

* * * * *